(12) United States Patent
Lee

(10) Patent No.: US 11,812,017 B2
(45) Date of Patent: *Nov. 7, 2023

(54) METHOD FOR ENCODING/DECODING IMAGE SIGNAL, AND APPARATUS THEREFOR

(71) Applicant: GUANGDONG OPPO MOBILE TELECOMMUNICATIONS CORP., LTD., Guangdong (CN)

(72) Inventor: Bae Keun Lee, Seongnam-si (KR)

(73) Assignee: GUANGDONG OPPO MOBILE TELECOMMUNICATIONS CORP., LTD., Guangdong (CN)

(\*) Notice: Subject to any disclaimer, the term of this patent is extended or adjusted under 35 U.S.C. 154(b) by 0 days.

This patent is subject to a terminal disclaimer.

(21) Appl. No.: 17/849,874

(22) Filed: Jun. 27, 2022

(65) Prior Publication Data

US 2022/0337832 A1 Oct. 20, 2022

Related U.S. Application Data

(63) Continuation of application No. 17/243,327, filed on Apr. 28, 2021, now Pat. No. 11,470,312, which is a
(Continued)

(30) Foreign Application Priority Data

Nov. 8, 2018 (KR) .................. 10-2018-0136255
Nov. 27, 2018 (KR) .................. 10-2018-0148890
Nov. 27, 2018 (KR) .................. 10-2018-0149064

(51) Int. Cl.
*H04N 19/176* (2014.01)
*H04N 19/119* (2014.01)
(Continued)

(52) U.S. Cl.
CPC ......... *H04N 19/119* (2014.11); *H04N 19/105* (2014.11); *H04N 19/132* (2014.11); *H04N 19/137* (2014.11); *H04N 19/176* (2014.11)

(58) Field of Classification Search
CPC .. H04N 19/119; H04N 19/132; H04N 19/137; H04N 19/176
See application file for complete search history.

(56) References Cited

U.S. PATENT DOCUMENTS 10,271,064 B2  4/2019  Chien et al.
2016/0366435 A1  12/2016  Chien et al.
(Continued)

FOREIGN PATENT DOCUMENTS

CN   107820080 A    3/2018
KR   20170058866 A  5/2017
(Continued)

OTHER PUBLICATIONS

First Office Action of the Indian application No. 202117024032, dated Feb. 23, 2022.
(Continued)

*Primary Examiner* — Hesham K Abouzahra
(74) *Attorney, Agent, or Firm* — PERKINS COIE LLP

(57) ABSTRACT

A method for decoding an image, according to the present invention, comprises the steps of: determining whether a coding block is divided into a first prediction unit and a second prediction unit; determining a partition type of the coding block when determining that the coding block is divided; deriving first motion information about a first prediction unit and second motion information about a second prediction unit within the coding block; and acquiring a prediction sample within the coding block on the basis of the first motion information and the second motion information.

20 Claims, 40 Drawing Sheets

Related U.S. Application Data continuation of application No. PCT/KR2019/015096, filed on Nov. 7, 2019.

(51) Int. Cl.
*H04N 19/105* (2014.01)
*H04N 19/132* (2014.01)
*H04N 19/137* (2014.01)

(56) References Cited

U.S. PATENT DOCUMENTS

| | | |
|---|---|---|
| 2017/0310990 A1 | 10/2017 | Hsu |
| 2017/0332099 A1 | 11/2017 | Lee |
| 2018/0103264 A1 | 4/2018 | Sugio |
| 2018/0199054 A1* | 7/2018 | Hsu ............... H04N 19/176 |
| 2018/0352221 A1 | 12/2018 | Lee et al. |
| 2018/0376137 A1 | 12/2018 | Jun et al. |
| 2019/0037213 A1 | 1/2019 | Hermansson |
| 2019/0364284 A1 | 11/2019 | Moon et al. |
| 2020/0186799 A1 | 6/2020 | Wang et al. |
| 2020/0195973 A1 | 6/2020 | Xu et al. |
| 2021/0006790 A1* | 1/2021 | Zhang ............... H04N 19/137 |
| 2021/0092456 A1 | 3/2021 | Xu et al. |
| 2021/0120242 A1 | 4/2021 | Nam et al. |
| 2021/0243461 A1 | 8/2021 | Park |
| 2021/0281870 A1 | 9/2021 | Solovyev et al. |

FOREIGN PATENT DOCUMENTS

| | | |
|---|---|---|
| KR | 20180075556 A | 7/2018 |
| KR | 20180084659 A | 7/2018 |
| RU | 2577779 C2 | 3/2016 |
| RU | 2617920 C9 | 8/2017 |
| RU | 2020137823 A | 7/2022 |
| WO | 2017086738 A1 | 5/2017 |
| WO | 2018131982 A1 | 7/2018 |
| WO | 2020106190 A1 | 5/2020 |
| WO | 2020118064 A1 | 6/2020 |
| WO | 2020123220 A1 | 6/2020 |

OTHER PUBLICATIONS

First Office Action of the Canadian application No. 3118269, dated May 30, 2022.
Written Opinion of the International Search Authority in the international application No. PCT/KR2019/015096, dated Feb. 11, 2020.
First Office Action of the U.S. Appl. No. 17/243,327, dated Aug. 6, 2021.
Final Office Action of the U.S. Appl. No. 17/243,327, dated Dec. 7, 2021.
Notice of Allowance of the U.S. Appl. No. 17/243,327, dated Mar. 29, 2022.
Supplemental Notice of Allowance of the U.S. Appl. No. 17/243,327, dated Jun. 14, 2022.
First Office Action of the Chilean application No. 202101128, dated Jun. 13, 2022.
First Office Action of the Chinese application No. 202110668308.3, dated Jun. 23, 2022.
R-L Liao (Panasonic) et al: "CE10.3.1.b: Triangular prediction unit mode", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L0124, Nov. 1, 2018 (Nov. 1, 2018), XP030251919.
Bläser (RWTH—Aachen) M et al: "Description of SDR and 360° video coding technology proposal by RWTH Aachen University", 10. JVET Meeting; Apr. 10, 2018-Apr. 20, 2018; San Diego; (The Joint Video Exploration Team of ISO/IEC JTC1/SC29/WG11 and ITU-T SG.16), No. JVET-J0023, Apr. 12, 2018 (Apr. 12, 2018), XP030248151.
Toma (Panasonic) T et al: "Description of SDR video coding technology proposal by Panasonic", 10. JVET Meeting; Apr. 10, 2018-Apr. 20, 2018; San Diego; (The Joint Video Exploration Team of ISO/IEC JTC1/SC29/ WG11 and ITU-T SG.16 ), No. JVET-J0020, Apr. 11, 2018 (Apr. 11, 2018), XP030248129.
Benjamin Bross et al: "Versatile Video Coding (Draft 5)", (Motion Picture Expert Group or ISO/IEC JTC1/SC29/WG11), 14th Meeting: Geneva, CH, Mar. 19-27, 2019, No. m49436-JVET-00925-v1-JVET-N1001-v8.
Pfaff J et al: "Non-CE3: Simplifications of MIP", (Motion Picture Expert Group or ISO/IEC JTC1/SC29/WG11), 15th Meeting: Gothenburg, SWE, Jul. 3-12, 2019, No. m49436-JVET-O0925-v1.
Wang (Qualcomm) H et al: "CE10-related: Using regular merge index signaling for triangle mode", 13. JVET Meeting; Jan. 9, 2019-Jan. 18, 2019; Marrakech; (The Joint Video Exploration Team of ISO/IEC JTC1/SC29/WG11 and ITU-T SG.16 ), No. JVET-M0883, Jan. 14, 2019 (Jan. 14, 2019), XP030202180.
Xu (Tencent) M et al: "CE4-related: Triangle merge index signaling", 125. MPEG Meeting; Jan. 14, 2019-Jan. 18, 2019; Marrakech; (Motion Picture Expert Group or ISO/IEC JTC1/SC29/WG11), No. m45721, Jan. 3, 2019 (Jan. 3, 2019), XP030198182, JVET-M0448.
Supplementary European Search Report in the European application No. 19883290.9, dated Nov. 26, 2021.
International Search Report in the international application No. PCT/KR2019/015096, dated Feb. 11, 2020.
First Office Action of the European application No. 19883290.9, dated Jul. 28, 2022. 8 pages.
Supplemental Notice of Allowance of the U.S. Appl. No. 17/243,327, dated Aug. 1, 2022. 6 pages.
Supplemental Notice of Allowance of the U.S. Appl. No. 17/243,327, dated Sep. 19, 2022. 6 pages.
First Office Action of the Russian application No. 2021115855, dated Apr. 10, 2023. 14 pages.
Notification of Amendments Proposed by the Examining Division of the European application No. 19883290.9, dated Jun. 13, 2023. 3 pages.
First Office Action of the U.S. Appl. No. 17/850,598, dated Aug. 10, 2023. 40 pages.

* cited by examiner

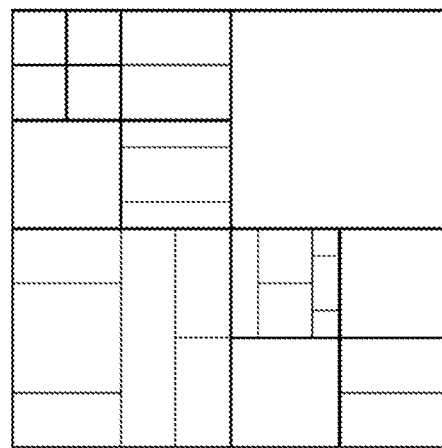
FIG. 5
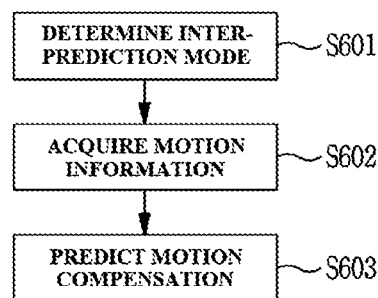
FIG. 6
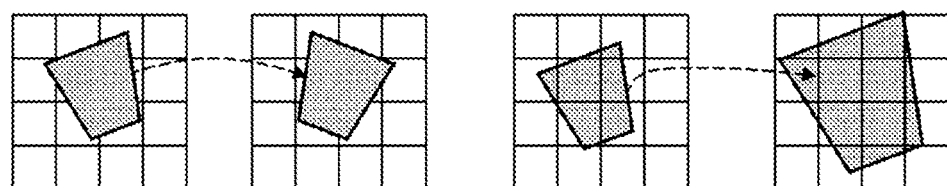
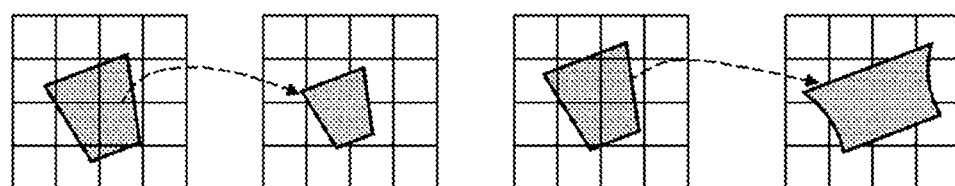
FIG. 7

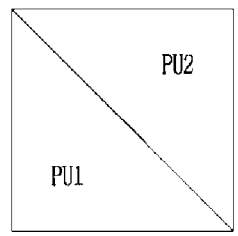
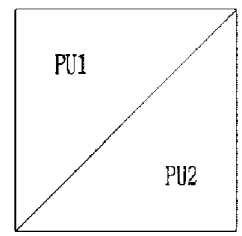
FIG. 33A  FIG. 33B
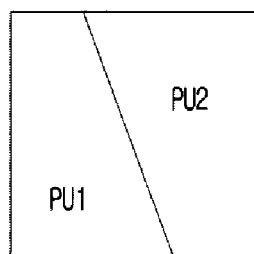
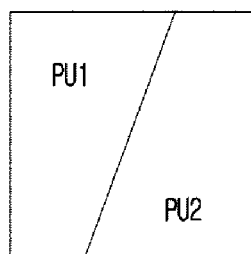
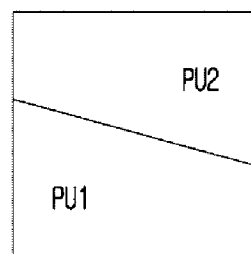
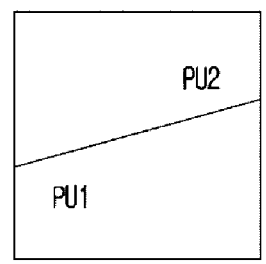
FIG. 34A  FIG. 34B  FIG. 34C  FIG. 34D
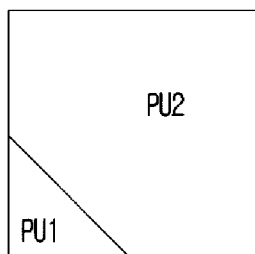
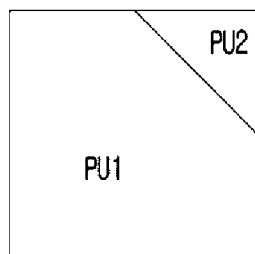
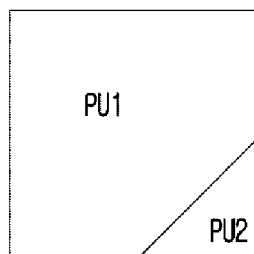
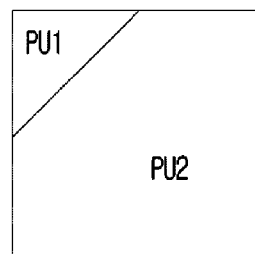
FIG. 35A  FIG. 35B  FIG. 35C  FIG. 35D
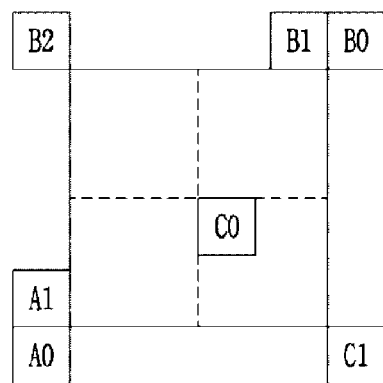
FIG. 36

FIG. 38B

| | | 1 | 4 |
|---|---|---|---|
| | 1 | 4 | 7 |
| 1 | 4 | 7 | |
| 4 | 7 | | |

$P = \frac{4}{8} \times P1 + \frac{4}{8} \times P2$ $P = P2$ $P = P1$

FIG. 38A

| | | | | | 1 | 2 | 4 |
|---|---|---|---|---|---|---|---|
| | | | | 1 | 2 | 4 | 6 |
| | | | 1 | 2 | 4 | 6 | 7 |
| | | 1 | 2 | 4 | 6 | 7 | |
| | 1 | 2 | 4 | 6 | 7 | | |
| 1 | 2 | 4 | 6 | 7 | | | |
| 2 | 4 | 6 | 7 | | | | |
| 4 | 6 | 7 | | | | | |

$P = \frac{4}{8} \times P1 + \frac{4}{8} \times P2$ $P = P2$ $P = P1$

METHOD FOR ENCODING/DECODING IMAGE SIGNAL, AND APPARATUS THEREFOR

CROSS-REFERENCE TO RELATED APPLICATION

This is a continuation application of U.S. patent application Ser. No. 17/243,327 filed Apr. 28, 2021, which is a continuation of International Patent Application No. PCT/KR2019/015096, filed on Nov. 7, 2019, which claims priority to Korean Patent Applications No. 10-2018-0136255, filed on Nov. 8, 2018, No. 10-2018-0149064, filed on Nov. 27, 2018, No. 10-2018-0148890, filed on Nov. 27, 2018, the contents of which are hereby incorporated by reference in their entirety.

TECHNICAL FIELD

The present invention relates to a method of encoding or decoding video signals and an apparatus therefor.

BACKGROUND

With the trend of display panels becoming larger and larger, high-definition video services are in demand. The biggest problem of the high-definition video services is that the amount of data increases significantly, and in order to solve this problem, research has been actively conducted to improve a video compression rate. As a representative example, the Joint Collaborative Team on Video Coding (JCT-VC) was established in Video Coding Experts Group (VCEG) under International Telecommunication Union-Telecommunication (ITU-T) and Motion Picture Experts Group (MPEG) in 2009. JCT-VC proposed High Efficiency Video Coding (HEVC), which is a video compression standard of which the compression performance is about two times higher than that of H.264/AVC, and was approved as a standard on Jan. 25, 2013. With the rapid development of high-definition video services, HEVC performance is gradually revealing its limitations.

SUMMARY

Technical Problem

The present invention is directed to providing a method of partitioning a coding block into a plurality of prediction blocks when encoding or decoding video signals and an apparatus for performing the same.

The present invention is directed to providing a method of deriving motion information for each of a plurality of prediction blocks when encoding or decoding video signals and an apparatus for performing the same.

The present invention is directed to providing a method of deriving a merge candidate using an inter-region motion information table when encoding or decoding video signals and an apparatus for performing the method.

Technical problems intended to be solved by the invention are not limited to the aforementioned problems, and other technical problems that are not described herein should be clearly understood by those skilled in the art from the following description.

Technical Solution

A method of decoding or encoding a video signal according to the present invention includes determining whether to split a coding block to include a first prediction unit and a second prediction unit, determining a partition type of the coding block when it is determined to split the coding block, deriving first motion information regarding the first prediction unit in the coding block and second motion information regarding the second prediction unit in the coding block, and acquiring a prediction sample in the coding block on the basis of the first motion information and the second motion information. In this case, the first motion information regarding the first prediction unit may be derived from a first merge candidate specified by first index information among a plurality of merge candidates included in a merge candidate list, and the second motion information regarding the second prediction unit may be derived from a second merge candidate specified by second index information among the plurality of merge candidates included in the merge candidate list.

When a value of the second index information is greater than or equal to a value of the first index information, the second merge candidate may have an index equal to the value of the second index information plus one.

When a value of the second index information is smaller than a value of the first index information, the second merge candidate may have an index equal to the value of the second index information.

When the prediction sample is included in a boundary region between the first prediction unit and the second prediction unit, the prediction sample may be derived on the basis of a weighted-sum operation of a first prediction sample derived on the basis of the first motion information and a second prediction sample derived on the basis of the second motion information.

A first weight applied to the first prediction sample may be determined on the basis of an x-coordinate and a y-coordinate of the prediction sample.

A second weight applied to the second prediction sample may be derived by subtracting the first weight from a constant value.

A size of the boundary region may be determined on the basis of at least one of a size of the coding block or a shape of the coding block.

The features briefly summarized above with respect to the present invention are merely exemplary aspects of the detailed description of the present invention described below and do not limit the scope of the present invention.

Advantageous Effects

According to the present invention, by partitioning a coding block into a plurality of prediction blocks and deriving motion information for each of the prediction blocks, it is possible to improve inter-prediction efficiency.

According to the present invention, by providing a method of deriving a merge candidate using an inter-region motion information table, it is possible to improve inter-prediction efficiency.

Advantageous effects of the invention are not limited to the aforementioned effects, and other advantageous effects that are not described herein should be clearly understood by those skilled in the art from the following description.

BRIEF DESCRIPTION OF THE DRAWINGS

FIG. 5 is a diagram illustrating a partition aspect of a coding tree unit.

FIG. 6 is a flowchart of an inter-prediction method according to an embodiment of the present invention.

FIG. 7 is a diagram illustrating a nonlinear motion of an object.

FIG. 33A to FIG. 33B are diagrams showing an example of partitioning a coding block into a plurality of prediction blocks using a diagonal line.

FIG. 34A to FIG. 34D are diagrams showing an example of partitioning a coding block into two prediction units.

FIG. 35A to FIG. 35D show examples in which a coding block is split into a plurality of prediction blocks of different sizes.

FIG. 36 is a diagram showing neighboring blocks used to derive a triangular merge candidate.

FIG. 38A to FIG. 38B are diagrams showing an example of deriving a prediction sample on the basis of a weighted-sum operation of a first prediction sample and a second prediction sample.

FIG. 39A to FIG. 39B are diagrams showing an example of deriving a prediction sample on the basis of a weighted-sum operation of a first prediction sample and a second prediction sample.

DETAILED DESCRIPTION

Hereinafter, embodiments of the present invention will be described in detail with reference to the accompanying drawings.

An picture is encoded and decoded in units of blocks. As an example, encoding and decoding processing such as transform, quantization, prediction, in-loop filtering, or reconstruction may be performed on a coding block, a transform block, or a prediction block.

Hereinafter, a block to be encoded or decoded will be referred to as "the current block." As an example, the current block may indicate a coding block, a transform block, or a prediction block depending on the current step for encoding or decoding processing.

In addition, the term "unit" used herein may be understood as indicating a basic unit for performing a specific encoding and decoding process, and the term "block" may be understood as indicating a sample array of a predetermined size. Unless otherwise specified, the terms "block" and "unit" may be used interchangeably. As an example, in the following embodiments, a coding block and a coding unit may be understood as having equivalent meanings.

Figure 1:
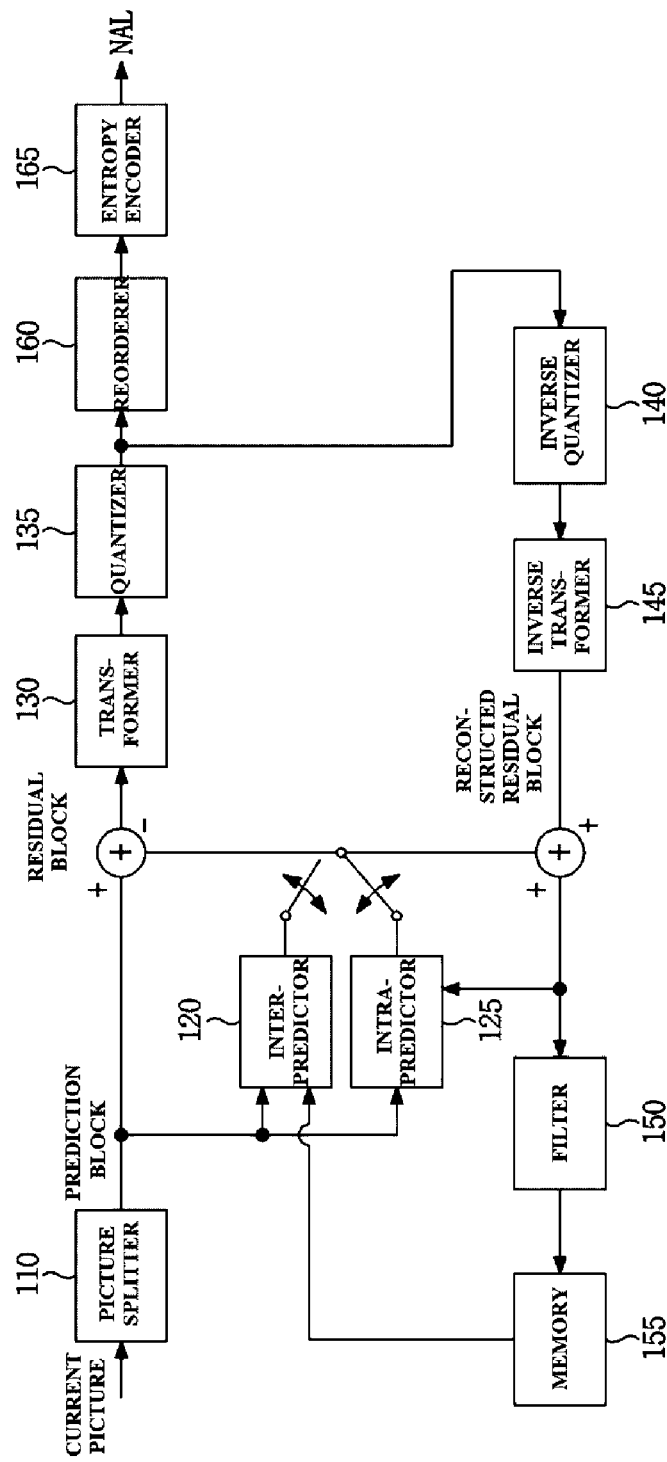
FIG. 1 is a block diagram of an encoder according to an embodiment of the present invention.

FIG. 1 is a block diagram of an encoder according to an embodiment of the present invention.

Referring to FIG. 1, a video encoding apparatus 100 may include a picture splitter 110, predictors 120 and 125, a transformer 130, a quantizer 135, a reorderer 160, an entropy encoder 165, an inverse quantizer 140, an inverse transformer 145, a filter 150, and a memory 155.

The elements of FIG. 1 are independently shown so as to represent different characteristic functions in the video encoding apparatus, and each of the elements is not meant to be configured in a separate hardware unit or as one software unit. In other words, the elements are independently arranged for convenience of description. In order to perform functions, at least two elements may be combined into one element, or one element may be divided into a plurality of elements. In this case, an embodiment for the combination of the elements and an embodiment for the partitioning of the element are encompassed within the scope of the present invention without departing from the essence of the present invention.

Also, some of the elements may not be essential elements for performing essential functions in the present invention and may just be optional elements for improving performance. The present invention may be implemented by including only elements necessary to implement the essence of the present invention rather than elements used to just improve performance. Even a structure including only essential elements rather than optional elements used to just improve performance is encompassed within the scope of the present invention.

The picture splitter 110 may split an input picture into at least one processing unit. In this case, the processing unit may be a prediction unit (PU), a transform unit (TU), or a coding unit (CU). The picture splitter 110 may split one picture into a plurality of combinations of coding units, prediction units, and transform units and may select one combination of coding units, prediction units, and transform units according to a predetermined criterion (e.g., a cost function) to code the picture.

For example, one picture may be split into a plurality of coding units. A recursive tree structure, such as a quad-tree structure, may be used to split a picture into coding units. A coding unit split into other coding units using one picture or the largest coding unit as a root may have number of child nodes corresponding to the number of split coding units. A coding unit which is no longer split due to a predetermined limitation serves as a leaf node. That is, when it is assumed that only square partitioning is possible for one coding unit, one coding unit may be split into up to four other coding units.

In the following embodiments of the present invention, a coding unit may refer to a unit configured to perform encoding, or a unit configured to perform decoding.

One coding unit may be split into at least one or more prediction units of the same size in a square or rectangular shape and may be split into prediction units such that one of the prediction units is different from another prediction unit in shape and/or size.

When a prediction unit subjected to intra-prediction based on a coding unit is generated and the coding unit is not a minimum coding unit, intra-prediction may be performed without partitioning the coding unit into a plurality of N×N prediction units.

The predictors 120 and 125 may include an inter-predictor 120 configured to perform inter-prediction and an intra-predictor 125 configured to perform intra-prediction. The predictors 120 and 125 may determine whether to perform intra-prediction or to use inter-prediction on prediction units and may determine detailed information (e.g., an intra-prediction mode, a motion vector, a reference picture, and the like) corresponding to each prediction method. In this case, a processing unit in which prediction is performed may be different from a processing unit in which a prediction method and specific details are determined. For example, a prediction method, a prediction mode, and the like may be determined by a prediction unit, and prediction may be performed by a transform unit. A residual value (a residual block) between a generated prediction block and an original block may be input to the transformer 130. Also, motion vector information, prediction mode information, and the like, which are used for prediction, in addition to the residual value may be encoded by the entropy encoder 165 and delivered to a decoder. When a particular encoding mode is used, the original block may be intactly encoded and transmitted to the decoder without generating the prediction block through.

The inter-predictor 120 may predict the prediction unit on the basis of information on at least one of a preceding picture or a subsequent picture with respect to the current picture, and in some cases, the prediction unit may be predicted on the basis of information on a partial region of the current picture where encoding is completed. The inter-predictor 120 may include a reference picture interpolator, a motion predictor, and a motion compensator.

The reference picture interpolator may receive reference picture information from the memory 155 and may generate information on pixels smaller than or equal to integer pixels from a reference picture. In the case of luminance pixels, a DCT-based 8-tap interpolation filter having different filter coefficients may be used to generate information on pixels smaller than or equal to integer pixels in units of ¼ pixels. In the case of chrominance signals, a DCT-based 4-tap interpolation filter having different filter coefficients may be used to generate information on pixels smaller than or equal to integer pixels in units of ⅛ pixels.

The motion predictor may perform motion prediction on the basis of the reference picture interpolated by the reference picture interpolator. As a method for calculating a motion vector, various methods such as a full search-based block matching algorithm (FBMA), a three-step search (TSS) algorithm, and a new three-step search (NTS) algorithm may be used. The motion vector may have a motion vector value in units of ½ or ¼ pixels on the basis of the interpolated pixels. The motion prediction unit may predict the current prediction unit by using different motion prediction method. As the motion prediction method, various methods such as a skip method, a merge method, an advanced motion vector prediction (AMVP) method, and an intra-block copy method may be used.

The intra-predictor 125 may generate a prediction unit on the basis of information on a reference pixel near the current block, which is pixel information in the current picture. When the nearby block of the current prediction unit is a block subjected to inter-prediction and thus the reference pixel is a pixel subjected to inter-prediction, the reference pixel information of the nearby block subjected to intra-prediction may be used in place of the reference pixel included in the block subjected to inter-prediction. That is, when the reference pixel is not available, at least one available reference pixel may be used in place of unavailable reference pixel information.

Prediction modes in intra-prediction may include a directional prediction mode that uses reference pixel information depending on a prediction direction and a non-directional mode that does not use directionality information when performing prediction. A mode for predicting luminance information and a mode for predicting chrominance information may be different, and intra-prediction mode information used to predict the luminance information, or predicted luminance signal information may be utilized to predict the chrominance information.

When intra-prediction is performed and the prediction unit is equal in size to the transform unit, the intra-prediction may be performed on the prediction unit on the basis of pixels located on the left of the prediction unit, pixels located on the upper-left corner of the prediction unit, and pixels located on the top of the prediction unit. However, when intra-prediction is performed and the prediction unit is different in size from the transform unit, the intra-prediction may be performed using the reference pixel based on the transform unit. Also, intra-prediction using N×N partitioning only for the minimum coding unit may be used.

In the intra-prediction method, a prediction block may be generated after applying an adaptive intra smoothing (AIS) filter to a reference pixel depending on the prediction mode. The type of the AIS filter applied to the reference pixel may vary. In order to perform the intra-prediction method, an intra-prediction mode of the current prediction unit may be predicted from an intra-prediction mode of a prediction unit near the current prediction unit. When the prediction mode of the current prediction unit is predicted using mode information predicted from the nearby prediction unit, information indicating that the current prediction unit and the nearby prediction unit have the same prediction mode may be transmitted using predetermined flag information when the intra-prediction mode of the current prediction unit is the same as the intra-prediction mode of the nearby prediction unit, and entropy encoding may be performed to encode prediction mode information of the current block when the prediction mode of the current prediction unit is different from the prediction mode of the nearby prediction unit.

Also, a residual block including information on a residual value, which is a difference between a prediction unit subjected to prediction and an original block of the prediction unit, may be generated on the basis of the prediction units generated by the predictors 120 and 125. The generated residual block may be input to the transformer 130.

The transformer 130 may transform the residual block including the information on the residual value between the original block and the prediction units generated by the predictors 120 and 125 by using a transform method such as discrete cosine transform (DCT) or discrete sine transform (DST). Here, a DCT transform core includes at least one of DCT2 or DCT8, and a DST transform core includes DST7. Whether to apply DCT or DST to transform the residual block may be determined on the basis of intra-prediction mode information of the prediction unit used to generate the residual block. The transform of the residual block may be skipped. A flag indicating whether to skip the transform of the residual block may be coded. The skip of the transform may be allowed for residual blocks of a size less than or equal to a threshold value, a luma component, or a chroma component under a 4:4:4 format.

The quantizer 135 may quantize values that are transformed into the frequency domain by the transformer 130. Quantization coefficients may vary depending on the block or the importance of an picture. The values calculated by the quantizer 135 may be provided to the inverse quantizer 140 and the reorderer 160.

The reorderer 160 may perform reordering of coefficient values on the quantized residual values.

The reorderer 160 may change coefficients from a two-dimensional block form to a one-dimensional vector form through a coefficient scanning method. For example, the reorderer 160 may scan DC coefficients and even high-frequency coefficients using a zigzag scanning method to change the coefficients to a one-dimensional vector form. Depending on the intra-prediction mode and the size of the transform unit, vertical scanning in which two-dimensional block-type coefficients are scanned in a column direction or horizontal scanning in which two-dimensional block-type coefficients are scanned in a row direction may be used instead of zigzag scanning. That is, the reorderer may determine a scanning method to be used among the zigzag scanning, the vertical scanning, and the horizontal scanning depending on the size of the transform unit and the intra-prediction mode.

The entropy encoder 165 may perform entropy encoding on the basis of the values calculated by the reorderer 160. Entropy encoding may use, for example, various encoding methods such as exponential Golomb, context-adaptive variable length coding (CAVLC), and context-adaptive binary arithmetic coding (CABAC).

The entropy encoder 165 may encode a variety of information such as residual value coefficient information and block type information of the coding unit, prediction mode information, partition information, prediction unit information, transmission unit information, motion vector information, reference frame information, block interpolation information, and filtering information from the reorderer 160 and the predictors 120 and 125.

The entropy encoder 165 may perform entropy encoding on the coefficient values of the coding unit input from the reorderer 160.

The inverse quantizer 140 may inversely quantize the values quantized by the quantizer 135, and the inverse transformer 145 may inversely transform the values transformed by the transformer 130. The residual value generated by the inverse quantizer 140 and the inverse transformer 145 may be combined with a prediction unit predicted through a motion estimator, a motion compensator, and an intra-predictor of the predictors 120 and 125 to generate a reconstructed block.

The filter 150 may apply at least one of a deblocking filter, an offset corrector, and an adaptive loop filter.

The deblocking filter may remove block distortion that has occurred due to a border between blocks from a reconstructed picture. In order to determine whether to perform deblocking, whether to apply the deblocking filter to the current block may be determined on the basis of pixels included in several rows or columns in the block. When the deblocking filter is applied to the block, a strong filter or a weak filter may be applied depending on required deblocking filtering strength. Also, when the deblocking filter is applied, vertical filtering and horizontal filtering may be performed such that horizontal filtering and vertical filtering is processed in parallel.

The offset corrector may correct an offset from an original picture in an picture subjected to deblocking in units of pixels. A method of classifying pixels included in an picture into a certain number of regions, determining an region to be subjected to offsetting, and applying an offset to the determined region or a method of applying an offset in consideration of edge information of each pixel may be used to perform offset correction on a particular picture.

Adaptive loop filtering (ALF) may be performed on the basis of values obtained by comparing the filtered reconstructed picture and the original picture. By classifying the pixels included in the picture into predetermined groups and determining a filter to be applied to each of the groups, differential filtering may be performed for each group. Information on whether to apply ALF may be transmitted for each coding unit (CU), and the shape and filter coefficients of an ALF filter to be applied may vary depending on the block. Also, the ALF filter in the same form (fixed form) may be applied regardless of the characteristic of a block to be subjected to filtering.

The memory 155 may store a reconstructed block or picture calculated through the filter 150. The stored reconstructed block or picture may be provided to the predictors 120 and 125 when inter-prediction is performed.

Figure 2:
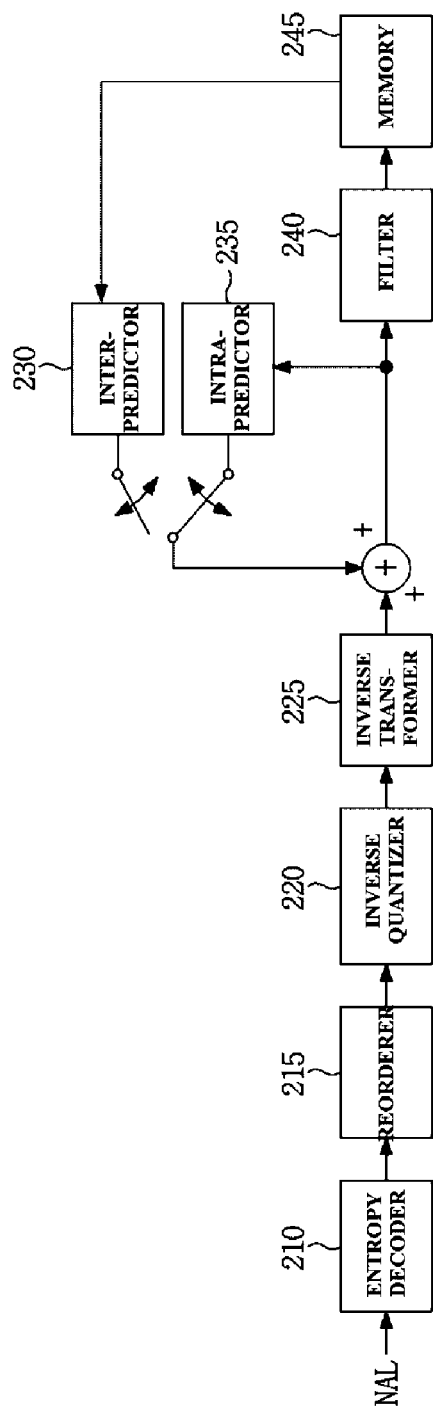
FIG. 2 is a block diagram of an decoder according to an embodiment of the present invention.

FIG. 2 is a block diagram of an decoder according to an embodiment of the present invention.

Referring to FIG. 2, an decoder 200 may include an entropy decoder 210, a reorderer 215, an inverse quantizer 220, an inverse transformer 225, predictors 230 and 235, a filter 240, and a memory 245.

When a video bitstream is input from an encoder, the input bitstream may be decoded in a procedure reverse to that of the encoder.

The entropy decoder 210 may perform entropy decoding in a procedure reverse to the procedure in which the entropy encoder of the encoder performs entropy encoding. For example, various methods such as exponential Golomb, context-adaptive variable length coding (CAVLC), and context-adaptive binary arithmetic coding (CABAC) may be applied to correspond to the method performed by the encoder.

The entropy decoder 210 may decode information related to intra-prediction and inter-prediction performed by the encoder.

The reorderer 215 may perform reordering on the bitstream subjected to entropy-decoding by the entropy decoder 210 on the basis of the reordering method used by the encoder. The reorderer 215 may reconstruct coefficients expressed in a one-dimensional vector form into two-dimensional block-type coefficients to reorder the two-dimensional block-type coefficients. The reorderer 215 may receive information related to the coefficient scanning performed by the encoder and perform reordering through a inverse scanning method on the basis of the scanning order of the encoder.

The inverse quantizer 220 may perform inverse quantization on the basis of the reordered block coefficient values and quantization parameters provided by the encoder.

The inverse transformer 225 may perform inverse DCT or inverse DST on a result of the quantization performed by the encoder, wherein the inverse DCT or the inverse DST is the inverse of the transform which has been performed by the transform unit, that is, DCT or DST. Here, a DCT transform core may include at least one of DCT2 or DCT8, and a DST transform core may include DST7. Alternatively, when the transform is skipped in the encoder, the inverse transformer 225 may not perform the inverse transform. The inverse transform may be performed on the basis of a transmission unit determined by the encoder. In the inverse transformer 225 of the decoder, transform techniques (e.g., DCT and DST) may be selectively performed depending on multiple pieces of information such as a prediction method, the size of the current block, and a prediction direction.

The predictors 230 and 235 may generate a prediction block on the basis of information related to prediction block generation, which is provided by the entropy decoder 210, and information on a previously decoded block or picture, which is provided by the memory 245.

As described above, when intra-prediction is performed in the same manner as that of the encoder and the prediction unit is equal in size to the transform unit, the intra-prediction may be performed on the prediction unit on the basis of pixels located on the left of the prediction unit, pixels located on the upper-left corner of the prediction unit, and pixels located on the top of the prediction unit. On the other hand, when intra-prediction is performed and the prediction unit is different in size from the transform unit, the intra-prediction may be performed using a reference pixel based on the transform unit. Also, intra-prediction using N×N partitioning only for the minimum coding unit may be used.

The predictors 230 and 235 may include a prediction unit determinator, an inter-predictor, and an intra-predictor. The prediction unit determinator may receive a variety of information such as prediction unit information, prediction mode information for the intra-prediction method, and motion-prediction-related information for the inter-prediction method from the entropy decoder 210, classify the prediction unit in the current coding unit, and determine whether the prediction unit performs inter-prediction or intra-prediction. By using information necessary for the inter-prediction of the current prediction unit provided by the encoder, the inter-predictor 230 may perform inter-prediction on the current prediction unit on the basis of information included in at least one of a picture preceding the current picture including the current prediction unit or a picture following the current picture. Alternatively, inter-prediction may be performed on the basis of information on some pre-reconstructed regions in the current picture including the current prediction unit.

The inter-predictor 230 may determine whether the motion prediction method for the prediction unit included in the corresponding coding unit is a skip mode, a merge mode, an AMVP mode, or an intra-block copy mode on the basis of the coding unit in order to perform inter-prediction.

The intra-predictor 235 may generate a prediction block on the basis of information on pixels in the current picture. When the prediction unit is a prediction unit subjected to intra-prediction, the intra-predictor 235 may perform intra-prediction on the basis of intra-prediction mode information of the prediction unit provided by the encoder. The intra-predictor 235 may include an AIS filter, a reference pixel interpolator, and a DC filter. The AIS filter, which is a part that performs filtering on the reference pixel of the current block, may determine whether to apply the filter depending on the prediction mode of the current prediction unit. The AIS filter may perform AIS filtering on the reference pixel of the current block using AIS filter information and the prediction mode of the prediction unit provided by the encoder. When the prediction mode of the current block is a mode in which the AIS filtering is not performed, the AIS filter may not be applied.

When the prediction mode of the prediction unit is a prediction mode in which intra-prediction is performed on the basis of a pixel value obtained by interpolating the reference pixel, the reference pixel interpolator may interpolate the reference pixel to generate the reference pixel in a pixel unit less than or equal to an integer. When the prediction mode of the current prediction unit is a prediction mode in which the prediction block is generated without interpolating the reference pixel, the reference pixel may not be interpolated. When the prediction mode of the current block is a DC mode, the DC filter may generate the prediction block through filtering.

The reconstructed block or picture may be provided to the filter 240. The filter 240 may include a deblocking filter, an offset corrector, and an ALF filter.

The filter 240 may receive information on whether the deblocking filter is applied to a corresponding block or picture or information on whether a strong filter or a weak filter is applied when the deblocking filter is applied from the encoder. The deblocking filter of the decoder may receive information related to the deblocking filter, which is provided by the encoder, and the decoder may perform deblocking filtering on a corresponding block.

The offset corrector may perform offset correction on the reconstructed picture on the basis of the type of offset correction, offset value information, and the like which are applied to the picture upon encoding.

The ALF may be applied to the coding unit on the basis of information on whether to apply the ALF, ALF coefficient information, and the like which are provided from the encoder. The ALF information may be provided by being included in a particular parameter set.

The memory 245 may store the reconstructed picture or block so that the picture or block can be used as a reference picture or a reference block and also may provide the reconstructed picture to an output unit.

Figure 3:
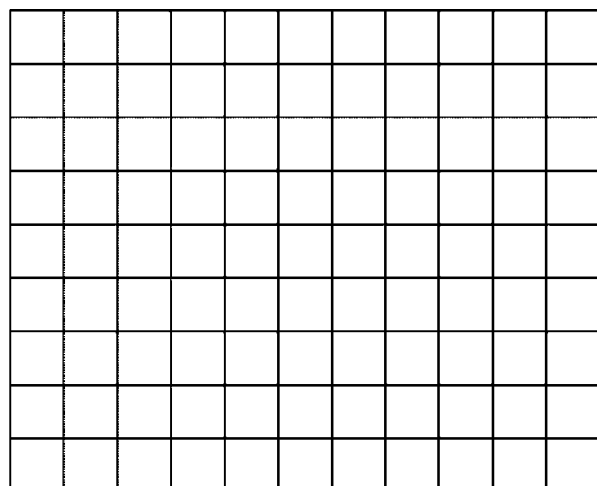
FIG. 3 is a diagram showing a basic coding tree unit according to an embodiment of the present invention.

FIG. 3 is a diagram showing a basic coding tree unit according to an embodiment of the present invention.

A coding unit of the largest size may be defined as a coding tree block. One picture is split into a plurality of coding tree units (CTUs). A coding tree unit, which is a coding unit of the largest size, may be referred to as a largest coding unit (LCU). FIG. 3 shows an example in which one picture is split into a plurality of coding tree units.

The size of the coding tree unit may be defined at the picture level or the sequence level. To this end, information indicating the size of the coding tree unit may be signaled through a picture parameter set or a sequence parameter set.

As an example, the size of the coding tree unit for the entire picture in a sequence may be set to 128×128. Alternatively, one of 128×128 or 256×256 may be determined as the size of the coding tree unit at the picture level. As an example, the size of a coding tree unit in a first picture may be set to 128×128, and the size of a coding tree unit in a second picture may be set to 256×256.

The coding tree unit may be split to generate a coding block. A coding block indicates a basic unit for encoding or decoding processing. As an example, prediction or transform may be performed for each coding block, or a predictive coding mode may be determined for each coding block. Here, the predictive coding mode indicates a method of generating a prediction picture. As an example, the predictive coding mode may include intra-prediction, inter-prediction, current picture referencing (CPR) (or intra-block copy (IBC)), or combined prediction. A prediction block for a coding block may be generated using at least one predictive coding mode among intra-prediction, inter-prediction, current picture referencing, or combined prediction for the coding block.

Information indicating the predictive coding mode of the current block may be signaled in a bitstream. As an example, the information may be a 1-bit flag indicating whether the predictive coding mode is an intra-mode or an inter-mode. Current picture referencing or combined prediction may be available only when it is determined that the predictive coding mode of the current block is the inter-mode.

Current picture referencing is for setting the current picture as the reference picture and acquiring the prediction block of the current block from an region of the current picture where encoding or decoding is completed. Here, the current picture refers to a picture including the current block. Information indicating that current picture referencing is applied to the current block may be signaled in a bitstream. As an example, the information may be a 1-bit flag. It may be determined that the predictive coding mode of the current block is current picture referencing when the flag is true, and it may be determined that the prediction mode of the current block is inter-prediction when the flag is false.

Alternatively, the predictive coding mode of the current block may be determined on the basis of a reference picture index. As an example, when the reference picture index indicates the current picture, it may be determined that the predictive coding mode of the current block is current picture referencing. When the reference picture index indicates a picture other than the current picture, it may be determined that the predictive coding mode of the current block is inter-prediction. That is, current picture referencing is a prediction method that uses information of an region of the current picture where encoding or decoding is completed, and inter-prediction is a prediction method that uses information of another picture where encoding or decoding is completed.

Combined prediction indicates a coding mode obtained by combining two or more of intra-prediction, inter-prediction, and current picture referencing. As an example, when combined prediction is applied, a first prediction block may be generated on the basis of one of intra-prediction, inter-prediction, or current picture referencing, and a second prediction block may be generated on the basis of another one. When the first prediction block and the second prediction block are generated, a final prediction block may be generated through an averaging operation or a weighted-sum operation between the first prediction block and the second prediction block. Information indicating whether combined prediction is applied may be signaled in a bitstream. The information may be a 1-bit flag.

FIG. 4A to FIG. 4E are diagrams showing various partition types of a coding block.

A coding block may be split into a plurality of coding blocks on the basis of quad-tree partitioning, binary-tree partitioning, or ternary-tree partitioning. A coding block obtained through the partitioning may be re-split into a plurality of coding blocks on the basis of quad-tree partitioning, binary-tree partitioning, or ternary-tree partitioning.

The quad-tree partitioning indicates a partitioning technique to split the current block into four blocks. As a result of the quad-tree partitioning, the current block may be split into four square partitions (see "SPLIT_QT" of FIG. 4A).

Figure 4:
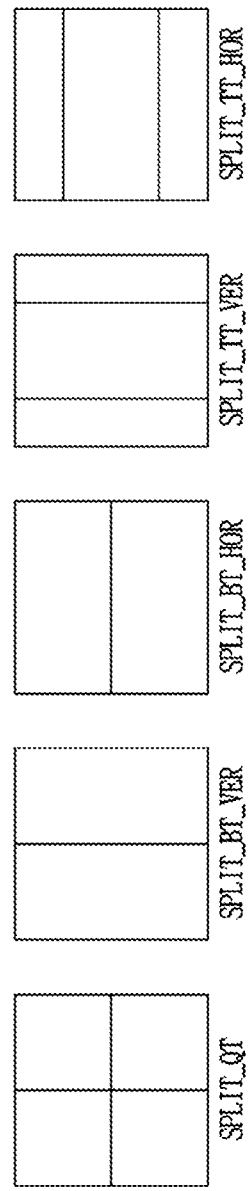
FIG. 4A to FIG. 4E are diagrams showing various partition types of a coding block.

The binary-tree partitioning indicates a partitioning technique to split the current block into two blocks partitioning the current block into two blocks in a vertical direction (i.e., using a vertical line across the current block) may be referred to as vertical binary-tree partitioning, and partitioning the current block into two blocks in a horizontal direction (i.e., using a horizontal line across the current block) may be referred to as horizontal binary-tree partitioning. As a result of the binary-tree partitioning, the current block may be split into two non-square partitions. In FIG. 4B, "SPLIT_BT_VER" represents a result of the vertical binary-tree partitioning. In FIG. 4C, "SPLIT_BT_HOR" represents a result of the horizontal binary-tree partitioning.

The ternary-tree partitioning indicates a partitioning technique to split the current block into three blocks partitioning the current block into three blocks in a vertical direction (i.e., using two vertical lines across the current block) may be referred to as vertical ternary-tree partitioning, and partitioning the current block into three blocks in a horizontal direction (i.e., using two horizontal lines across the current block) may be referred to as horizontal ternary-tree partitioning. As a result of the ternary-tree partitioning, the current block may be split into three non-square partitions. In this case, the width or height of the partition located at the center of the current block may be twice those of the other partitions. In FIG. 4D, "'SPLIT_TT_VER'" represents a result of the vertical ternary-tree partitioning. In FIG. 4E, "SPLIT_TT_HOR" represents a result of the horizontal ternary-tree partitioning.

The number of times a coding tree unit is split may be defined as a partition depth (partitioning depth). The maximum partition depth of the coding tree unit may be determined at the sequence level or the picture level. Thus, the maximum partition depth of the coding tree unit may vary depending on the sequence or the picture.

Alternatively, the maximum partition depth may be determined individually for each partitioning technique. As an example, the maximum partition depth allowed for quad-tree partitioning may be different from the maximum partition depth allowed for binary-tree partitioning and/or the ternary-tree partitioning.

The encoder may signal information indicating at least one of the partition types or the partition depth of the current block in a bitstream. The decoder may determine the partition type and partition depth of the coding tree unit on the basis of information parsed from the bitstream.

FIG. 5 is a diagram illustrating a partitioning aspect of a coding tree unit.

partitioning a coding block using a partitioning technique such as quad-tree partitioning, binary-tree partitioning, and/or ternary-tree partitioning may be referred to as multi-tree partitioning (multi-tree partitioning).

Coding blocks generated by applying multi-tree partitioning to the coding block may be referred to as lower coding blocks. When the partition depth of the coding block is k, the partition depth of the lower coding blocks is set to k+1.

On the contrary, with respect to coding blocks with a partition depth of k+1, a coding block with a partition depth of k may be referred to as an upper coding block.

The partition type of the current coding block may be determined on the basis of at least one of the partition types of the upper coding block or the partition type of a neighboring coding block. Here, the neighboring coding block is adjacent to the current coding block and may include at least one of a neighboring block located above the current coding block, a neighboring block located to the left of the current coding block, or a neighboring block adjacent to the upper-left corner of the current coding block. Here, the partition type may include at least one of the presence of quad-tree partitioning, the presence of binary-tree partitioning, the direction of binary-tree partitioning, the presence of ternary-tree partitioning, or the direction of ternary-tree partitioning.

In order to determine the partition type of the coding block, information indicating whether the coding block is split may be signaled in a bitstream. The information is a 1-bit flag "split_cu_flag", and the flag being true indicates that the coding block is split by a multi-tree partitioning technique.

When split_cu_flag is true, information indicating whether the coding block is split through quad-tree partitioning may be signaled in a bitstream. The information is a 1-bit flag "split_qt_flag", and when the flag is true, the coding block may be split into four blocks.

For example, it is shown in FIG. 5 that four coding blocks with a partition depth of one are generated because the coding tree unit is split through quad-tree partitioning. It is also shown that quad-tree partitioning is re-applied to the first coding block and the fourth coding block among the four coding blocks generated by performing the quad-tree partitioning. As a result, four coding blocks with a partition depth of two may be generated.

Also, by re-applying quad-tree partitioning to a coding block with a partition depth of two, a coding block with a partition depth of three may be generated.

When quad-tree partitioning is not applied to a coding block, whether to perform binary-tree partitioning or ternary-tree partitioning on the coding block may be determined in consideration of at least one of the size of the coding block, whether the coding block is located at a picture edge, the maximum partition depth, or the partitioning aspect of a neighboring block. When it is determined that binary-tree partitioning or ternary-tree partitioning is performed on the coding block, information indicating a partitioning direction may be signaled in a bitstream. The information may be a 1-bit flag mtt_split_cu_vertical_flag. On the basis of the flag, whether the partitioning direction is vertical or horizontal may be determined. In addition, information indicating which of binary-tree partitioning and ternary-tree partitioning is applied to the coding block may be signaled in a bitstream. The information may be a 1-bit flag mtt_split_cu_binary_flag. On the basis of the flag, whether binary-tree partitioning or ternary-tree partitioning is applied to the coding block may be determined.

For example, it is shown in FIG. 5 that vertical binary-tree partitioning is applied to a coding block with a partition depth of one, vertical ternary-tree partitioning is applied to a left coding block among coding blocks generated as a result of the vertical binary-tree partitioning, and vertical binary-tree partitioning is applied to a right coding block.

Inter-prediction is a predictive coding mode in which the current block is predicted using information on the preceding picture. As an example, a block included in the preceding picture and placed at the same location as that of the current block (hereinafter referred to as a collocated block) may be set as a prediction block of the current block. A prediction block generated based on a block placed at the same location as that of the current block will be referred to as a collocated prediction block.

Meanwhile, when an object present in the preceding picture is moved to a different location in the current picture, the current block may be effectively predicted using the motion of the object. For example, when the motion direction and the size of the object can be found by comparing the preceding picture to the current picture, a prediction block (or a prediction picture) of the current block may be generated in consideration of motion information of the object. Hereinafter, the prediction block generated using the motion information may be referred to as a motion prediction block.

A residual block may be generated by subtracting the prediction block from the current block. At this time, when the motion of the object is present, it is possible to reduce the energy of the residual block, and accordingly it is possible to improve the compression performance of the residual block by using the motion prediction block instead of the collocated prediction block.

As described above, generating a prediction block using motion information may be referred to as motion compensation prediction. In most inter-prediction, a prediction block may be generated based on the motion compensation prediction.

The motion information may include at least one of a motion vector, a reference picture index, a prediction direction, or a bidirectional weight index. The motion vector indicates the motion direction and size of the object. The reference picture index specifies a reference picture of the current block among reference pictures included in a reference picture list. The prediction direction indicates one of unidirectional L0 prediction, unidirectional L1 prediction, or bidirectional prediction (L0 prediction and L1 prediction). At least one of L0 direction motion information or L1 direction motion information may be used depending on the prediction direction of the current block. The bidirectional weight index specifies a weight applied to an L0 prediction block and a weight applied to an L1 prediction block.

FIG. 6 is a flowchart of an inter-prediction method according to an embodiment of the present invention.

Referring to FIG. 6, the inter-prediction method includes determining an inter-prediction mode of the current block (S601), acquiring motion information of the current block according to the determined inter-prediction mode (S602), and performing motion compensation prediction on the current block on the basis of the acquired motion information (S603).

Here, the inter-prediction mode, which represents various techniques to determine the motion information of the current block, may include an inter-prediction mode using translation motion information and an inter-prediction mode using affine motion information. As an example, the inter-prediction mode using translation motion information may include a merge mode and a motion vector prediction mode, and the inter-prediction mode using affine motion information may include an affine merge mode and an affine motion vector prediction mode. The motion information of the current block may be determined on the basis of the information parsed from the bitstream or the blocks neighboring the current block according to the inter-prediction mode.

The inter-prediction method using affine motion information will be described in detail below.

FIG. 7 is a diagram illustrating a nonlinear motion of an object.

The motion of an object in an picture may occur nonlinearly. For example, as in the example shown in FIG. 7, the nonlinear motion of an object, such as zoom-in, zoom-out, rotation, and affine transform, may occur. When the nonlinear motion of the object occurs, the translation motion vector cannot effectively represent the motion of the object. Accordingly, it is possible to improve coding efficiency by using affine motion in a part where the nonlinear motion of the object has occurred instead of translation motion.

Figure 8:
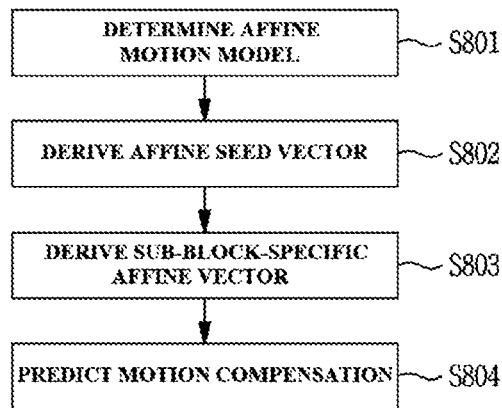
FIG. 8 is a flowchart of an inter-prediction method based on an affine motion according to an embodiment of the present invention.

FIG. 8 is a flowchart of an inter-prediction method based on an affine motion according to an embodiment of the present invention.

Whether an affine motion-based inter-prediction technique is applied to the current block may be determined based on information parsed from the bitstream. In detail, whether the affine motion-based inter-prediction technique is applied to the current block may be determined on the basis of at least one of a flag indicating whether the affine merge mode is applied to the current block or a flag indicating whether the affine motion vector prediction mode is applied to the current block.

When the affine motion-based inter-prediction technique is applied to the current block, an affine motion model of the current block may be determined (S801). At least one of a 6-parameter affine motion model or a 4-parameter affine motion model may be determined as the affine motion model. The 6-parameter affine motion model expresses an affine model using six parameters, and the 4-parameter affine motion model expresses an affine model using four parameters.

Equation 1 expresses an affine motion using six parameters. An affine motion represents a translation motion for a given region determined by affine seed vectors.

$$v_x = ax - by + e$$

$$v_y = cx + dy + f \qquad \text{[Equation 1]}$$

When an affine motion is expressed using six parameters, a complex motion may be expressed, but the number of bits required to code the parameters may increase, thereby reducing coding efficiency. Accordingly, an affine motion may be expressed using four parameters. Equation 2 expresses an affine motion using four parameters.

$$v_x = ax - by + e$$

$$v_y = bx + ay + f \qquad \text{[Equation 2]}$$

Information for determining the affine motion model of the current model may be encoded and signaled in a bitstream. As an example, the information may be a 1-bit flag "affine_type_flag". The value of the flag being 0 may indicate that the 4-parameter affine motion model is applied, and the value of the flag being 1 may indicate that the 6-parameter affine motion model is applied. The flag may be coded in units of slices, tiles, or blocks (e.g., coding blocks or coding tree units). When the flag is signaled at the slice level, the affine motion model determined at the slice level may be applied to all blocks belonging to the slice.

Alternatively, the affine motion model of the current block may be determined on the basis of the affine inter-prediction mode of the current block. As an example, when the affine merge mode is applied, it may be determined that the affine motion model of the current block is a 4-parameter motion model. On the other hand, when the affine motion vector prediction mode is applied, information for determining the affine motion model of the current block may be coded and signaled in a bitstream. As an example, when the affine motion vector prediction mode is applied to the current block, the affine motion model of the current block may be determined on the basis of a 1-bit flag "'affine_type_flag", Next, an affine seed vector of the current block may be derived (S802). When the 4-parameter affine motion model is selected, motion vectors at two control points of the current block may be derived. On the other hand, when the 6-parameter affine motion model is selected, motion vectors at three control points of the current block may be derived. A motion vector at a control point may be referred to as an affine seed vector. The control point may include at least one of the upper-left corner, the upper-right corner, or the lower-left corner of the current block.

Figures 9A, 9B:
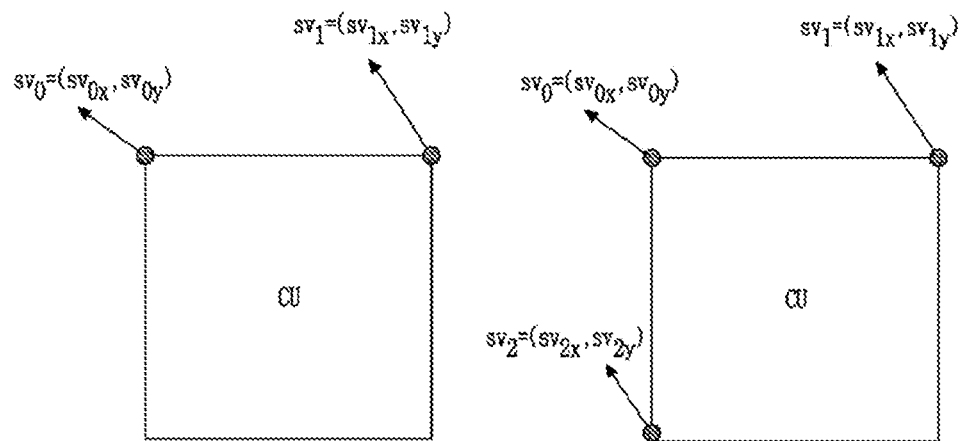
FIG. 9A to FIG. 9B are diagrams illustrating an affine seed vector for each affine motion model.

FIG. 9A to FIG. 9B are diagrams illustrating an affine seed vector for each affine motion model.

In the 4-parameter affine motion model, affine seed vectors may be derived for two of the upper-left corner, the upper-right corner, or the lower-left corner. For example, as in the example shown in FIG. 9A, when the 4-parameter affine motion model is selected, an affine vector may be derived using an affine seed vector $sv_0$ for the upper-left corner of the current block (e.g., an upper-left sample ($x_0$, $y_0$)) and an affine seed vector $sv_1$ for the upper-right corner of the current block (e.g., an upper-right sample ($x_1$, $y_1$)). The affine seed vector for the lower-left corner may be used instead of the affine seed vector for the upper-left corner, or the affine seed vector for the lower-left corner may be used instead of the affine seed vector for the upper-right corner.

In the 6-parameter affine motion model, affine seed vectors may be derived for the upper-left corner, the upper-right corner, and the lower-left corner. For example, as in the example shown in FIG. 9B, when the 6-parameter affine motion model is selected, an affine vector may be derived using the affine seed vector $sv_0$ for the upper-left corner of the current block (e.g., an upper-left sample ($x_0$, $y_0$)), the affine seed vector $sv_1$ for the upper-right corner of the current block (e.g., an upper-right sample ($x_1$, $y_1$)), and an affine seed vector $sv_2$ for the upper-left corner of the current block (e.g., an upper-left sample ($x_2$, $y_2$)).

In the following embodiment, under the 4-parameter affine motion model, the affine seed vectors for the upper-left control point and the upper-right control point will be referred to as a first affine seed vector and a second affine seed vector, respectively. In the following embodiments in which the first affine seed vector and the second affine seed vector are used, at least one of the first affine seed vector and the second affine seed vector may be replaced with an affine seed vector (a third affine seed vector) for a lower-left control point or an affine seed vector (a fourth affine seed vector) for a lower-right control point.

Also, under the 6-parameter affine motion model, the affine seed vectors of the upper-left control point, the upper-right control point, and the lower-left control point will be referred to as a first affine seed vector, a second affine seed vector, and a third affine seed vector, respectively. In the following embodiments in which the first affine seed vector, the second affine seed vector, and the third affine seed vector are used, at least one of the first affine seed vector, the second affine seed vector, and the third affine seed vector may be replaced with an affine seed vector (a fourth affine seed vector) for a lower-right control point.

An affine vector may be derived for each sub-block using the affine seed vectors (S803). Here, the affine vector indicates a translation motion vector derived based on the affine seed vectors. The affine vector of the sub-block may be referred to as an affine sub-block motion vector or a sub-block motion vector.

Figure 10:
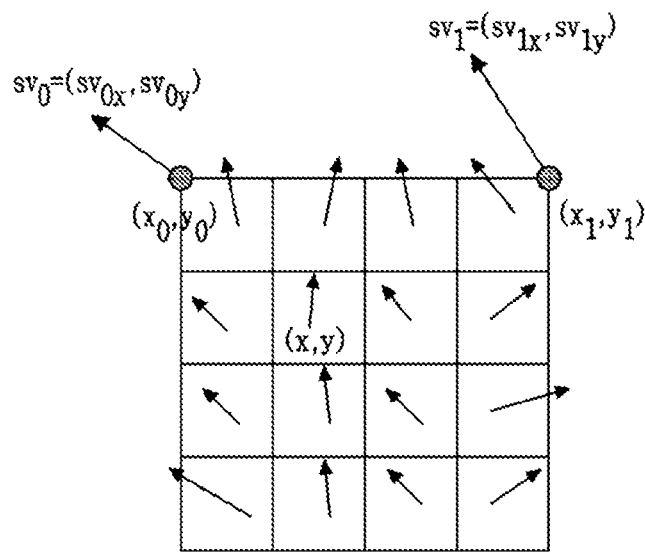
FIG. 10 is a diagram illustrating affine vectors of sub-blocks under a 4-parameter motion model.

FIG. 10 is a diagram illustrating affine vectors of sub-blocks under a 4-parameter motion model.

The affine vector of the sub-block may be derived on the basis of the location of a control point, the location of a sub-block, and an affine seed vector. As an example, Equation 3 shows an example of deriving an affine sub-block vector.

[Equation 3]

$$v_x = \frac{(sv_{1x} - sx_{0x})}{(x_1 - x_0)}(x - x_0) - \frac{(sv_{1y} - sv_{0y})}{(x_1 - x_0)}(y - y_0) + sv_{0x}$$

$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

In Equation 3, (x, y) represents the location of the sub-block. Here, the location of the sub-block indicates the location of a reference sample included in the sub-block. A reference sample may be a sample which is located at the upper-left corner of the sub-block or a sample in which at least one of an x-coordinate or a y-coordinate is located at the center. ($x_0$, $y_0$) represents the location of the first control point, and ($sv_{0x}$, $sv_{0y}$) represents the first affine seed vector. Also, ($x_1$, $y_1$) represents the location of the second control point, and ($sv_{1x}$, $sv_{1y}$) represents the second affine seed vector.

When the first control point and the second control point correspond to the upper-left corner and the upper-right corner of the current block, respectively, $x_1$-$x_0$ may be set to the same value as the width of the current block.

Subsequently, motion compensation prediction may be performed for each sub-block using the affine vector of the corresponding sub-block (S804). As a result of performing the motion compensation prediction, a prediction block for each sub-block may be generated. The prediction blocks of the sub-blocks may be set as the prediction block of the current block.

The affine seed vector of the current block may be derived on the basis of the affine seed vector of the block neighboring the current block. When the inter-prediction mode of the current block is the affine merge mode, the affine seed vector of a merge candidate included in a merge candidate list may be determined as the affine seed vector of the current block. Also, when the inter-prediction mode of the current block is the affine merge mode, motion information including at least one of a reference picture index, a specific direction prediction flag, or a bidirectional weight of the current block may also be set to be the same as the merge candidate.

The merge candidate may be derived on the basis of the neighboring block of the current block. The neighboring block may include at least one of a spatial neighboring block which is spatially adjacent to the current block and a temporal neighboring block which is included in a picture different from the current picture.

Figure 11:
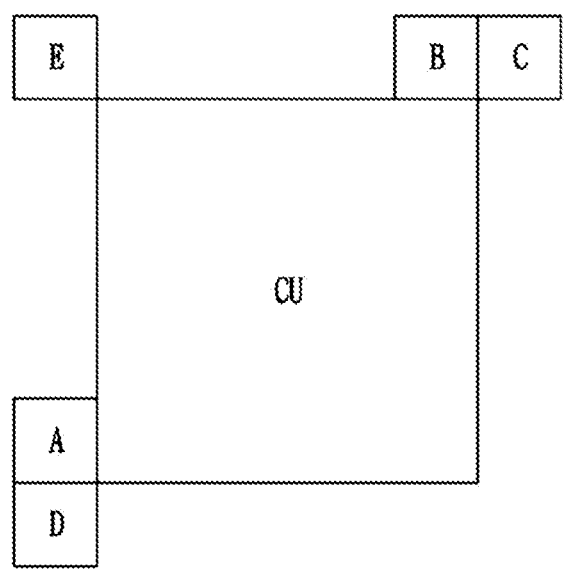
FIG. 11 is a diagram showing neighboring blocks that can be used to derive a merge candidate.

FIG. 11 is a diagram showing neighboring blocks that can be used to derive a merge candidate.

The neighboring block of the current block may include at least one of a neighboring block (A) adjacent to the left of the current block, a neighboring block (B) neighboring the top of the current block, a neighboring block (C) adjacent to the upper-right corner of the current block, a neighboring block (D) adjacent to the lower-left corner of the current block, or a neighboring block (E) adjacent to the upper-left corner of the current block. When an upper-left sample of the current block has coordinates ($x_0$, $y_0$), the left neighboring block A includes a sample located at ($x_0$−1, $y_0$+H−1), and the upper neighboring block B includes a sample located at ($x_0$+W−1, $y_0$−1). Here, W and H represent the width and height of the current block, respectively. The upper-right neighboring block C includes a sample located at ($x_0$+W, $y_0$−1), and the lower-left neighboring block D includes a sample located at ($x_0$−1, $y_0$+H). The upper-left neighboring block E includes a sample located at ($x_0$−1, $y_0$−1).

When the neighboring block is coded in the affine inter-prediction mode, the affine seed vector of the merge candidate may be derived on the basis of the affine seed vector of the corresponding neighboring block. Hereinafter, the neighboring block coded in the affine inter-prediction mode will be referred to as an affine neighboring block, and the merge candidate derived from the affine neighboring block will be referred to as an affine merge candidate.

The neighboring blocks may be discovered in a predefined scan order to generate an affine merge candidate for the current block. The scan order may be predefined in an encoder and a decoder. As an example, the neighboring blocks may be discovered in the order of A, B, C, D, and E. Also, affine merge candidates may be sequentially derived from the discovered affine neighboring blocks. Alternatively, the scan order may be adaptively determined on the basis of at least one of the size, shape, or affine motion model of the current block. That is, scan orders for blocks that differ in at least one of a size, shape, or affine motion model may be different from one another.

Alternatively, blocks located on top of the current block may be sequentially discovered to derive one affine merge candidate from an affine neighboring block that is first discovered, and blocks located to the left of the current block may be sequentially discovered to derive one affine merge candidate from an affine neighboring block that is found first. Here, the neighboring blocks located on top of the current block may include at least one of the neighboring block E, the neighboring block B, or the neighboring block C, and the blocks located to the left of the current block may include at least one of the block A or the block D. In this case, the neighboring block E may be classified as a block located to the left of the current block.

Although not shown, an affine merge candidate may be derived from a temporarily neighboring block of the current block. Here, the temporarily neighboring block may include a block placed at the same location in a collocated picture as the current block or a block adjacent to the block. In detail, when the temporarily neighboring block of the current block is coded in the affine inter-prediction mode, the affine merge candidate may be derived on the basis of the affine seed vector of the temporal affine merge candidate.

A merge candidate list including affine merge candidates may be generated, and the affine seed vector of one of the merge candidates included in the merge candidate list may be determined as the affine seed vector of the current block. To this end, index information for identifying one of the merge candidates may be coded and transmitted in a bitstream.

As another example, while neighboring blocks are being discovered in the scan order, the affine seed vector of the current block may be derived from the affine seed vector of an affine neighboring block that is found first.

The affine seed vector of the current block may be derived using the affine seed vector of the neighboring block in the affine merge mode.

When the inter-prediction mode of the current block is the affine motion vector prediction mode, the affine seed vector of a motion vector prediction candidate included in a motion vector prediction candidate may be determined as an affine seed vector prediction value of the current block. By adding an affine seed vector difference value to the affine seed vector prediction value, the affine seed vector of the current block may be derived.

An affine seed vector prediction candidate may be derived on the basis of a neighboring block of the current block. In detail, neighboring blocks located above the current block are discovered in a predetermined scan order, and a first affine seed vector prediction candidate may be derived from an affine neighboring block that is found first. Also, neighboring blocks located to the left of the current block are discovered in a predetermined scan order, and a second affine seed vector prediction candidate may be derived from an affine neighboring block that is found first.

Information for determining the affine seed vector difference value may be coded and transmitted in a bitstream. The information may include size information indicating the size of the affine seed vector difference value and sign information indicating the sign of the affine seed vector difference value. The affine seed vector difference value for each control point may be set to the same value. Alternatively, the affine seed vector difference value may be set differently depending on the control point.

As described above, the affine seed vector of the affine merge candidate or the affine seed vector prediction candidate is derived from the affine seed vector of the affine neighboring block, and the affine seed vector of the current block may be derived using the derived affine seed vector of the affine merge candidate or the affine seed vector prediction candidate. Alternatively, after affine neighboring blocks are discovered in a predetermined scan order, the affine seed vector of the current block may be derived from the affine seed vector of an affine neighboring block that is found first.

A method of deriving the affine seed vector of the current block, the affine merge candidate, or the affine seed vector prediction candidate from the affine seed vector of the affine neighboring block will be described in detail below. In the following embodiments, deriving the affine seed vector of the current block can also be understood as deriving the affine seed vector of the affine merge candidate or deriving the affine seed vector of the affine seed vector prediction candidate.

Figure 12:
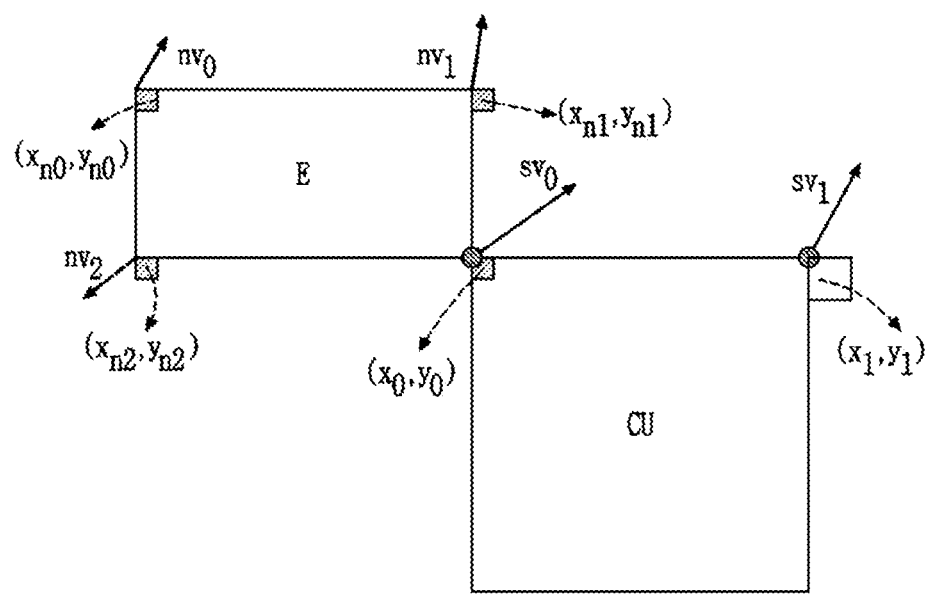
FIG. 12 is a diagram showing an example of deriving an affine seed vector of the current block on the basis of an affine seed vector of an affine neighboring block.

FIG. 12 is a diagram showing an example of deriving the affine seed vector of the current block on the basis of the affine seed vector of an affine neighboring block.

When a first affine seed vector $nv_0$ for an upper-left control point and a second affine seed vector $nv_1$ for an upper-right control point are stored for the affine neighboring block, a third affine seed vector $nv_2$ for a lower-left control point of the affine neighboring block may be derived on the basis of the first affine seed vector and the second affine seed vector. Equation 4 shows an example of deriving the third affine seed vector.

[Equation 4]

$$nv_{2x} = \frac{(nv_{1x} - nv_{0x})}{(x_{n1} - x_{n0})}(x_{n2} - x_{n0}) - \frac{(nv_{1y} - nv_{0y})}{(x_{n1} - x_{n0})}(y_{n2} - y_{n0}) + nv_{0x}$$

$$nv_{2y} = \frac{(nv_{1y} - nv_{0y})}{(x_{n1} - x_{n0})}(x_{n2} - x_{n0}) - \frac{(nv_{1x} - nv_{0x})}{(x_{n1} - x_{n0})}(y_{n2} - y_{n0}) + nv_{0y}$$

In Equation 4, $(nv_{0x}, nv_{0y})$ represents the first affine seed vector $nv_0$, $(nv_{1x}, nv_{1y})$ represents the second affine seed vector $nv_1$, and $(nv_{2x}, nv_{2y})$ represents the third affine seed vector $nv_2$. Also, $(x_{n0}, x_{n0})$ represents the location of the first control point, $(x_{n1}, x_{n1})$ represents the location of the second control point, and $(x_{n2}, x_{n2})$ represents the location of the third control point.

Subsequently, the affine seed vector of the current block may be derived using the first affine seed vector, the second affine seed vector, and the third affine seed vector. Equation 5 shows an example of deriving the first affine seed vector $v_0$ of the current block, and Equation 6 shows an example of deriving the second affine seed vector $v_1$ of the current block.

[Equation 5]

$$v_{0x} = \frac{(nv_{1x} - nv_{0x})}{(x_{n1} - x_{n0})}(x_0 - x_{n0}) - \frac{(nv_{2x} - nv_{0x})}{(y_{n2} - x_{n0})}(y_0 - y_{n0}) + nv_{0x}$$

$$v_{0y} = \frac{(nv_{1y} - nv_{0y})}{(x_{n1} - x_{n0})}(x_0 - x_{n0}) - \frac{(nv_{2y} - nv_{0y})}{(y_{n2} - x_{n0})}(y_0 - y_{n0}) + nv_{0y}$$

-continued

[Equation 6]

$$v_{1x} = \frac{(nv_{1x} - nv_{0x})}{(x_{n1} - x_{n0})}(x_1 - x_{n0}) - \frac{(nv_{2x} - nv_{0x})}{(y_{n2} - x_{n0})}(y_1 - y_{n0}) + nv_{0x}$$
$$v_{1y} = \frac{(nv_{1y} - nv_{0y})}{(x_{n1} - x_{n0})}(x_1 - x_{n0}) - \frac{(nv_{2y} - nv_{0y})}{(y_{n2} - x_{n0})}(y_1 - y_{n0}) + nv_{0y}$$

In Equation 5 and Equation 6, $(v_{0x}, v_{0y})$ represents the first affine seed vector $sv_0$ of the current block, and $(v_{1x}, v_{1y})$ represents the second affine seed vector $sv_1$ of the current block. Also, $(x_0, y_0)$ represents the location of the first control point, and $(x_1, y_1)$ represents the location of the second control point. As an example, the first control point indicates the upper-left corner of the current block, and the second control point indicates the upper-right corner of the current block.

In the above-described example, it has been described that affine seed vectors of the current block are derived using three affine seed vectors for an affine neighboring block. As another example, the affine seed vectors of the current block may be derived using only two of the affine seed vectors of the affine neighboring block.

Alternatively, the affine seed vectors of the current block may be derived using the fourth affine seed vector for the lower-right corner instead of the first affine seed vector for the upper-left corner, the second affine seed vector for the upper-right corner, or the third affine seed vector for the lower-left corner with respect to the affine neighboring block.

In particular, when the upper edge of the current block is contiguous to the upper edge of the coding tree unit and an affine seed vector for an upper control point (e.g., the upper-left corner or the upper-right corner) of an affine neighboring block adjacent to the top of the current block (hereinafter referred to as an upper affine neighboring block) is intended to be used, this affine seed vector has to be prestored in a memory. Accordingly, a problem may arise in which the number of line buffers increases. Thus, when the upper edge of the current block is contiguous to the upper edge of the coding tree unit, a setting may be made such that an affine seed vector for a lower control point (e.g., the lower-left corner or the lower-right corner) instead of the affine seed vector for the upper control point is used for the upper affine neighboring block. As an example, the affine seed vectors of the current block may be derived using the third affine seed vector for the lower-left corner and the fourth affine seed vector for the lower-right corner with respect to the upper affine neighboring block. In this case, the affine seed vectors for the lower corners may be derived by copying the affine seed vectors for the upper corners or from the affine seed vectors for the upper corners. As an example, the fourth affine seed vector for the lower-right corner may be used through the conversion or replacement of the first affine seed vector, the second affine seed vector, or the third affine seed vector.

Equation 7 and Equation 8 show examples of deriving the first affine seed vector and the second affine seed vector of the current block using the third affine seed vector for the lower-left control point of the neighboring affine vector and the fourth affine seed vector for the lower-right control point of the neighboring affine vector.

[Equation 7]

$$v_{0x} = \frac{(nv_{3x} - nv_{2x})}{(x_{n3} - x_{n2})}(x_0 - x_{n2}) - \frac{(nv_{3y} - nv_{2y})}{(x_{n3} - x_{n2})}(y_0 - y_{n2}) + nv_{2x}$$
$$v_{0y} = \frac{(nv_{3y} - nv_{2y})}{(x_{n3} - x_{n2})}(x_0 - x_{n2}) - \frac{(nv_{3x} - nv_{2x})}{(x_{n3} - x_{n2})}(y_0 - y_{n2}) + nv_{2y}$$

[Equation 8]

$$v_{1x} = \frac{(nv_{3x} - nv_{2x})}{(x_{n3} - x_{n2})}(x_1 - x_{n2}) - \frac{(nv_{3y} - nv_{2y})}{(x_{n3} - x_{n2})}(y_1 - y_{n2}) + nv_{2x}$$
$$v_{1y} = \frac{(nv_{3y} - nv_{2y})}{(x_{n3} - x_{n2})}(x_1 - x_{n2}) - \frac{(nv_{3x} - nv_{2x})}{(x_{n3} - x_{n2})}(y_1 - y_{n2}) + nv_{2y}$$

In Equation 7 and Equation 8, $(x_{n2}, y_{n2})$ represents the coordinates of the lower-left control point of the affine neighboring block, and $(x_{n3}, y_{n3})$ represents the coordinates of the lower-right control point of the affine neighboring block. $(x_0, y_0)$ represents the coordinates of the upper-left control point of the current block, and $(x_1, y_1)$ represents the coordinates of the upper-right control point of the current block. $(nv_{2x}, nv_{2y})$ represents the affine seed vector for the lower-left control point (i.e., the third affine seed vector) of the affine neighboring block, and $(nv_{3x}, nv_{3y})$ represents the affine seed vector for the lower-right control point (i.e., the fourth affine seed vector) of the affine neighboring block. $(v_{0x}, v_{0y})$ represents the affine seed vector for the upper-left control point (i.e., the first affine seed vector) of the current block, and $(v_{1x}, v_{1y})$ represents the affine seed vector for the upper-right control point (i.e., the second affine seed vector) of the current block.

A division operation included in Equation 7 and Equation 8 may be changed to a bit shift operation. The bit shift operation may be performed on the basis of a value derived by the width (i.e., $x_{n3} - x_{n2}$) between the lower-left control point and the lower-right control point.

As in the above example, the affine seed vectors of the current block may be derived from affine seed vectors of the affine neighboring block where encoding or decoding is completed. To this end, the affine seed vectors of the affine neighboring block where encoding or decoding is completed should be stored in a memory. However, since the affine seed vectors of the affine neighboring block are stored in the memory in addition to translation motion vectors (i.e., affine vectors) of sub-blocks included in the affine neighboring block, there is a problem in which the memory usage increases. To solve this problem, the affine seed vector of the current block may be derived using a motion vector of a sub-block adjacent to a control point of the affine neighboring block instead of the affine seed vector of the affine neighboring block. That is, the motion vector of the sub-block adjacent to the control point of the affine neighboring block may be set as the affine seed vector of the affine neighboring block. Here, the sub-block may be a block with a predefined size or shape in an encoder and a decoder and may be a block with a basic size or shape in which a motion vector is stored. As an example, the sub-block may be a 4×4 square block. Alternatively, a motion vector for a specific sample location may be set as the affine seed vector of the affine neighboring block.

Figure 13:
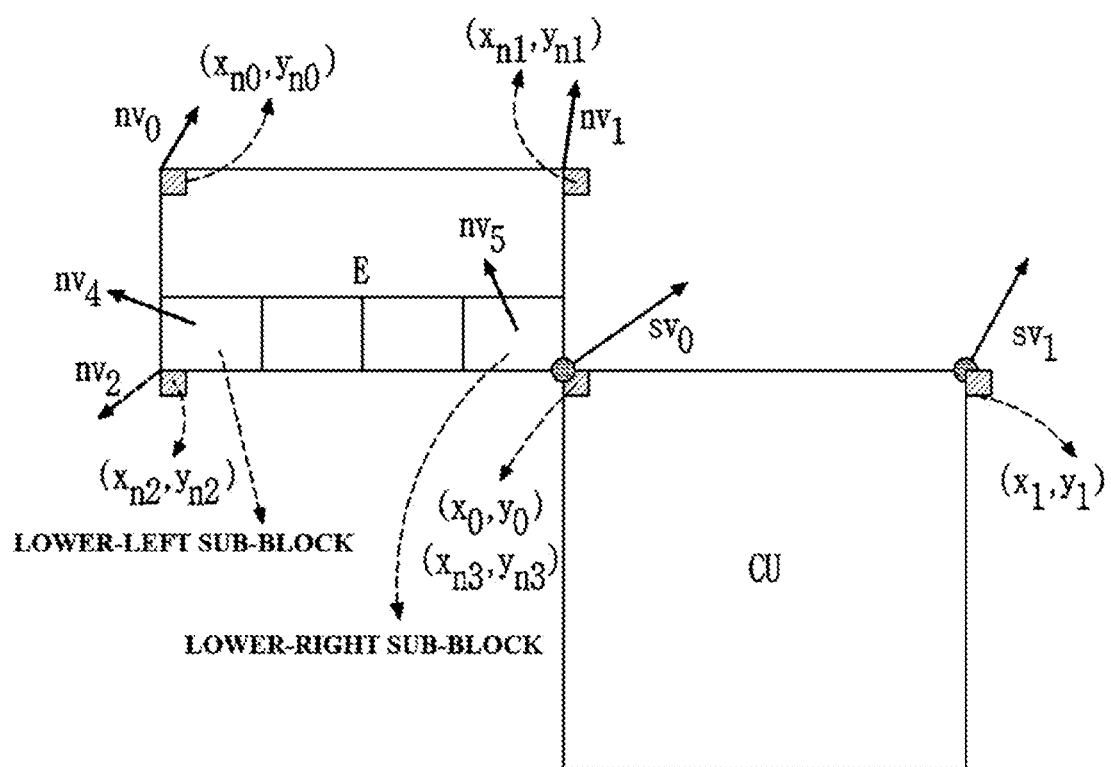
FIG. 13 is a diagram showing an example of setting a motion vector of a sub-block as an affine seed vector of an affine neighboring block.

FIG. 13 is a diagram showing an example of setting a motion vector of a sub-block as an affine seed vector of an affine neighboring block.

A motion vector of a sub-block adjacent to a control point may be set as an affine seed vector of the corresponding control point. As an example, as in an example shown in FIG. 13, a motion vector $(nv_{4x}, nv_{4y})$ of a sub-block adjacent to the lower-left corner (a lower-left sub-block) of the affine neighboring block may be set as an affine seed vector ($nv_{2x}$, $nv_{2y}$) for a lower-left control point, and a motion vector ($nv_{5x}$, $nv_{5y}$) of a sub-block adjacent to the lower-right corner (a lower-right sub-block) may be set as the affine seed vector ($nv_{3x}$, $nv_{3y}$) for a control point at the lower-right corner. Here, the lower-left sub-block may refer to a sub-block including a sample adjacent to a lower-left control point ($x_{n2}$, $y_{n2}$) in the neighboring affine block (e.g., a sample located at ($x_{n2}$, $y_{n2}-1$)), and the lower-right sub-block may refer to a block including a sample adjacent to a lower-right control point ($x_{n3}$, $y_{n3}$) in the neighboring affine block (e.g., a sample located at ($x_{n3}-1$, $y_{n3}-1$)). When the affine seed vectors of the current block are derived on the basis of Equation 7 and Equation 8, the third affine seed vector of the affine neighboring block may be replaced with the motion vector of the lower-left sub-block, and the fourth affine seed vector may be replaced with the motion vector of the lower-right sub-block.

In the following embodiment, a sub-block used as the affine seed vector of the affine neighboring block will be referred to as an affine sub-block.

According to an embodiment of the present invention, the affine sub-block may be determined on the basis of a sample located at a specific location. As an example, a sub-block including a sample located at a specific location may be set as the affine sub-block. Hereinafter, the sample located at the specific location will be referred to as a reference sample. In addition, a reference sample used to determine an affine sub-block for the lower-left control point will be referred to as a lower-left reference sample, and a reference sample used to determine an affine sub-block for the lower-right control point will be referred to as a lower-right reference sample.

The lower-left reference sample and the lower-right reference sample may be selected from samples included in the affine neighboring block. As an example, at least one of an upper-left sample, a lower-left sample, an upper-right sample, or a lower-left sample of the lower-left sub-block is set as the lower-left reference sample, and at least one of an upper-left sample, a lower-left sample, an upper-right sample, or a lower-left sample of the lower-right sub-block is set as the lower-right reference sample. Accordingly, motion vectors of the lower-left sub-block including the lower-left reference sample and the lower-right sub-block including the lower-right reference sample may be set as the affine seed vector for the lower-left control point and the affine seed vector for the lower-right point, respectively.

As another example, at least one of the lower-left reference sample or the lower-right reference sample may be set as a sample located outside the affine neighboring block. This will be described in detail below with reference to FIGS. 14 to 16.

FIG. 14A to FIG. 14B, FIG. 15A to FIG. 15B and FIG. 16A to FIG. 16B are diagrams showing the location of a reference sample.

Figure 14A:
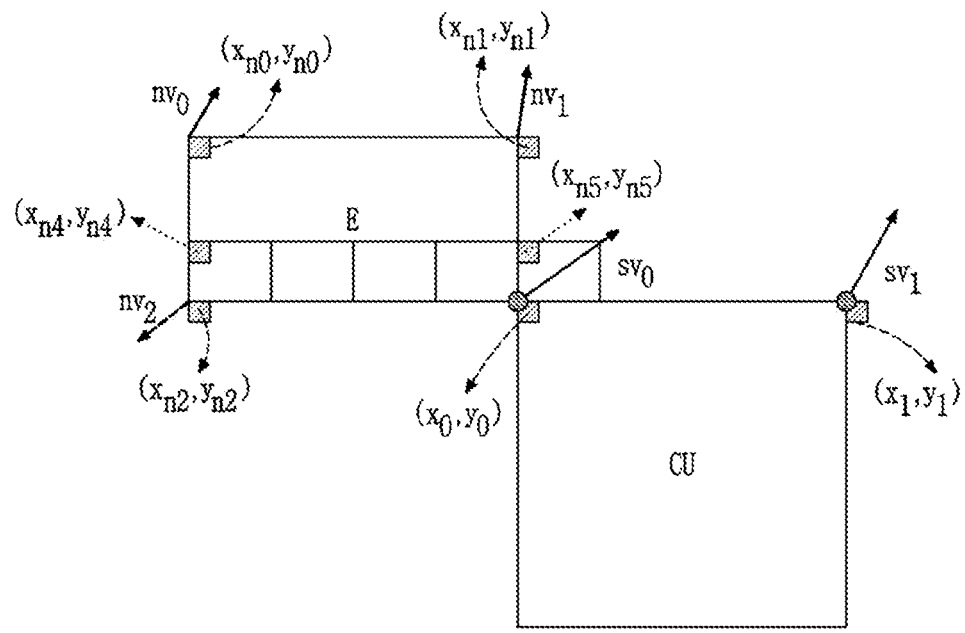
FIG. 14A to FIG. 14B are diagrams showing the location of a reference sample.

As in the example shown in FIG. 14A, for the lower-left control point, an upper-left sample of the lower-left sub-block may be set as the reference sample ($x_{n4}$, $y_{n4}$). Thus, the lower-left sub-block including the reference sample ($x_{n4}$, $y_{n4}$) may be set as the affine sub-block for the lower-left control point.

For the lower-right control point, a sample located to the right of an upper-right sample of the lower-right sub-block may be set as the reference sample ($x_{n5}$, $y_{n5}$). Thus, the sub-block adjacent to the right of the lower-right sub-block including the reference sample ($x_{n5}$, $y_{n5}$) may be set as the affine sub-block for the lower-right control point.

Figure 14B:
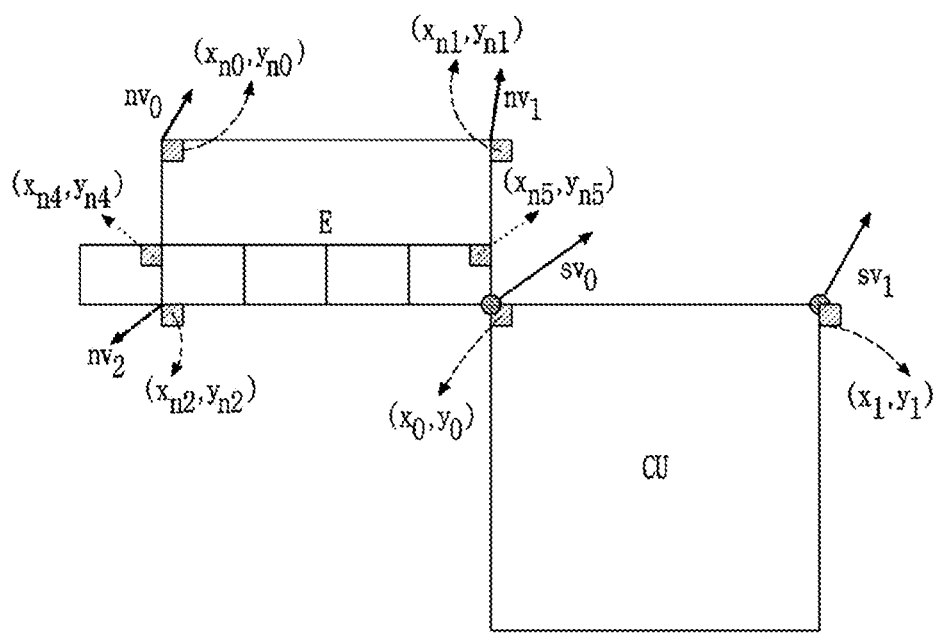

Alternatively, as in the example shown in FIG. 14B, for the lower-left control point, a sample located to the left of an upper-left sample of the lower-left sub-block may be set as the reference sample ($x_{n4}$, $y_{n4}$). Thus, the sub-block adjacent to the left of the lower-left sub-block including the reference sample ($x_{n4}$, $y_{n4}$) may be set as the affine sub-block for the lower-left control point.

For the lower-right control point, an upper-right sample of the lower-right sub-block may be set as the reference sample ($x_{n5}$, $y_{n5}$). Thus, the lower-right sub-block including the reference sample ($x_{n5}$, $y_{n5}$) may be set as the affine sub-block for the lower-right control point.

Figure 15A:
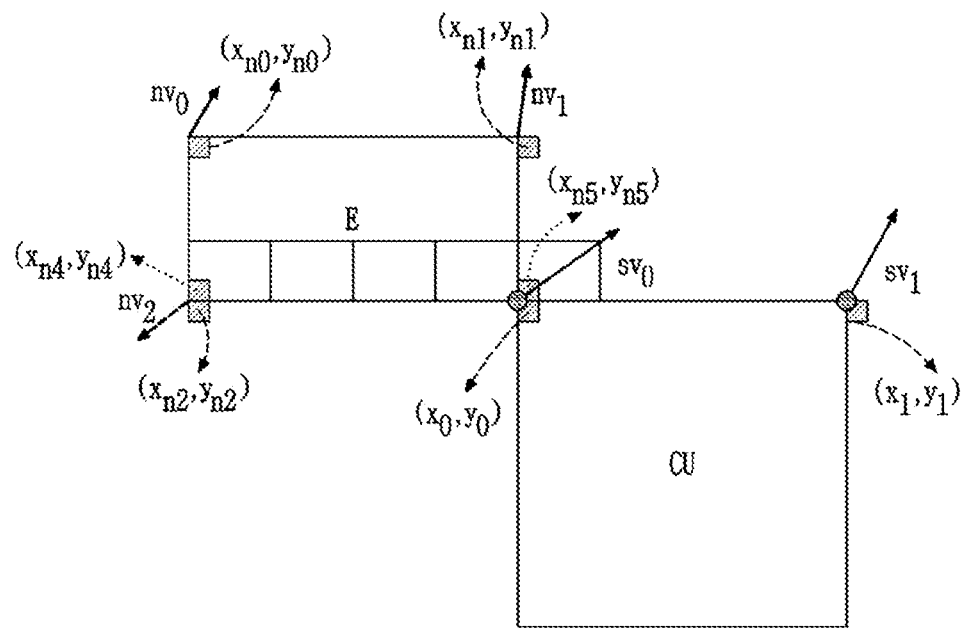
FIG. 15A to FIG. 15B are diagrams showing the location of a reference sample.

Alternatively, as in the example shown in FIG. 15A, for the lower-left control point, a lower-left sample of the lower-left sub-block may be set as the reference sample ($x_{n4}$, $y_{n4}$). Thus, the lower-left sub-block including the reference sample ($x_{n4}$, $y_{n4}$) may be set as the affine sub-block for the lower-left control point.

For the lower-right control point, a sample located to the right of a lower-right sample of the lower-right sub-block may be set as the reference sample ($x_{n5}$, $y_{n5}$). Thus, the sub-block adjacent to the right of the lower-right sub-block including the reference sample ($x_{n5}$, $y_{n5}$) may be set as the affine sub-block for the lower-right control point.

Figure 15B:
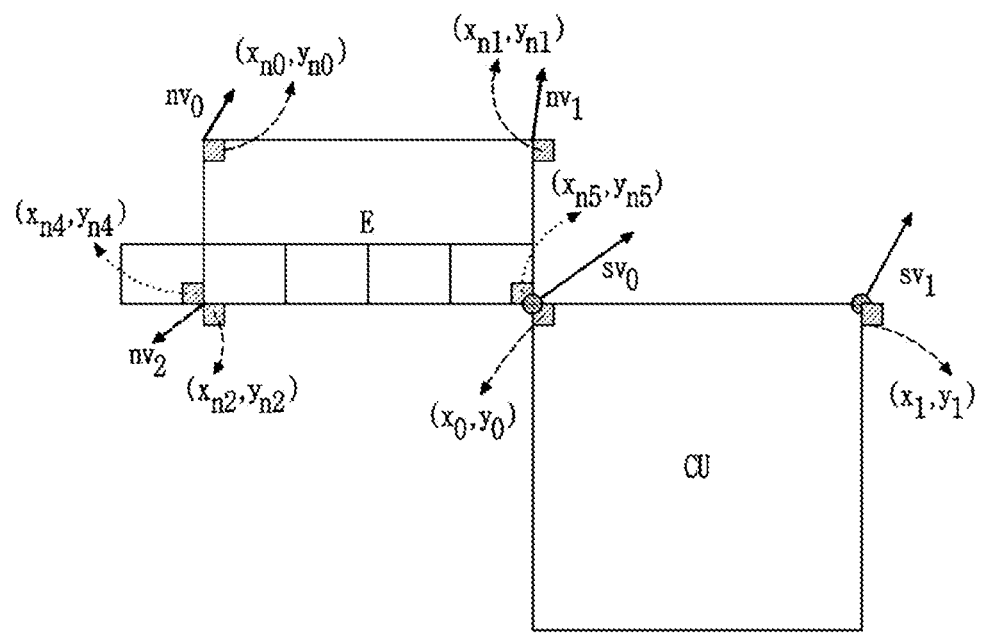

Alternatively, as in the example shown in FIG. 15B, for the lower-left control point, a sample located to the left of a lower-left sample of the lower-left sub-block may be set as the reference sample ($x_{n4}$, $y_{n4}$). Thus, the sub-block adjacent to the left of the lower-left sub-block including the reference sample ($x_{n4}$, $y_{n4}$) may be set as the affine sub-block for the lower-left control point.

For the lower-right control point, a lower-right sample of the lower-right sub-block may be set as the reference sample ($x_{n5}$, $y_{n5}$). Thus, the lower-right sub-block including the reference sample ($x_{n5}$, $y_{n5}$) may be set as the affine sub-block for the lower-right control point.

Figure 16A:
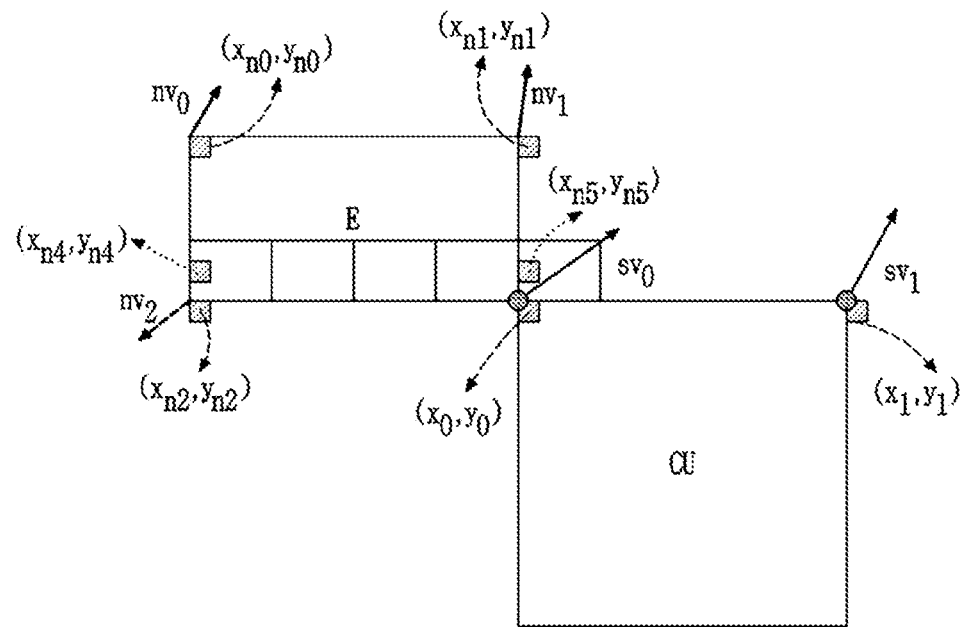
FIG. 16A to FIG. 16B are diagrams showing the location of a reference sample.

Alternatively, as in the example shown in FIG. 16A, for the lower-left control point, a sample located between the upper-left sample and the lower-left sample of the lower-left sub-block (e.g., a middle left sample) may be set as the reference sample ($x_{n4}$, $y_{n4}$). Thus, the lower-left sub-block including the reference sample ($x_{n4}$, $y_{n4}$) may be set as the affine sub-block for the lower-left control point.

For the lower-right control point, a sample located to the right of a sample located between the upper-right sample and the lower-right sample of the lower-right sub-block (e.g., a middle right sample) may be set as the reference sample ($x_{n5}$, $y_{n5}$). Thus, the sub-block adjacent to the right of the lower-right sub-block including the reference sample ($x_{n5}$, $y_{n5}$) may be set as the affine sub-block for the lower-right control point.

Figure 16B:
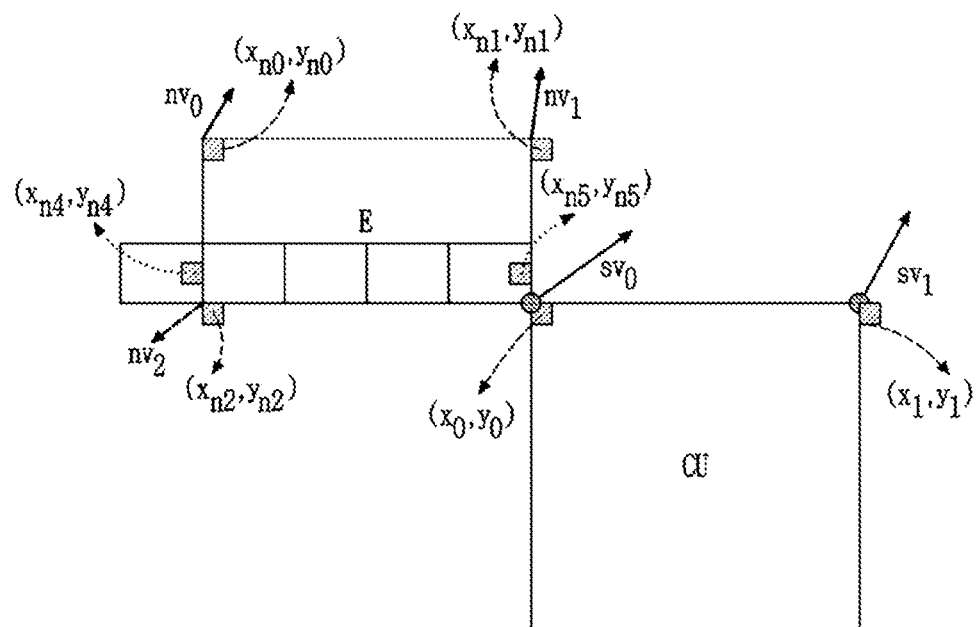

Alternatively, as in the example shown in FIG. 16B, for the lower-left control point, a sample located to the left of the sample located between the upper-left sample and the lower-left sample of the lower-left sub-block may be set as the reference sample ($x_{n4}$, $y_{n4}$). Thus, the sub-block adjacent to the left of the lower-left sub-block including the reference sample ($x_{n4}$, $y_{n4}$) may be set as the affine sub-block for the lower-left control point.

For the lower-right control point, a sample located between the upper-right sample and the lower-right sample of the lower-right sub-block may be set as the reference sample ($x_{n5}$, $y_{n5}$). Thus, the lower-right sub-block including the reference sample ($x_{n5}$, $y_{n5}$) may be set as the affine sub-block for the lower-right control point.

When the affine seed vectors of the current block are derived on the basis of Equation 7 and Equation 8, the third affine seed vector of the affine neighboring block may be replaced with the motion vector of the affine sub-block for the lower-left control point, and the fourth affine seed vector may be replaced with the motion vector of the affine sub-block for the lower-right control point. Also, the location of the lower-left control point may be replaced with the location of the lower-left reference sample, and the location of the lower-right control point may be replaced with the location of the lower-right reference sample.

Unlike those described above with reference to FIGS. 14 to 16, a sub-block including a sample adjacent to the reference sample may be set as the affine sub-block. In detail, a sample located outside the affine neighboring sub-block may be set as the reference sample, and a sub-block included in the affine neighboring block may be set as the affine sub-block. For example, in the example shown in FIG. 14A, a sample located to the right of the upper-right sample of the lower-right sub-block may be set as the reference sample $(x_{n5}, y_{n5})$, and the lower-right sub-block may be set as the affine sub-block for the lower-right corner. Alternatively, in the example shown in FIG. 14B, a sample located to the left of the upper-left sample of the lower-left sub-block may be set as the reference sample $(x_{n4}, y_{n4})$, and the lower-left sub-block may be set as the affine sub-block for the lower-left corner.

The above-described embodiments may also be applied to FIGS. 15 and 16. That is, in the example shown in FIG. 15A or 16A, a sample located to the right of the lower-right sample or the middle right sample of the lower-right sub-block may be set as the reference sample $(x_{n5}, y_{n5})$, and the lower-right sub-block may be set as the affine sub-block for the lower-right corner. Alternatively, in the example shown in FIG. 15B or 16B, a sample located to the left of the lower-left sample or the middle left sample of the lower-left sub-block may be set as the reference sample $(x_{n4}, y_{n4})$, and the lower-left sub-block may be set as the affine sub-block for the lower-left corner.

As in the above example, the affine seed vector of the affine neighboring block may be derived using the motion vector of the affine sub-block. To this end, in the case of a block where encoding or decoding is completed, a motion vector may be stored in units of sub-blocks.

As another example, after a minimum number of affine seed vectors are stored for the affine neighboring block, the motion vector of the affine sub-block may be derived using the stored affine seed vectors.

Equation 9 and Equation 10 show an example of deriving the motion vector of the affine sub-block using the affine seed vectors of the affine neighboring block.

[Equation 9]

$$nv_{4x} = \frac{(nv_{1x} - nv_{0x})}{(x_{n1} - x_{n0})}(x_{n4} - x_{n0}) - \frac{(nv_{1y} - nv_{0y})}{(x_{n1} - x_{n0})}(y_{n4} - y_{n0}) + nv_{0x}$$

$$nv_{4y} = \frac{(nv_{1y} - nv_{0y})}{(X_{n1} - x_{n0})}(x_{n4} - x_{n0}) - \frac{(nv_{1x} - nv_{0x})}{(x_{n1} - x_{n0})}(y_{n4} - y_{n0}) + nv_{0y}$$

[Equation 10]

$$nv_{5x} = \frac{(nv_{1x} - nv_{0x})}{(x_{n1} - x_{n0})}(x_{n5} - x_{n0}) - \frac{(nv_{1y} - nv_{0y})}{(x_{n1} - x_{n0})}(y_{n5} - y_{n0}) + nv_{0x}$$

$$nv_{5y} = \frac{(nv_{1y} - nv_{0y})}{(x_{n1} - x_{n0})}(x_{n5} - x_{n0}) - \frac{(nv_{1x} - nv_{0x})}{(x_{n1} - x_{n0})}(y_{n5} - y_{n0}) + nv_{0y}$$

In Equation 9 and Equation 10, $(nv_{4x}, nv_{4y})$ represents the motion vector of the affine sub-block for the lower-left control point, and $(nv_{5x}, nv_{5y})$ represents the motion vector of the affine sub-block for the lower-right control point. Since the motion vector of the affine sub-block and the affine seed vector of the control point are set to be the same as each other, $(nv_{4x}, nv_{4y})$ may be replaced with the affine seed vector $(nv_{2x}, nv_{2y})$ for the lower-left control point, and $(nv_{5x}, nv_{5y})$ may be replaced with the affine seed vector $(nv_{3x}, nv_{3y})$ for the lower-right control point.

$(x_{n4}, y_{n4})$ represents the location of the reference sample with respect to the lower-left sub-block. Alternatively, the central location of the lower-left sub-block or the location of the lower-left control point may be used instead. $(x_{n5}, y_{n5})$ represents the location of the reference sample with respect to the lower-right sub-block. Alternatively, the central location of the lower-right sub-block or the location of the lower-right control point may be used instead.

Equation 9 and Equation 10 may be applied to a case in which the current block is not contiguous to the edge of the coding tree unit. When the current block is contiguous to the upper edge of the coding tree unit, the translation motion vector of the affine sub-block determined on the basis of the lower-left reference sample may be set as the third affine seed vector, and translation motion vector of the affine sub-block determined on the basis of the lower-right reference sample may be set as the fourth affine seed vector instead of using Equation 9 and Equation 10.

In Equation 7 and Equation 8, $(x_{n3} - x_{n2})$ represents the width between the lower-left control point and the lower-right control point. As described above, $x_{n3}$ may be replaced with the location $x_{n5}$ of the lower-right reference sample, and $x_{n2}$ may be replaced with the location $x_{n4}$ of the lower-left reference sample. Hereinafter, $(x_{n3} - x_{n2})$ or a value (e.g., $(x_{n5} - x_{n4})$) acquired by replacing the location of the above Equation with the location of the reference samples will be defined as a variable $W_{seed}$, and the variable will be referred to as a sub seed vector width.

Depending on the location of the reference samples, the sub seed vector width may not be a power of 2 (e.g., $2^n$). As an example, when the lower-left sample of the lower-left sub-block is set as the lower-left reference sample and the lower-right sample of the lower-right sub-block is set as the lower-right reference sample, the sub seed vector width is not a multiple of 2. When the sub seed vector width is not a power of 2, the sub seed vector width may be transformed into a power of 2. The transform may include adding or subtracting an offset to or from the sub seed vector width or using the location of a sample adjacent to the reference sample instead of the location of the reference sample. As an example, a transformed sub seed vector width may be derived by adding one to the width between the lower-left reference sample and the lower-right reference sample. Alternatively, the width between the lower-left reference sample and a neighboring reference sample adjacent to the right of the lower-right reference sample may be set as the transformed sub seed vector width. Subsequently, the affine seed vector of the current block may be derived by applying the transformed sub seed vector width to Equation 7 and Equation 8.

A division operation included in Equation 7 and Equation 8 may be changed to a bit shift operation. The bit shift operation may be performed on the basis of a value derived by the transformed sub seed vector width (i.e., a value expressed as a power of 2).

When the reference sample used to determine the affine sub-block does not belong to the affine neighboring block, the affine seed vector of the affine neighboring block may be derived on the basis of a sample adjacent to the reference sample among the samples included in the affine neighboring block. Specifically, a translation motion vector of a sub-block including the sample adjacent to the reference sample (hereinafter referred to as a neighboring reference sample) in the affine neighboring block may be set as the affine seed vector of the affine neighboring block. As described above, a method of deriving the affine seed vector using the neighboring reference sample may be defined as a modified affine merge vector derivation method.

Figure 17:
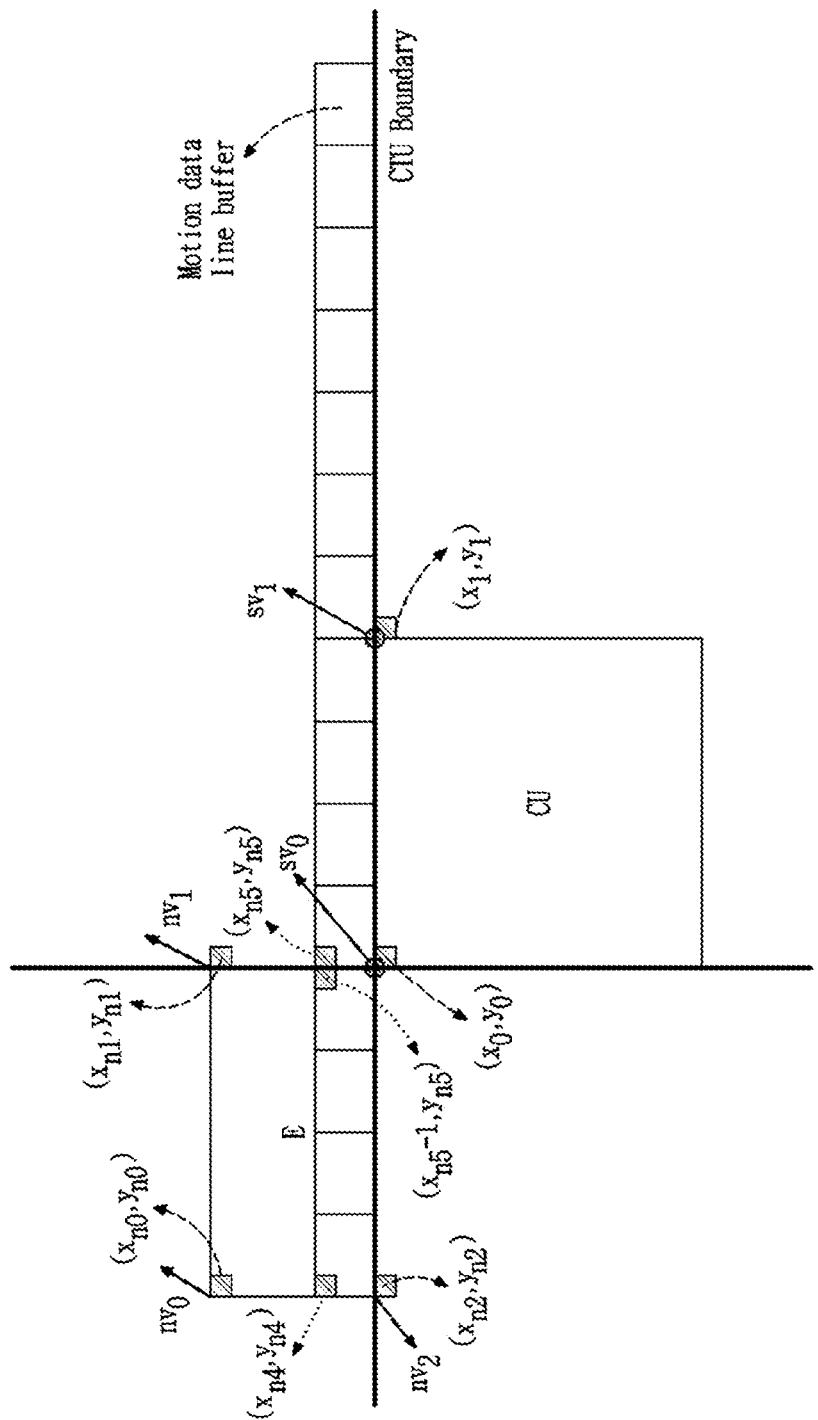
FIG. 17 is a diagram showing an example in which a modified affine merge vector deriving method is applied.

FIG. 17 is a diagram showing an example in which a modified affine merge vector deriving method is applied.

When the lower-right reference sample $(x_{n5}, y_{n5})$ of the affine neighboring block E does not belong to an affine nearby block, the affine seed vector may be derived on the basis of a sample $(x_{n5}-1, y_{n5})$ adjacent to the left of the lower-right reference sample among the samples included in the affine neighboring block. Specifically, the translation motion vector of the sub-block including the neighboring reference sample $(x_{n5}-1, y_{n5})$ may be set as the affine seed vector of the lower-right control point.

In the example shown in FIG. 17, it is shown that a sample adjacent to the right of the upper-right sample of the lower-right sub-block is the lower-right reference sample. The affine seed vector may be derived on the basis of the sample adjacent to the left of the neighboring reference sample even when a sample adjacent to the right of the lower-right sample of the lower-right sub-block or a sample adjacent to the right of the middle right sample of the lower-right sub-block is set as the lower-right reference sample.

Also, the affine seed vector may be derived on the basis of a sample adjacent to the right of the lower-left reference sample according to the above embodiment even when the lower-left reference sample does not belong to the affine neighboring block.

By differently setting the location of the reference sample and the sub-block for deriving the affine seed vector, the sub seed vector width may be set to be a power of 2.

Alternatively, affine seed vectors may be derived on the basis of the width of a neighboring block while the motion vectors of the lower-left sub-block and the lower-right sub-block are used.

Figure 18:
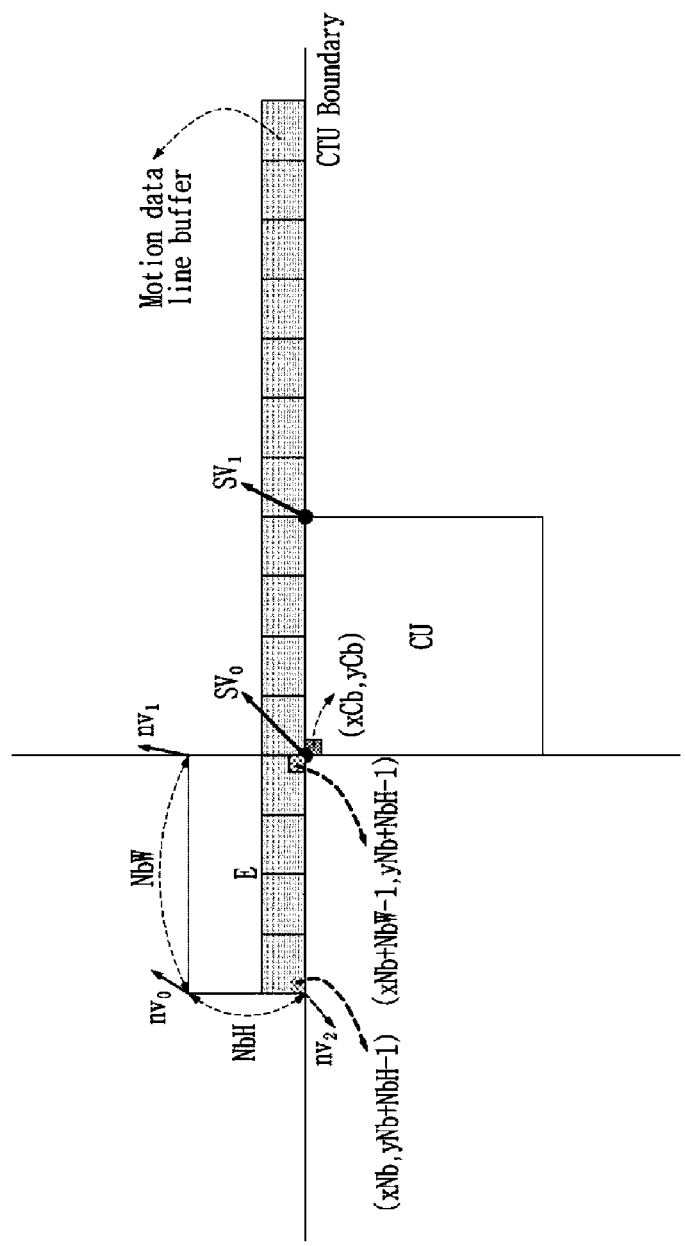
FIG. 18 is a diagram showing an example of deriving an affine seed vector of an affine merge candidate on the basis of motion vectors of sub-blocks belonging to a neighboring block.

FIG. 18 is a diagram showing an example of deriving an affine seed vector of an affine merge candidate on the basis of motion vectors of sub-blocks belonging to a neighboring block.

When the upper edge of the current block is contiguous to the edge of the coding tree unit, the affine seed vector of the affine merge candidate may be derived on the basis of the motion vectors of the lower-left sub-block and the lower-right sub-block of the upper neighboring block located above the current block. When it is assumed that the location of the upper-left sample of the upper neighboring block is (xNb, yNb) and the width and height of the upper neighboring block are NbW and NbH, respectively, the lower-left sub-block may include a sample located at (xNb, yNb+yNbH−1), and the lower-right sub-block may include a sample located at (xNb+NbW−1, yNb+NbH−1).

The affine seed blocks of the affine merge candidate may be derived on the basis of the width of the neighboring block and a difference in coordinates between the current block and the neighboring block. As an example, the affine seed vectors of the affine merge candidate may be derived on the basis of Equations 11 to 13 below.

$$v_{0x}=V_{LBx}<<7+((V_{RBx}-V_{LBx})<<(7-\log_2(NbW))*(xCb-xNb) \quad \text{[Equation 10]}$$

$$v_{0y}=V_{LBy}<<7+((V_{RBy}-V_{LBy})<<(7-\log_2(NbW))*(xCb-xNb) \quad \text{[Equation 11]}$$

$$v_{1x}=V_{LBx}<<7+((V_{RBx}-V_{LBx})<<(7-\log_2(NbW))*(xCb+xCbW-xNb)$$

$$v_{1y}=V_{LBy}<<7+((V_{RBy}-V_{LBy})<<(7-\log_2(NbW))*(xCb+xCbW-xNb) \quad \text{[Equation 12]}$$

$$v_{2x}=V_{LBx}<<7+((V_{RBx}-V_{LBx})<<(7-\log_2(NbW))*(xCb+xCbW-xNb)+((V_{LBy}-V_{RBy})<<(7-\log_2(NbW))*xCbH$$

$$v_{2y}=V_{LBy}<<7+((V_{RBy}-V_{LBy})<<(7-\log_2(NbW))*(xCb+xCbW-xNb)+((V_{LBx}-V_{RBx})<<(7-\log_2(NbW))*xCbH \quad \text{[Equation 13]}$$

In Equations 11 to 13, $(v_{0x}, v_{0y})$ represents the first affine seed vector, $(v_{1x}, v_{1y})$ represents the second affine seed vector, and $(v_{2x}, v_{2y})$ represents the third affine seed vector. $V_{LBx}$ represents the horizontal component motion vector of the lower-left sub-block, and $V_{LBy}$ represents the vertical component motion vector of the lower-left sub-block. $V_{RBx}$ represents the horizontal component motion vector of the lower-right sub-block, and $V_{RBy}$ represents the vertical component motion vector of the lower-right sub-block. NbW represents the width of the neighboring block, and xCbW and xCbH represent the width and height of the current block, respectively. xCb represents the x-coordinate of the upper-left sample of the current block, and xNb represents the x-coordinate of the upper-left sample of the neighboring block.

An affine merge candidate may be generated to combine a motion vector of a second neighboring block with affine seed vectors derived from a first neighboring block. For example, in the example shown in FIG. 18, the third affine seed vector of the affine merge candidate may be derived on the basis of a motion vector of a sub-block located on the left of the current block instead of on the basis of motion vectors of the lower-left sub-block and the lower-right sub-block.

Figure 19:
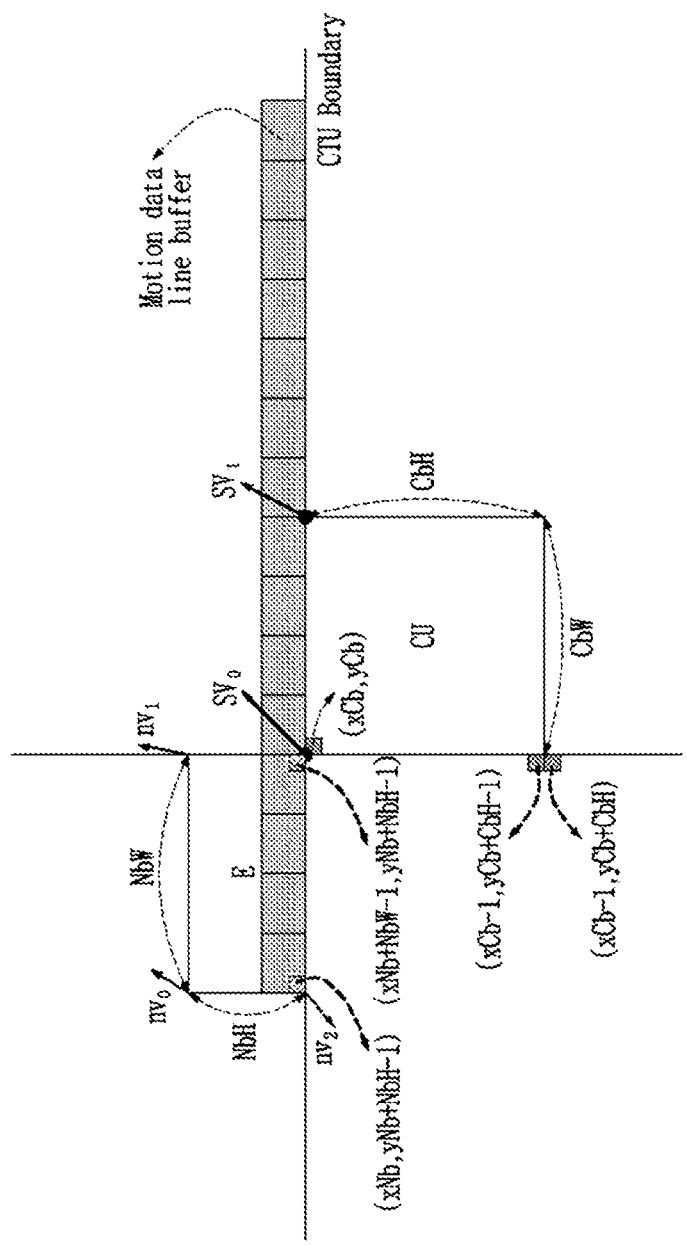
FIG. 19 is a diagram showing an example of deriving affine seed vectors of an affine merge candidate on the basis of motion vectors of sub-blocks located on the left of the current block.

FIG. 19 is a diagram showing an example of deriving affine seed vectors of an affine merge candidate on the basis of motion vectors of sub-blocks located on the left of the current block.

The affine seed vectors of the affine merge candidate may be derived on the basis of the motion vectors of the lower-left sub-block and the lower-right sub-block of the upper neighboring block located above the current block. In detail, the first affine seed vector and the second affine seed vector of the affine merge candidate may be derived on the basis of the motion vectors of the lower-left sub-block and the lower-right sub-block. As an example, the first affine seed vector and the second affine seed vector of the affine merge candidate may be derived on the basis of Equations 11 and 12.

The third affine seed vector of the affine merge candidate may be derived on the basis of the motion vector of a neighboring block adjacent to the left of the current block. As an example, a motion vector of a neighboring block adjacent to the left of the current block or a neighboring block adjacent to the lower-left corner of the current block may be set as the third affine seed vector. The neighboring block adjacent to the left of the current block may include a sample located at (xCb−1, yCb+CbH−1), and the neighboring block adjacent to the lower-left corner of the current block may include a sample located at (xCb−1, yCb+CbH). Equation 14 and Equation 15 show an example of setting the motion vector of the neighboring block located to the left of the current block as the third affine seed vector.

$$v_{2x}=V_{Leftx}$$

$$v_{2y}=V_{Lefty} \quad \text{[Equation 14]}$$

$$v_{2x}=V_{LBx}$$

$$v_{2y}=V_{LBy} \quad \text{[Equation 15]}$$

In Equation 14, $V_{Leftx}$ represents the horizontal motion vector of the neighboring block adjacent to the left of the current block, and $V_{Lefty}$ represents the vertical motion vector of the neighboring block adjacent to the left of the current block. In Equation 15, $V_{LBx}$ represents the horizontal motion vector of the neighboring block adjacent to the lower-left corner of the current block, and $V_{LBy}$ represents the vertical motion vector of the neighboring block adjacent to the lower-left corner of the current block.

The third affine seed vector may be derived using the motion vector of the neighboring block adjacent to the lower-left corner of the current block only when the motion vector of the neighboring block adjacent to the left of the current block is not available.

The method of deriving the third affine seed vector of the affine merge candidate may be set differently depending on whether the motion vector of the neighboring block located to the left of the current block is available. As an example, when the motion vector of the neighboring block located to the left of the current block (e.g., the sub-block adjacent to the left of the current block or the sub-block adjacent to the lower-left corner of the current block) is available, the third affine seed vector may be derived using Equation 14 or Equation 15. On the other hand, when the motion vector of the neighboring block located to the left of the current block is not available, the third affine seed vector may be derived using Equation 13.

The third affine seed vector may be derived on the basis of the motion vector of a non-neighboring block having a reference sample not adjacent to the current block. In order to derive the third affine seed vector, whether to use the motion vector of a neighboring block having a reference sample adjacent to the current block or to use the motion vector of a non-neighboring block having a reference sample not adjacent to the current block may be determined on the basis of the location of the upper neighboring block used to derive the affine merge candidate.

Figure 20A:
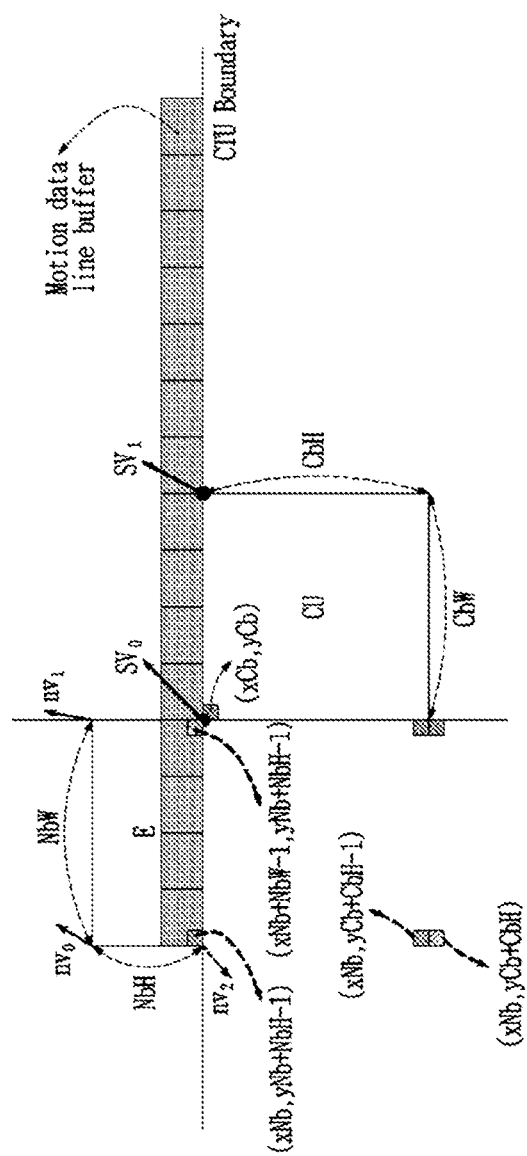
FIG. 20A to FIG. 20B are diagrams showing an example of deriving affine seed vectors of an affine merge candidate on the basis of motion information of a neighboring block or a non-neighboring block located to the left of the current block.
Figure 20B:
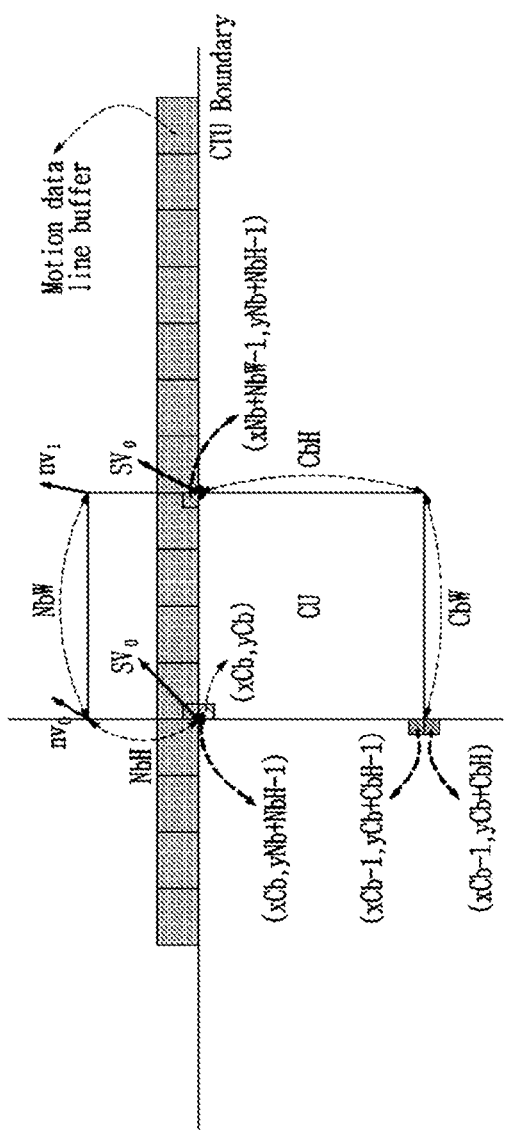

FIG. 20A to FIG. 20B are diagrams showing an example of deriving affine seed vectors of an affine merge candidate on the basis of motion information of a neighboring block or a non-neighboring block located to the left of the current block.

By comparing the location of the upper-left sample of the current block to the location of the upper-left sample of the upper neighboring block used to derive the affine merge candidate, the location of the block for deriving the third affine seed vector may be determined. For example, as in the example shown in FIG. 20A, when the x-coordinate (xNb) of the upper-left sample of the upper neighboring block is smaller than the x-coordinate (xCb) of the upper-left sample of the current block, the third affine seed vector may be derived on the basis of the motion vector of the non-neighboring block that is not adjacent to the left of the current block. In detail, the third affine seed vector may be derived on the basis of the motion vector of a lower-left non-neighboring block including a sample located at (xNb, yCb+CbH) or a left non-neighboring block including a sample located at (xNb, yCb+CbH−1), wherein the samples have the same x-coordinate as the upper-left sample of the upper neighboring block. Equation 16 and Equation 17 show an example of deriving the third affine seed vector on the basis of the motion vector of the non-neighboring block.

$$v_{2x}=V_{Left2x}$$

$$v_{2y}=V_{Left2y} \quad \text{[Equation 16]}$$

$$v_{2x}=V_{LB2x}$$

$$v_{2y}=V_{LB2y} \quad \text{[Equation 17]}$$

In Equation 16, $V_{Left2x}$ represents the horizontal motion vector of the left non-neighboring block, and $V_{Left2y}$ represents the vertical motion vector of the left non-neighboring block. In Equation 17, $V_{LB2x}$ represents the horizontal motion vector of the lower-left non-neighboring block, and $V_{LB2y}$ represents the vertical motion vector of the lower-left non-neighboring block.

The third affine seed vector may be derived using the motion vector of the lower-left non-neighboring block only when the motion vector of the left non-neighboring block is not available.

As in the example shown in FIG. 20B, when the x-coordinate (xNb) of the upper-left sample of the upper neighboring block is greater than or equal to the x-coordinate (xCb) of the upper-left sample of the current block, the third affine seed vector may be derived on the basis of the motion vector of the neighboring block that is adjacent to the lower-left corner of or to the left of the current block. In detail, the third affine seed vector may be derived on the basis of the motion vector of a left neighboring block including a sample (xCb, yCb+CbH−1) adjacent to the left of the current block or a lower-left neighboring block including a sample located at (xCb, yCb+CbH) adjacent to the lower-left corner of the current block.

The location of the reference sample of the left neighboring block or the left non-neighboring block may be set differently from those shown in FIGS. 18 to 20. As an example, a block including a sample (xCb−1, yCb+subH−1) adjacent to the current block may be set as the left neighboring block, and a block including a sample (xNb, yCb+subH−1) not adjacent to the current block may be set as the left non-neighboring block. Here, subH represents a minimum height of a block in which the motion information is stored and may be a natural number such as 2, 4 or 8.

Figure 21A:
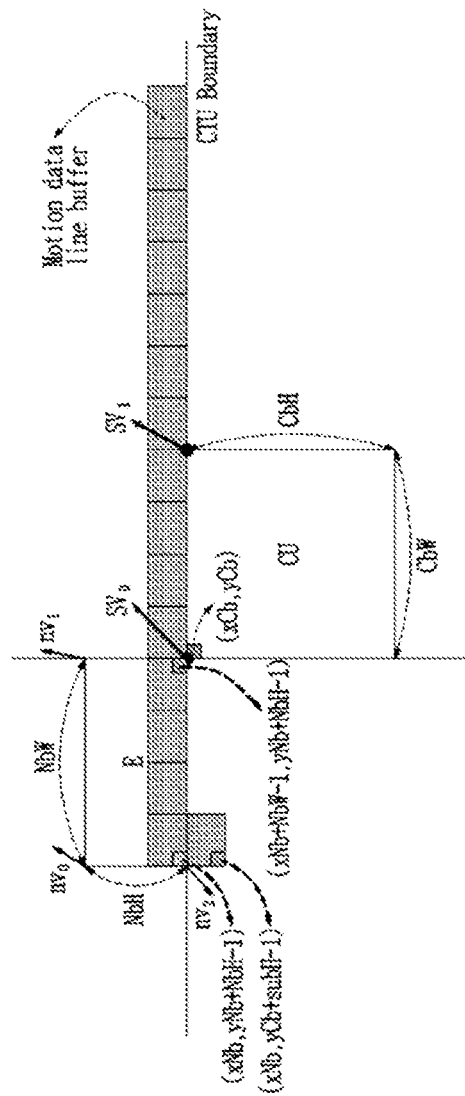
FIG. 21A to FIG. 21B are diagrams showing the location of a block for deriving an affine seed vector of an affine merge candidate.
Figure 21B:
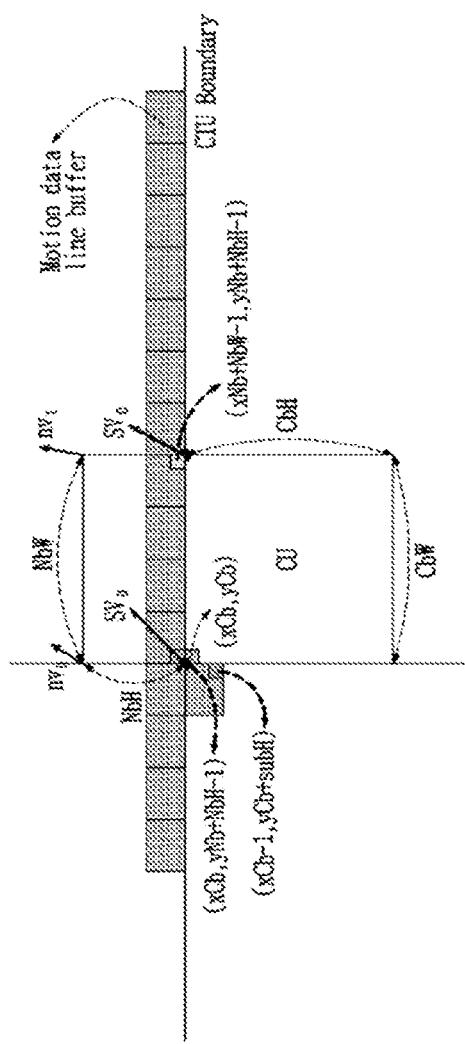

FIG. 21A to FIG. 21B are diagrams showing the location of a block for deriving an affine seed vector of an affine merge candidate.

For example, as in the example shown in FIG. 21A, when the x-coordinate (xNb) of the upper-left sample of the upper neighboring block is smaller than the x-coordinate (xCb) of the upper-left sample of the current block, the third affine seed vector may be derived on the basis of the motion vector of the non-neighboring block that is not adjacent to the left of the current block. In detail, the third affine seed vector may be derived on the basis of the motion vector of the left non-neighboring block including the sample (xNb, yCb+subH−1) which has the same x-coordinate as the upper-left sample of the upper neighboring block and which is spaced a predetermined distance (e.g., subH) from the lower-left sample of the upper neighboring block. Equation 18 shows an example of deriving the third affine seed vector on the basis of the motion vector of the non-neighboring block.

$$v_{2x}=V_{LeftT2x}$$

$$v_{2y}=V_{LeftT2y} \quad \text{[Equation 18]}$$

In Equation 18, $V_{LeftT2x}$ represents the horizontal motion vector of the left non-neighboring block including the sample spaced a predetermined distance from the lower-left sample of the upper neighboring block. $V_{LeftT2y}$ represents the vertical motion vector of the left non-neighboring block including the sample spaced a predetermined distance from the lower-left sample of the upper neighboring block.

Alternatively, as in the example shown in FIG. 21B, when the x-coordinate (xNb) of the upper-left sample of the upper neighboring block is greater than or equal to the x-coordinate (xCb) of the upper-left sample of the current block, the third affine seed vector may be derived on the basis of the motion vector of the left neighboring block which is adjacent to the left of the current block and which includes a sample (xCb−1, yCb+subH−1) horizontally spaced a predetermined distance (e.g., subH−1) from the upper-left sample of the current block. Equation 19 shows an example of deriving the third affine seed vector on the basis of the motion vector of the neighboring block.

$$v_{2x} = V_{LeftTx}$$

$$v_{2y} = V_{LeftTy} \qquad \text{[Equation 19]}$$

In Equation 19, $V_{LeftTx}$ represents the horizontal motion vector of the left neighboring block which is adjacent to the left of the current block and which includes the sample vertically spaced a predetermined distance from the upper-left sample of the current block. $V_{LeftTy}$ represents the vertical motion vector of the left neighboring block which is adjacent to the left of the current block and which includes the sample vertically spaced a predetermined distance from the upper-left sample of the current block.

Alternatively, the reference sample may be set at a different location from those shown in FIGS. 18 to 21. As an example, the sample (xCb−1, yCb) which is adjacent to the left of the current block and which has the same y-coordinate as the upper-left sample of the current block or the sample (xNb, yCb) which is not adjacent to the left of the current block and which has the same y-coordinate as the upper-left sample of the current block may be set as the reference sample.

As in the described example, the first affine seed vector and the second affine seed vector of the affine merge candidate may be derived from the neighboring block located above the current block, and the third affine seed vector of the affine merge candidate may be derived from the neighboring block located to the left of the current block. The first affine seed vector and the third affine seed vector of the affine merge candidate may be derived from the neighboring block located to the left of the current block, and the second affine seed vector of the affine merge candidate may be derived from the neighboring block located above the current block.

In the examples shown in Equations 11 to 13, the affine seed vector of the affine merge candidate may be derived on the basis of a difference value between the motion vector $V_{LB}$ of the lower-left sub-block of the upper neighboring block and the motion vector $V_{RB}$ of the lower-right sub-block of the upper neighboring block. In this case, the affine seed vector of the affine merge candidate may be derived using the motion vector of another block instead of the motion vector of the lower-left sub-block or the lower-right sub-block. As an example, when the motion vector $V_{LB}$ of the lower-left sub-block of the upper neighboring block has the same value as the motion vector $V_{RB}$ of the lower-right sub-block of the upper neighboring block, $V_{RB}$ may be replaced with the motion vector of a block including a sample located to the right of or below the lower-right sub-block. As an example, the motion vector of the affine merge candidate may be derived using the motion vector of a block including a sample located at (xNb+NbW, yNb+NbH−1) instead of using the motion vector $V_{RB}$ of the lower-right sub-block.

Alternatively, when the motion vector $V_{LB}$ of the lower-left sub-block of the upper neighboring block has the same value as the motion vector $V_{RB}$ of the lower-right sub-block of the upper neighboring block, $V_{LB}$ may be replaced with the motion vector of a block including a sample located to the left of or below the lower-left sub-block. As an example, the motion vector of the affine merge candidate may be derived using the motion vector of a block including a sample located at (xNb, yNb+NbH−1+offset) instead of using the motion vector $V_{LB}$ of the lower-left sub-block. Here, offset may be an integer greater than or equal to 1.

Alternatively, $V_{RB}$ may be replaced with the motion vector of a block including a sample located to the left of or below the lower-left sub-block, or $V_{LB}$ may be replaced with the motion vector of a block including a sample located to the right of or below the lower-right sub-block.

A merge candidate may be derived by combining the motion vectors of a plurality of neighboring vectors adjacent to the current block. The merge candidate generated by combining the motion vectors of the plurality of neighboring vectors may be referred to as a combined merge candidate. When the combined merge candidate is derived, the affine seed vector for the control point may be derived from one neighboring block adjacent to the surroundings of the control point.

Figure 22:
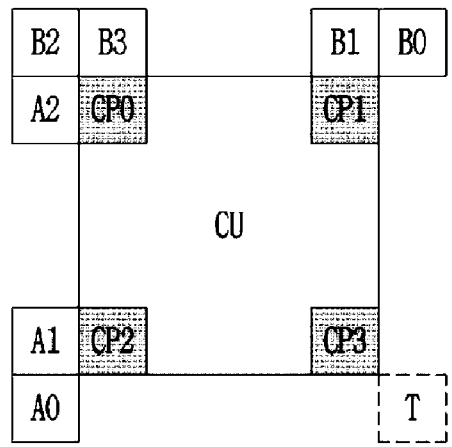
FIG. 22 is a diagram for describing an example of combining motion vectors of a plurality of neighboring blocks to derive a combined merge candidate.

FIG. 22 is a diagram for describing an example of combining motion vectors of a plurality of neighboring blocks to derive a combined merge candidate.

The plurality of neighboring blocks may include upper neighboring blocks located above the current block and left neighboring blocks located to the left of the current block. The upper neighboring blocks may include at least one of a block B0 including a sample located at (xCb+CbW, yCb−1), a block B1 including a sample located at (xCb+CbW−1, yCb−1), or a block B3 including a sample located at (xCb, yCb−1). Here, (xCb, yCb) represents the location of the upper-left sample of the current block, and CbW represents the width of the current block. The left neighboring blocks may include at least one of a block A0 including a sample located at (xCb−1, yCb+CbH), a block A1 including a sample located at (xCb−1, yCb+CbH−1), or a block A2 including a sample located at (xCb−1, yCb). Here, CbH represents the height of the current block.

Also, the plurality of neighboring blocks may further include temporal neighboring blocks of the current block.

A combined merge candidate may be derived by combining the pieces of motion information of two or more of the plurality of neighboring blocks. A combined merge candidate may be derived by combining the pieces of motion information of two or three neighboring blocks. In detail, a combined merge candidate may be derived by combining at least two of more of the motion information of a neighboring block adjacent to the first control point, the motion information of a neighboring block adjacent to the second control point, or the motion information of a neighboring block adjacent to the third control point.

As an example, a combined merge candidate may be derived by combining the motion vectors of at least two or more of a neighboring block A2, B2, or B3 adjacent to an upper-left control point CP0, a neighboring block B1 or B0 adjacent to an upper-right control point CP1, or a temporal neighboring block T for a lower-left control point CP2.

In this case, the motion vector of an available neighboring block that is found first when neighboring blocks adjacent to the control point are scanned in a predefined scan order may be set as the affine seed vector for the control point. As an example, a first affine seed vector of the combined merge candidate for CP0 may be set to be the motion vector of an available neighboring block that is found first when the neighboring blocks are discovered in the order of B2, B3, and A2. A second affine seed vector of the combined merge candidate for CP1 may be set to be the motion vector of an available neighboring block that is found first when the neighboring blocks are discovered in the order of B1 and B0. A third affine seed vector of the combined merge candidate for CP2 may be set to be the motion vector of an available neighboring block that is found first when the neighboring blocks are discovered in the order of A1 and A0.

When the combined merge candidate is derived, a neighboring block coded with the affine motion model or a neighboring block derived as the affine merge candidate may be set to be unavailable.

Figure 23:
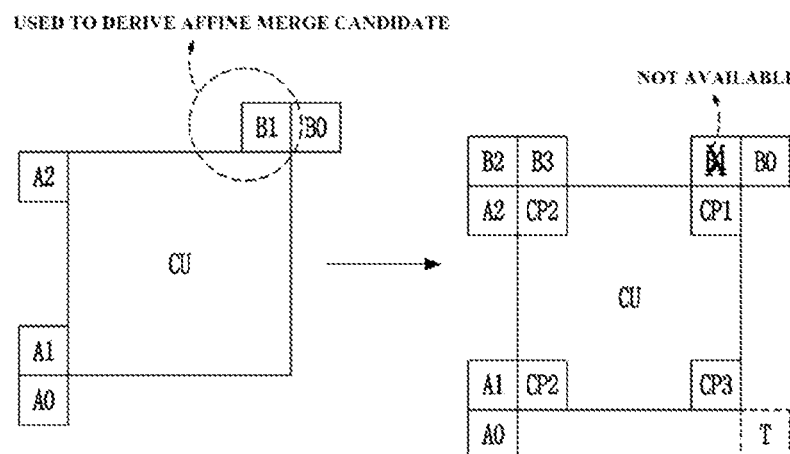
FIG. 23 is a diagram showing an unavailable neighboring block.

FIG. 23 is a diagram showing an unavailable neighboring block.

When the affine merge candidate is derived from a neighboring block B1 located above the current block, it may be determined that the neighboring block B1 is not available to derive the combined merge candidate. Thus, when the affine seed vector of the combined merge candidate for CP1 is derived, the motion vector of B1 may not be used.

Alternatively, when the neighboring block is coded in the affine motion model, the combined merge candidate may be derived on the basis of the affine vector of the sub-block including the reference sample. As an example, when a neighboring block including a sample located at B1 is coded in the affine motion model, the combined merge candidate may be derived using the affine vector of the sub-block of the neighboring block including the sample located at B1.

Alternatively, the scan order may be determined in consideration of whether the neighboring block is coded with the affine motion model or whether the neighboring block is derived as the affine merge candidate. As an example, the neighboring block coded with the affine motion model or the neighboring block coded with the affine merge candidate may be set to be scanned last. As an example, when the neighboring block located at B1 is coded with the affine motion model, the second affine seed vector of the combined merge candidate for CP2 may be derived by discovering the neighboring blocks in the order of B0 and B1.

When the neighboring blocks have different reference picture indices, the motion vectors may be scaled with respect to a reference picture with the largest index or a reference picture with the smallest index. The scaling may be performed on the basis of a picture order count (POC) difference value between the reference picture and the current picture.

Alternatively, the combination of the neighboring blocks may be performed using only neighboring blocks having the same reference picture index among the neighboring blocks. As an example, when at least one of the neighboring blocks has a different reference picture index, the combination may be set to be unavailable as the combined merge candidate. Also, the availability of the combination may be determined regardless of whether the neighboring blocks have the same motion information or motion vector. As an example, the combined merge candidate may be derived by combining the neighboring blocks having the same reference picture index even when the neighboring blocks have the same motion vector (e.g., a CP0 affine seed vector and a CP1 affine seed vector). Alternatively, the scan order of the neighboring blocks may be determined in consideration of the reference picture indices of the neighboring blocks. Alternatively, the combination may be performed using only neighboring blocks having the same prediction direction among the neighboring blocks.

The merge candidate may be generated in a predetermined combination order. As an example, the combination order may be set as follows.

1. {CP0 affine seed vector, CP1 affine seed vector, CP2 affine seed vector}
2. {CP0 affine seed vector, CP1 affine seed vector, CP3 affine seed vector}
3. {CP0 affine seed vector, CP2 affine seed vector, CP3 affine seed vector}
4. {CP1 affine seed vector, CP2 affine seed vector, CP3 affine seed vector}
5. {CP0 affine seed vector, CP1 affine seed vector}
6. {CP0 affine seed vector, CP2 affine seed vector}

Although six combination examples are shown, it is also possible to use fewer or more combination examples.

A combined merge candidate generated by combining three affine seed vectors may be referred to as a 6-parameter combined merge candidate, and a combined merge candidate generated by combining two affine seed vectors may be referred to as a 4-parameter combined merge candidate.

The combination order may be predefined in an encoder and a decoder. Alternatively, the combination order may be determined on the basis of at least one of the size, shape, partition shape, or affine motion model of the current block, the location of the current block in the coding tree unit, or the POC of the reference picture. As an example, when a 4-parameter affine motion model is applied to the current block, a setting may be made such that combination examples for the 4-parameter combined merge candidate have higher priority than combination examples for the 6-parameter combined merge candidate.

While the combined merge candidate is generated in the combination order, only a merge candidate generated by combining neighboring blocks having the same reference picture may be determined as being available. Alternatively, when at least one of the neighboring blocks has a different reference picture, the motion vectors may be scaled with respect to a reference picture with the largest index or a reference picture with the smallest index to derive the merge candidate. The scaling may be performed on the basis of a POC difference between the reference picture and the current picture. Alternatively, when two of the neighboring blocks have the same reference picture and the other neighboring block has a different reference picture, the motion vector of the neighboring block having the different reference picture may be scaled with respect to the reference picture applied in common to the two neighboring blocks to derive the combined merge candidate.

The number of combined merge candidates added to the merge candidate list may be determined on the basis of at least one of the maximum number of merge candidates or the number of merge candidates previously included in the merge candidate list. Alternatively, depending on the affine motion model of the current block, only 6-parameter combined merge candidates may be added to the merge candidate list, or only 4-parameter combined merge candidates may be added to the combined merge candidate list.

As an example, when the number of combined merge candidates to be added to the merge candidate list is one and the 6-parameter motion model is applied to the current block, one 6-parameter combined merge candidate may be added to the merge candidate list in a preset combination order. In detail, when all of the CP0 affine seed vector, the CP1 affine seed vector, and the CP2 affine seed vector are available, the combined merge candidate {CP0 affine seed vector, CP1 affine seed vector, and CP2 affine seed vector} may be added to the merge candidate list. Alternatively, when the CP2 affine seed vector is not available and the CP3 affine seed vector is available, the combined merge candidate {CP0 affine seed vector, CP1 affine seed vector, and CP3 affine seed vector} may be added to the merge candidate list.

Alternatively, when the number of combined merge candidates to be added to the merge candidate list is one and the 6-parameter motion model is applied to the current block, one 4-parameter combined merge candidate may be added to the merge candidate list in a preset combination order.

As another example, the number of combined merge candidates to be added to the merge candidate list may be set differently depending on the affine motion model of the current block. As an example, when the 6-parameter motion model is applied to the current block, one combined merge candidate may be added to the merge candidate list. On the other hand, when the 4-parameter motion model is applied to the current block, two combined merge candidates may be added to the merge candidate list.

A combined merge candidate to be added to the merge candidate list may be selected depending on the number of available affine merge candidates. As an example, when the number of available affine merge candidates is two or more, only 4-parameter combined merge candidates may be added to the merge candidate list. On the other hand, when the number of available affine merge candidates is one or less, only 6-parameter combined merge candidates may be added to the merge candidate list. Alternatively, when the number of available affine merge candidates is one or less, N 6-parameter combined merge candidates and M 4-parameter combined merge candidates may be added to the merge candidate list. Here, N and M are natural numbers, and M may be derived on the basis of the maximum number of merge candidates minus N. Alternatively, when the number of available affine merge candidates is one or less, only 4-parameter combined merge candidates may be added to the merge candidate list.

Alternatively, the combination order may be determined on the basis of the availability of the affine seed vectors. As an example, the combined merge candidates may be added to the merge candidate list in consideration of the availability of the affine seed vectors in the following order.
1. Case in which the CP0 affine seed vector, the CP1 affine seed vector, and the CP2 affine seed vector are available
{CP0 affine seed vector, CP1 affine seed vector, CP2 affine seed vector}
2. Case in which the CP0 affine seed vector, the CP1 affine seed vector, and the CP3 affine seed vector are available
{CP0 affine seed vector, CP1 affine seed vector, CP3 affine seed vector}
3. Case in which the CP0 affine seed vector, the CP2 affine seed vector, and the CP3 affine seed vector are available
{CP0 affine seed vector, CP2 affine seed vector, CP3 affine seed vector}
4. Case in which the CP0 affine seed vector, the CP2 affine seed vector, and the CP3 affine seed vector are available
{CP1 affine seed vector, CP2 affine seed vector, CP3 affine seed vector}
5. Case in which the CP0 affine seed vector and the CP1 affine seed vector are available
{CP0 affine seed vector, CP1 affine seed vector}
6. Case in which the CP0 affine seed vector and the CP2 affine seed vector are available
{CP0 affine seed vector, CP2 affine seed vector}

When the number of combined merge candidates to be added to the merge candidate list is one, a combined merge candidate corresponding to a condition that is satisfied first among the first to sixth conditions may be added to the merge candidate list. When neither of the first to sixth candidates is satisfied, no combined merge candidate may be added to the merge candidate list.

As another example, the maximum number of combined merge candidates to be added to the merge candidate list may be determined depending on the number of available affine merge candidates.

When the number of merge candidates included in the merge candidate list is smaller than the maximum number, a zero merge candidate, which has a motion vector of 0, may be added to the merge candidate list. Thus, the merge candidate may be derived in the affine merge mode in the following order.
1. Derivation of Affine Merge Candidate
2. Combined Merge Candidate
3. Zero Merge Candidate Next, the inter-prediction method using translation motion information will be described in detail below.

The motion information of the current block may be derived from motion information of a block other than the current block. Here, the other block may be a block that is encoded or decoded through inter-prediction earlier than the current block. Setting the motion information of the current block to be the same as the motion information of the other block may be defined as a merge mode. Also, setting the motion vector of the other block as a prediction value of the motion vector of the current block may be defined as a motion vector prediction mode.

Figure 24:
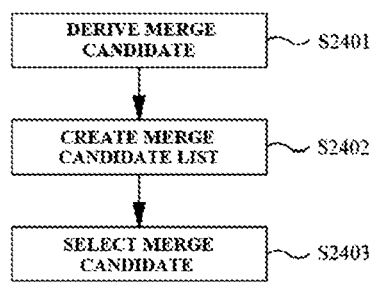
FIG. 24 is a flowchart of a process of deriving motion information of the current block in a merge mode.

FIG. 24 is a flowchart of a process of deriving motion information of the current block in a merge mode.

A merge candidate of the current block may be derived (S2401). The merge candidate of the current block may be derived from a block that is encoded or decoded through inter-prediction earlier than the current block.

Candidate blocks used to derive the merge block may include neighboring blocks including a sample adjacent to the current block. As an example, when the coordinates of the upper-left sample of the current block are (0, 0), at least one of a block including a reference sample located at (−1, H−1), a block including a reference sample located at (W−1, −1), a block including a reference sample located at (W, −1), a block including a reference sample located at (−1, H), or a block including a reference sample located at (−1, −1) may be used as a candidate block.

Alternatively, a candidate block that does not belong to the same coding tree unit as the current block may be set to be unavailable as the merge candidate. As an example, when the reference sample deviates from the upper edge of the coding tree unit to which the current block belongs, the candidate block including the reference sample may be set to be unavailable as a merge candidate.

A merge candidate may be derived from a temporal neighboring block included in a picture different from that of the current block. As an example, a merge candidate may be derived from a collocated block included in a collocated picture. One reference picture included in the reference picture list may be set as the collocated picture. Index information for identifying the collocated picture among the reference pictures may be signaled in a bitstream. Alternatively, a reference picture having a predefined index among the reference picture may be determined as the collocated picture.

The motion information of the merge candidate may be set to the same as the motion information of the candidate block. As an example, at least one of the motion vector, reference picture index, prediction direction, or the bidirectional weight index of the candidate block may be set as the motion information of the merge candidate.

A merge candidate list including merge candidates may be generated (S2402).

Indices may be assigned to the merge candidates of the merge candidate list in a predetermined order. As an example, indices may be sequentially assigned to a merge candidate derived from the left neighboring block, a merge candidate derived from the upper neighboring block, a merge candidate derived from the upper-right neighboring block, a merge candidate derived from the lower-left neighboring block, a merge candidate derived from the upper-left neighboring block, and a merge candidate derived from a temporal neighboring block.

When a plurality of merge candidates are included in the merge candidate, at least one of the plurality of merge candidates may be selected (S2403). In detail, information for specifying one of the plurality of merge candidates may be signaled in a bitstream. As an example, information merge_idx, which indicates an index of one of the merge candidates included in the merge candidate list may be signaled in a bitstream.

When the number of merge candidates included in the merge candidate list is smaller than a threshold value, a merge candidate included in an inter-region motion information table may be added to the merge candidate list. Here, the threshold value may be the maximum number of merge candidates that the merge candidate can include or a value obtained by subtracting an offset from the maximum number of merge candidates. The offset may be a natural number such as 1 or 2. The inter-region motion information table may include a merge candidate derived on the basis of a block that is encoded or decoded earlier than the current block.

The inter-region motion information table includes a merge candidate derived from a block that is encoded or decoded on the basis of inter-prediction in the current picture. As an example, the motion information of the merge candidate included in the inter-region motion information table may be set to be the same as the motion information of the block encoded or decoded on the basis of the inter-prediction. Here, the motion information may include at least one of a motion vector, a reference picture index, a prediction direction, or a bidirectional weight index.

For convenience of description, the merge candidate included in the inter-region motion information table will be referred to as an inter-region merge candidate.

The maximum number of merge candidates that can be included in the inter-region motion information table may be pre-defined in an encoder and a decoder. As an example, the maximum number of merge candidates that can be included in the inter-region motion information table may be 1, 2, 3, 4, 5, 6, 7, 8, or more (e.g., 16).

Alternatively, information indicating the maximum number of merge candidates of the inter-region motion information table may be signaled in a bitstream. The information may be signaled at the sequence, picture, or slice level.

Alternatively, the maximum number of merge candidates of the inter-region motion information table may be determined depending on the size of the picture, the size of the slice, or the size of the coding tree unit.

The inter-region motion information table may be initialized in units of pictures, slices, bricks, coding tree units, or coding tree unit lines (rows and columns). As an example, when a slice is initialized, the inter-region motion information table is also initialized and may include no merge candidate.

Alternatively, information indicating whether to initialize the inter-region motion information table may be signaled in a bitstream. The information may be signaled at the slice, tile, brick, or block level. A pre-configured inter-region motion information table may be used until the information indicates the initialization of the inter-region motion information table.

Alternatively, information regarding an initial inter-region merge candidate may be signaled through a picture parameter set or a slice header. Even though a slice is initialized, the inter-region motion information table may include the initial inter-region merge candidate. Accordingly, the inter-region merge candidate may be used for a block that is to be encoded or decoded first in the slice.

Blocks may be encoded or decoded in an encoding or decoding order, and blocks encoded or decoded on the basis of inter-prediction may be sequentially set as the inter-region merge candidates in the encoding or decoding order.

Figure 25:
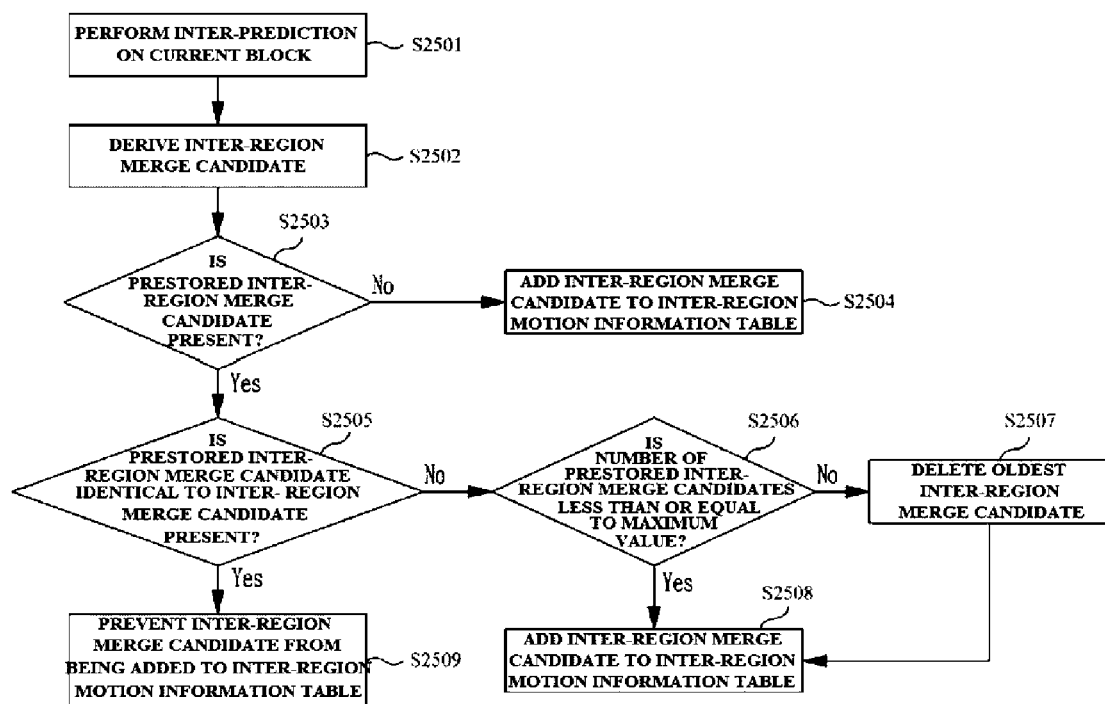
FIG. 25 is a diagram for describing an update aspect of an inter-region motion information table.

FIG. 25 is a diagram for describing an update aspect of an inter-region motion information table.

When inter-prediction is performed on the current block (S2501), an inter-region merge candidate may be derived on the basis of the current block (S2502). The motion information of the inter-region merge candidate may be set to be the same as the motion information of the current block.

When the inter-region motion information table is empty (S2503), the inter-region merge candidate derived on the basis of the current block may be added to the inter-region motion information table (S2504).

When the inter-region motion information table already includes an inter-region merge candidate (S2503), a redundancy check may be performed on the motion information of the current block (or an inter-region merge candidate derived on the basis of the motion information) (S2505). The redundancy check is to determine whether the motion information of the current block is the same as the motion information of the inter-region merge candidate prestored in the inter-region motion information table. The redundancy check may be performed on all inter-region merge candidates prestored in the inter-region motion information table. Alternatively, the redundancy check may be performed on inter-region merge candidates having indices greater than or equal to a threshold value or indices less than or equal to a threshold value among the inter-region merge candidates pre-stored in the inter-region motion information table.

When no inter-prediction merge candidate having the same motion information as the current block is included, the inter-region merge candidate derived on the basis of the current block may be added to the inter-region motion information table (S2508). Whether the inter-prediction merge candidates are identical may be determined on the basis of whether the inter-prediction merge candidates have the same motion information (e.g., motion vector and/or reference picture index).

In this case, when a maximum number of inter-region merge candidates are prestored in the inter-region motion information table (S2506), the oldest inter-region merge candidate is deleted (S2507), and the inter-region merge candidate derived on the basis of the current block may be added to the inter-region motion information table (S2508).

The inter-region merge candidates may be identified by their indices. When the inter-region merge candidate derived from the current block is added to the inter-region motion information table, the lowest index (e.g., 0) is assigned to the inter-region merge candidate, and the indices of the prestored inter-region merge candidates may be increased by one. In this case, when a maximum number of inter-prediction merge candidates are prestored in the inter-region motion information table, the inter-region merge candidate with the largest index is removed.

Alternatively, when the inter-region merge candidate derived from the current block is added to the inter-region motion information table, the largest index may be assigned to the inter-region merge candidate. As an example, when the number of inter-prediction merge candidates prestored in the inter-region motion information table is smaller than the maximum value, an index having the same value as the number of the prestored inter-prediction merge candidates may be assigned to the inter-region merge candidate. Alternatively, when the number of inter-prediction merge candidates prestored in the inter-region motion information table is equal to the maximum value, an index having the maximum value minus 1 may be assigned to the inter-region merge candidate. Also, the inter-region merge candidate with the smallest index is removed, and the indices of the other prestored inter-region merge candidates are decreased by 1.

Figure 26:
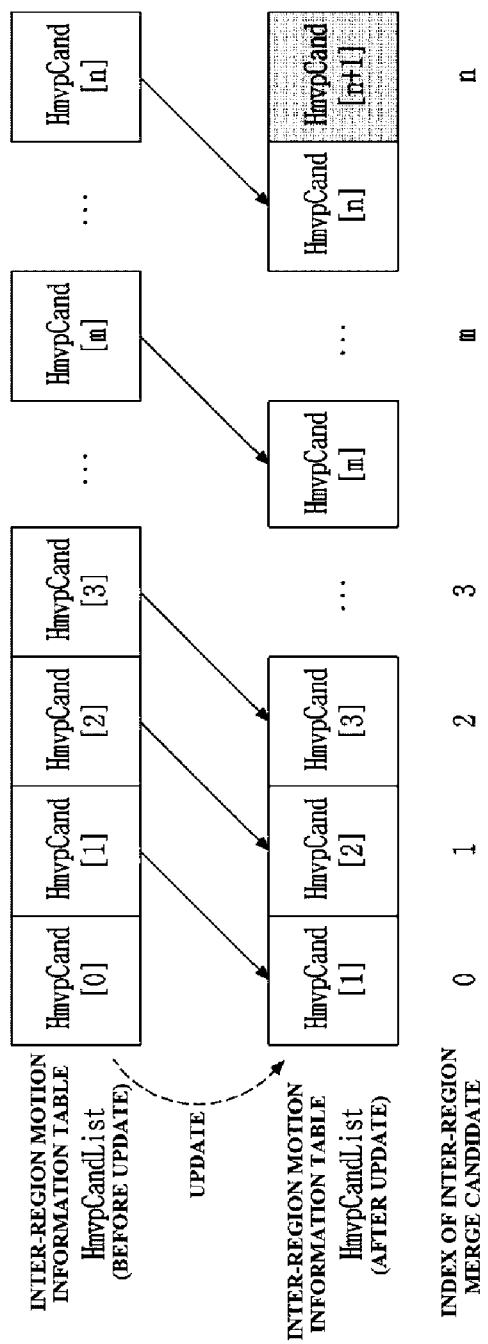
FIG. 26 is a diagram showing an update aspect of an inter-region merge candidate table.

FIG. 26 is a diagram showing an update aspect of an inter-region merge candidate table.

Since the inter-region merge candidate derived from the current block is added to the inter-region merge candidate table, it is assumed that the largest index is assigned to the inter-region merge candidate. Also, it is assumed that a maximum number of inter-region merge candidates are stored in the inter-region merge candidate table.

When an inter-region merge candidate HmvpCand[n+1], which is derived from the current block, is added to an inter-region merge candidate table HmvpCandList, an inter-region merge candidate HmvpCand[0], which has the smallest index among prestored inter-region merge candidates, may be deleted, and the indices of the other inter-region merge candidates may be decreased by 1. Also, the index of the inter-region merge candidate HmvpCand[n+1], which is derived from the current block, may be set as the maximum value (n in the example shown in FIG. 26).

When an inter-region merge candidate identical to the inter-region merge candidate derived on the basis of the current block is prestored (S2505), the inter-region merge candidate derived on the basis of the current block may not be added to the inter-region motion information table (S2509).

Alternatively, while the inter-region merge candidate derived on the basis of the current block is added to the inter-region motion information table, a prestored inter-region merge candidate identical to the inter-region merge candidate may be removed. This causes the same effect as updating the indices of the prestored inter-region merge candidates.

Figure 27:
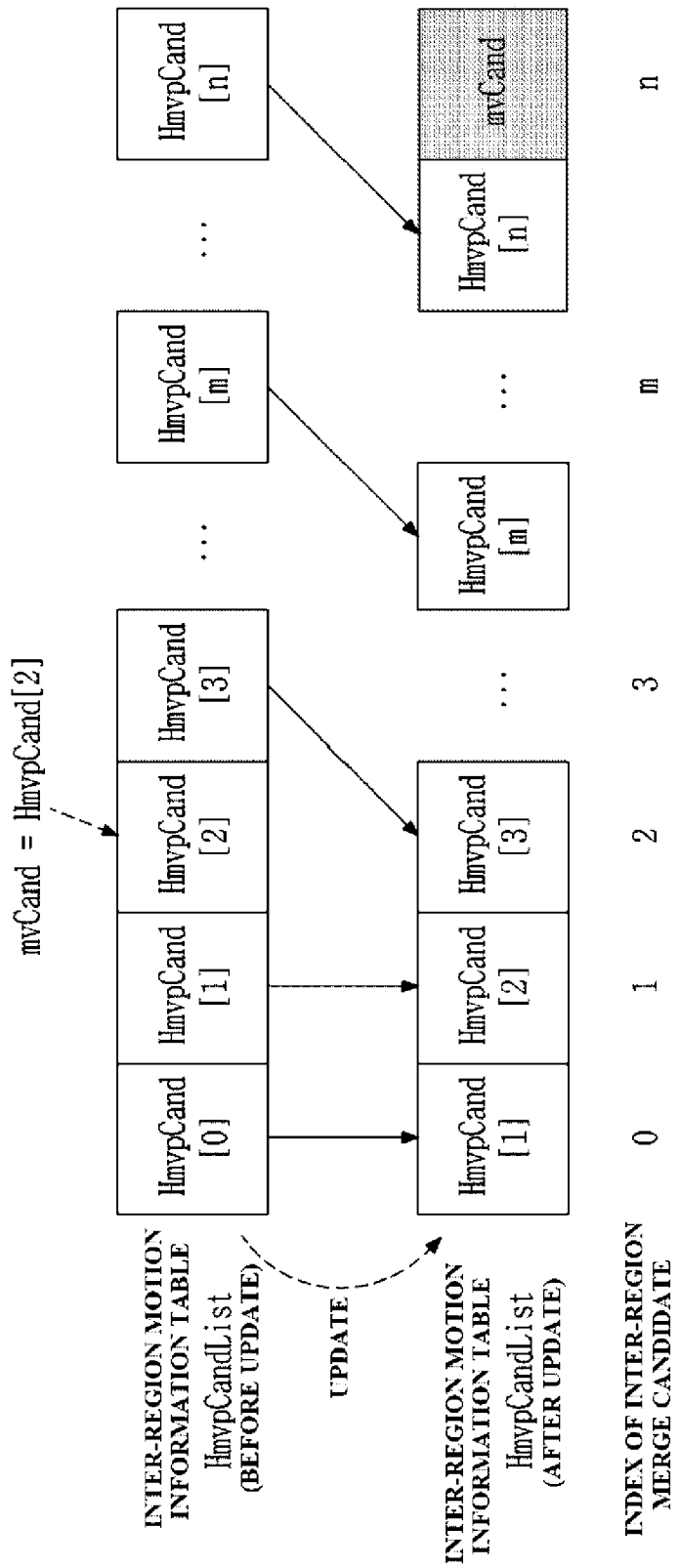
FIG. 27 is a diagram showing an example in which an index of a prestored inter-region merge candidate is updated.

FIG. 27 is a diagram showing an example in which an index of a prestored inter-region merge candidate is updated.

When the index of the prestored inter-prediction merge candidate identical to the inter-region merge candidate mvCand, which is derived on the basis of the current block, is hIdx, the prestored inter-prediction merge candidate may be deleted, and the indices of the inter-prediction merge candidates greater than hIdx may be decreased by 1. As an example, it is shown in FIG. 27 that HmvpCand[2], which is identical to mvCand, is deleted from the inter-region motion information table HvmpCandList, and that indices HmvpCand[3] to HmvpCand[n] are decreased by 1.

Also, the inter-region merge candidate mvCand, which is derived on the basis of the current block, may be added to the end of the inter-region motion information table.

Alternatively, the index assigned to the prestored inter-region merge candidate identical to the inter-region merge candidate derived on the basis of the current block may be updated. For example, the index of the prestored inter-region merge candidate may be changed to the minimum value or the maximum value.

A setting may be made such that the motion information of blocks included in a predetermined region is not added to the inter-region motion information table. As an example, an inter-region merge candidate derived on the basis of the motion information of a block included in a merge processing region may not be added to the inter-region motion information table. Since an encoding or decoding order is not defined for blocks included in the merge processing region, it is inappropriate to use the motion information of one of the blocks to perform inter-prediction on the other blocks. Accordingly, inter-region merge candidates derived on the basis of the blocks included in the merge processing region may not be added to the inter-region motion information table.

When motion compensation prediction is performed in units of sub-blocks, an inter-region merge candidate may be derived on the basis of the motion information of a representative sub-block among the plurality of sub-blocks included in the current block. As an example, when a sub-block merge candidate is used for the current block, an inter-region merge candidate may be derived on the basis of the motion information of a representative sub-block among the sub-blocks.

The motion vectors of the sub-blocks may be derived in the following order. First, one merge candidate may be selected from among merge candidates included in a merge candidate list of the current block, and an initial shift vector shVector may be derived on the basis of the motion vector of the selected merge candidate. Then, a shift sub-block having a reference sample located at (xColSb, yColSb) may be derived by adding the initial shift vector to the location (xSb, ySb) of the reference sample (e.g., the upper-left sample or the middle sample) of each sub-block in the coding block. Equation 20 below indicates an equation for deriving the shift sub-block.

$$(xColSb, yColSb) = (xSb + sh\text{Vector}[0] >> 4, ySb + sh\text{Vector}[1] >> 4) \quad \text{[Equation 20]}$$

Then, the motion vector of the collocated block corresponding to the center position of the sub-block including (xColSb, yColSb) may be set as the motion vector of the sub-block including (xSb, ySb).

The representative sub-block may refer to a sub-block including the upper-left sample or the center sample of the current block.

Figure 28A:
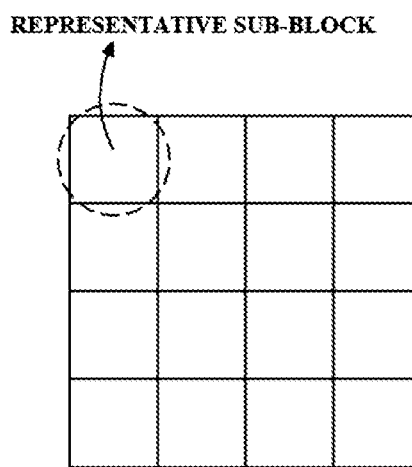
FIG. 28A to FIG. 28B are diagrams showing the location of a representative sub-block.
Figure 28B:
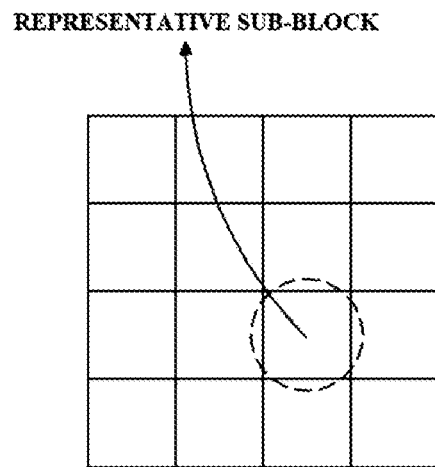

FIG. 28A to FIG. 28B are diagrams showing the location of a representative sub-block.

FIG. 28A shows an example in which a sub-block located to the left of and above the current block is set as a representative sub-block, and FIG. 28B shows an example in which a sub-block located at the center of the current block is set as a representative sub-block. When motion compensation prediction is performed in units of sub-blocks, the inter-region merge candidate of the current block may be derived on the basis of the motion vector of a sub-block including the upper-left sample of the current block or a sub-block including the center sample of the current block.

Whether to use the current block as the inter-region merge candidate may also be determined on the basis of the inter-prediction mode of the current block. As an example, a block that is encoded or decoded on the basis of the affine motion model may be set to be unavailable as an inter-region merge candidate. Accordingly, though the current block is encoded or decoded through inter-prediction, the inter-prediction motion information table may not be updated on the basis of the current block when the inter-prediction mode of the current block is the affine prediction mode.

Alternatively, the inter-region merge candidate may be derived on the basis of the sub-block vector of at least one sub-block included in the block that is encoded or decoded on the basis of the affine motion model. As an example, the inter-region merge candidate may be derived using a sub-block located on the upper-left corner of the current block, a sub-block located at the center of the current block, or a sub-block located on the upper-right corner of the current block. Alternatively, the average of the sub-block vectors of the plurality of sub-blocks may be set as the motion vector of the inter-region merge candidate.

Alternatively, the inter-region merge candidate may be derived on the basis of the average of the affine seed vectors of the block that is encoded or decoded on the basis of the affine motion model. As an example, an average of at least one of the first affine seed vector, the second affine seed vector, or the third affine seed vector of the current block may be set as the motion vector of the inter-region merge candidate.

Alternatively, the inter-region motion information table may be configured for each inter-prediction mode. As an example, at least one of an inter-region motion information table for a block encoded or decoded with an intra-block copy, an inter-region motion information table for a block encoded or decoded on the basis of the translation motion model, or an inter-region motion information table for a block encoded or decoded on the basis of the affine motion model may be defined. One of the plurality of inter-region motion information tables may be selected according to the inter-prediction mode of the current block.

Figure 29:
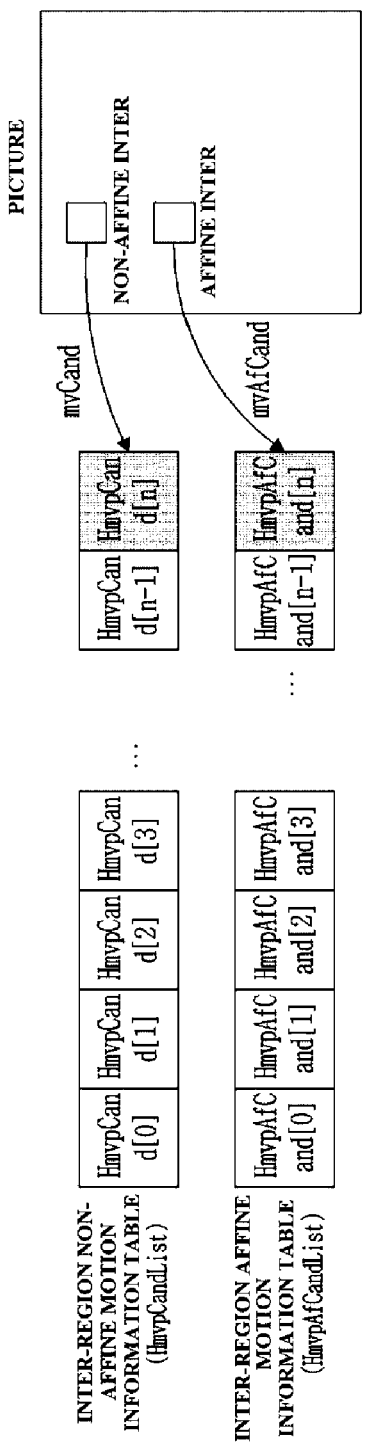
FIG. 29 shows an example in which an inter-region motion information table is generated for each inter-prediction mode.

FIG. 29 shows an example in which an inter-region motion information table is generated for each inter-prediction mode.

When a block is encoded or decoded on the basis of a non-affine motion model, an inter-region merge candidate mvCand, which is derived on the basis of the block, may be added to an inter-region non-affine motion information table HmvpCandList. On the other hand, when a block is encoded or decoded on the basis of an affine motion model, an inter-region merge candidate mvAfCand, which is derived on the basis of the block, may be added to an inter-region affine motion information table HmvpAfCandList.

The affine seed vectors of the block may be stored in an inter-region merge candidate derived from the block that is encoded or decoded on the basis of the affine motion model. Accordingly, the inter-region merge candidate may be used as a merge candidate for deriving the affine seed vector of the current block.

An additional inter-region motion information table may be defined in addition to the above-described inter-region motion information table. In addition to the above-described inter-region motion information table (hereinafter referred to as a first inter-region motion information table), a long-term motion information table (hereinafter referred to as a second inter-region motion information table) may be defined. Here, the long-term motion information table includes long-term merge candidates.

When both of the first inter-region motion information table and the second inter-region motion information table are empty, inter-region merge candidates may be preferentially added to the second inter-region motion information table. Until the number of inter-region merge candidates allowed for the second inter-region motion information table reaches the maximum number, inter-region merge candidates cannot be added to the first inter-region motion information table.

Alternatively, one inter-prediction merge candidate may be added to both of the first inter-region motion information table and the second inter-region motion information table.

In this case, the second inter-region motion information table where configuration is completed may no longer perform an update. Alternatively, when a decoded region is greater than or equal to a predetermined proportion of a slice, the second inter-region motion information table may be updated. Alternatively, the second inter-region motion information table may be updated every N coding tree unit lines.

On the other hand, the first inter-region motion information table may be updated whenever a block encoded or decoded through inter-prediction is generated. However, a setting may be made such that the inter-region merge candidates added to the second inter-region motion information table are not used to update the first inter-region motion information table.

Information for selecting one of the first inter-region motion information table or the second inter-region motion information table may be signaled in a bitstream. When the number of merge candidates included in the merge candidate list is smaller than a threshold value, the merge candidates included in the inter-region motion information table indicated by the information may be added to the merge candidate list.

Alternatively, an inter-region motion information table may be selected on the basis of the size, shape, or inter-prediction mode of the current block, the presence of bidirectional prediction, the presence of motion vector refinement, or the presence of triangular partitioning.

Alternatively, when the number of merge candidates included in the merge candidate list is smaller than the maximum merge number even though the inter-region merge candidates included in the first inter-region motion information table are added to the merge candidate list, the inter-region merge candidates included in the second inter-region motion information table may be added to the merge candidate list.

Figure 30:
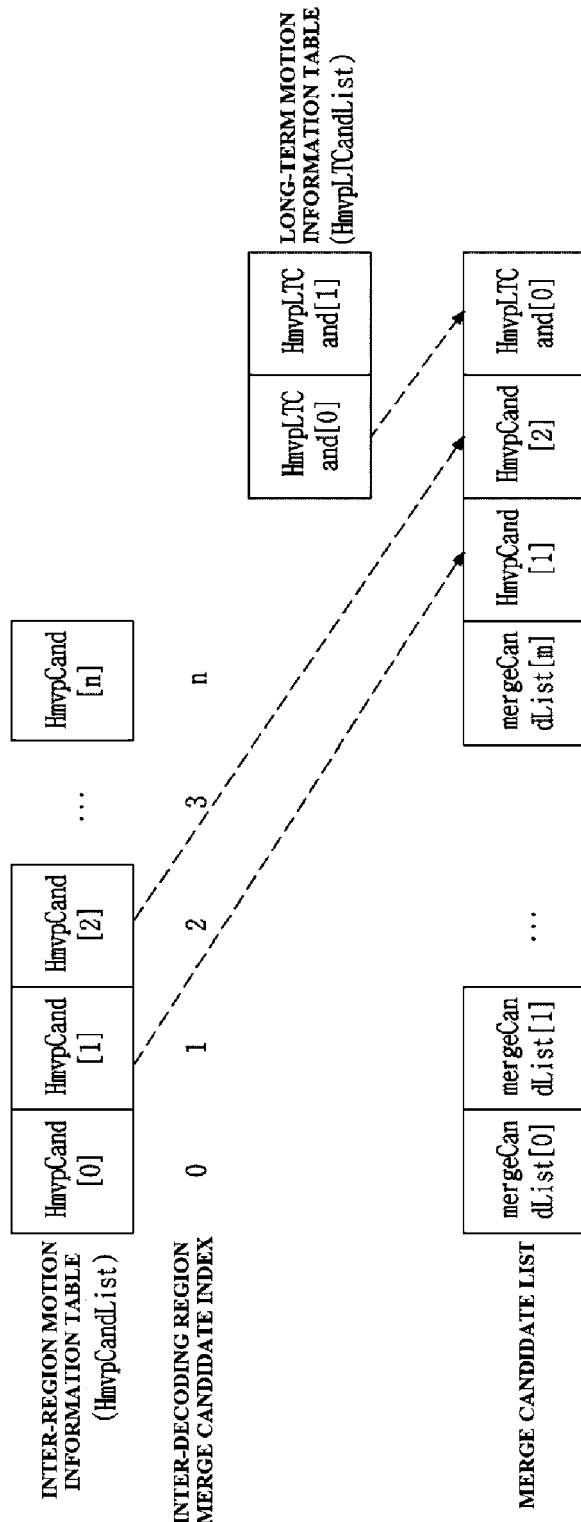
FIG. 30 is a diagram showing an example in which an inter-region merge candidate included in a long-term motion information table is added to a merge candidate list.

FIG. 30 is a diagram showing an example in which an inter-region merge candidate included in a long-term motion information table is added to a merge candidate list.

When the number of merge candidates included in the merge candidate list is smaller than the maximum number, the inter-region merge candidates included in the first inter-region motion information table HmvpCandList may be added to the merge candidate list. When the number of merge candidates included in the merge candidate list is smaller than the maximum number even though the inter-region merge candidates included in the first inter-region motion information table are added to the merge candidate list, the inter-region merge candidates included in the long-term motion information table HmvpLTCandList may be added to the merge candidate list.

Table 1 shows a process of adding the inter-region merge candidates included in the long-term motion information table to the merge candidate list.

TABLE 1

For each candidate in HMVPCandList with index HMVPLTIdx = 1..numHMVPLTCand, the following ordered steps are repeated until combStop is equal to true
-sameMotion is set to FLASE
- If hmvpStop is equal to FALSE and numCurrMergecand is less than (MaxNumMergeCand-1), hmvpLT is set to TRUE
- If HMVPLTCandList[NumLTHmvp-HMVPLTIdx] have the same motion vectors and the same reference indices with any mergeCandList[i] with I being 0.. numOrigMergeCand-1 and HasBeenPruned[i] equal to false, sameMotion is set to true
- If sameMotion is equal to false, mergeCandList[numCurrMergeCand++] is set to HMVPLTCandList[NumLTHmvp-HMVPLTIdx]
- If numCurrMergeCand is equal to (MaxNumMergeCand-1), hmvpLTStop is set to TRUE A setting may be made such that the inter-region merge candidate includes additional information as well as the motion information. As an example, the size, shape, or partition information of a block may be additionally stored for the inter-region merge candidate. When configuring the merge candidate list of the current block, only inter-prediction merge candidates having the same or similar size, shape, or partition information as the current block among the inter-prediction merge candidates may be used, or the inter-prediction merge candidates having the same or similar size, shape, or partition information as the current block may be preferentially added to the merge candidate list.

Alternatively, the inter-region motion information table may be generated for each size, shape, or piece of partition information of the block. The merge candidate list of the current block may be generated using an inter-region motion information table matching the shape, size, or partition information of the current block among a plurality of inter-region motion information tables.

When the number of merge candidates included in the merge candidate list of the current block is smaller than a threshold value, the inter-region merge candidate included in the inter-region motion information table may be added to the merge candidate list. The addition process may be in ascending or descending order based on indices. As an example, an inter-region merge candidate with the largest index may be preferentially added to the merge candidate list.

When the inter-region merge candidate included in the inter-region motion information table is to be added to the merge candidate list, a redundancy check may be performed on the inter-region merge candidate with respect to the merge candidates prestored in the merge candidate list.

As an example, Table 2 shows a process of adding an inter-region merge candidate to the merge candidate list.

TABLE 2

For each candidate in HMVPCandList with index HMVPIdx = 1.. numCheckedHMVPCand, the following ordered steps are repeated until combStop is equal to true
- sameMotion is set to false
- If HMVPCandList[NumHmvp-HMVPIdx] have the same motion vectors and the same reference indices with any mergeCandList[i] with I being 0.. numOrigMergeCand-1 and HasBeenPruned[i] equal to false, sameMotion is set to true
- If sameMotion is equal to false, mergeCandList[numCurrMergeCand++] is set to HMVPCandList[NumHmvp-HMVPIdx]

TABLE 2-continued

- If numCurrMergeCand is equal to (MaxNumMergeCand-1), hmvpStop is set to TRUE

The redundancy check may be performed on only some of the inter-region merge candidates included in the inter-region motion information table. As an example, the redundancy check may be performed on only inter-region merge candidates having indices greater than or equal to the threshold value or indices less than or equal to the threshold value. Alternatively, the redundancy check may be performed on only N merge candidates having the largest indices or having the smallest indices.

Alternatively, the redundancy check may be performed on only some of the merge candidates prestored in the merge candidate list. As an example, the redundancy check may be performed on only a merge candidate with an index greater than or equal to the threshold value or an index less than or equal to the threshold value or a merge candidate derived from a block at a specific location. Here, the specific location may include at least one of the left neighboring block, the upper neighboring block, the upper-right neighboring block, or the lower-left neighboring block of the current block.

Figure 31:
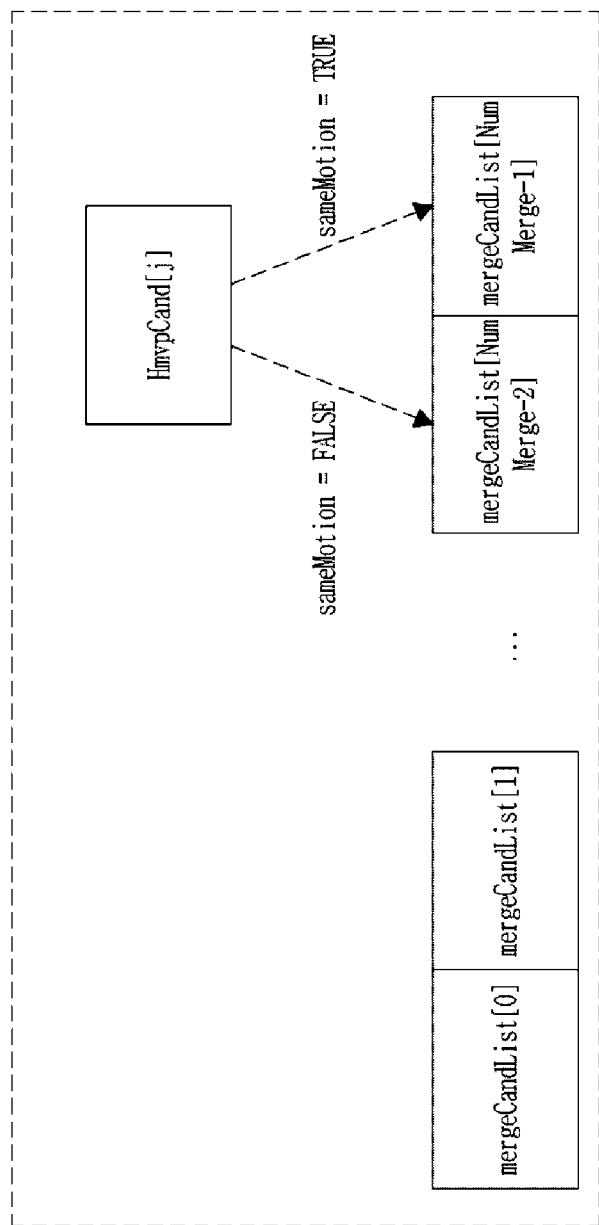
FIG. 31 is a diagram showing an example in which a redundancy check is performed on only some merge candidates.

FIG. 31 is a diagram showing an example in which a redundancy check is performed on only some merge candidates.

When an inter-region merge candidate HmvpCand[j] is to be added to the merge candidate list, a redundancy check may be performed on the inter-region merge candidate with respect to two merge candidates mergeCandList[NumMerge−2] and mergeCandList[NumMerge−1], which have the largest indices. Here, NumMerge may represent the number of available spatial merge candidates and temporal merge candidates.

Unlike the example shown, when the inter-region merge candidate HmvpCand[j] is to be added to the merge candidate list, the redundancy check may be performed on the inter-region merge candidate with respect to at least two merge candidates having the smallest indices. For example, it may be checked whether mergeCandList[0] and mergeCandList[1] are identical to HmvpCand[j]. Alternatively, the redundancy check may be performed on only a merge candidate derived at a specific location. As an example, the redundancy check may be performed on at least one of a merge candidate derived from a nearby block located to the left of the current block or a merge candidate derived from a nearby block located above the current block. When no merge candidate derived at a specific location is present in the merge candidate list, the inter-region merge candidates may be added to the merge candidate list without a redundancy check.

When a merge candidate identical to the first inter-region merge candidate is found, the redundancy check on the merge candidate identical to the first inter-region merge candidate may be omitted while the redundancy check is performed on the second inter-region merge candidate.

Figure 32:
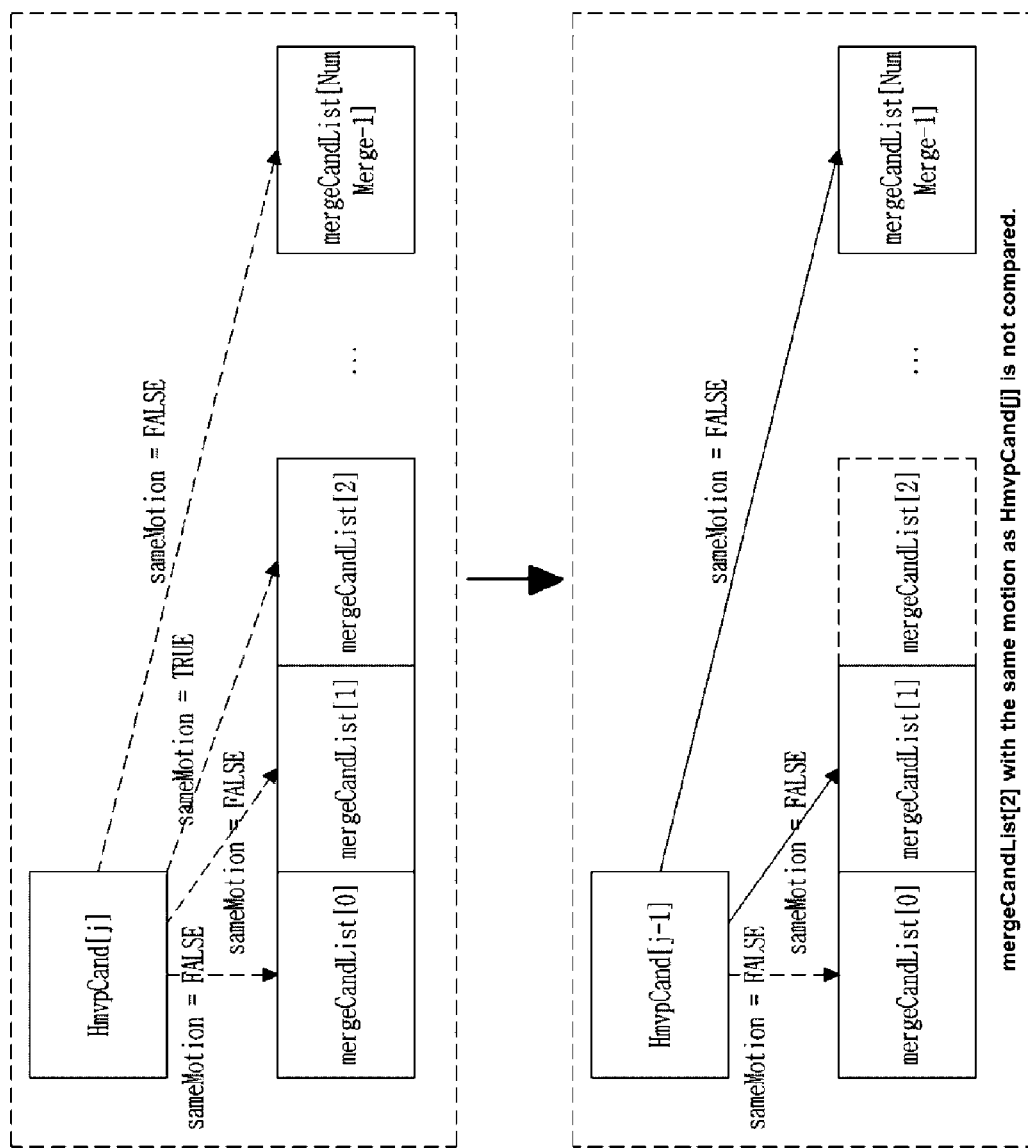
FIG. 32 is a diagram showing an example in which a redundancy check on a specific merge candidate is omitted.

FIG. 32 is a diagram showing an example in which a redundancy check on a specific merge candidate is omitted.

When an inter-region merge candidate HmvpCand[i] with an index of i is to be added to the merge candidate list, a redundancy check between the inter-region merge candidate and the merge candidates prestored in the merge candidate list may be performed. In this case, when a merge candidate mergeCandList[j] identical to the inter-region merge candidate HmvpCand[i] is found, the inter-region merge candidate HmvpCand[i] may not be added to the merge candidate list, and a redundancy check between an inter-region merge candidate HmvpCand[i−1], which has an index of i−1, and the merge candidates may be performed. In this case, a redundancy check between the inter-region merge candidate HmvpCand[i−1] and the merge candidate mergeCandList[j] may be omitted.

For example, in the example shown in FIG. 32, it is determined that HmvpCand[i] and mergeCandList[2] are identical to each other. Accordingly, HmvpCand[i] may not be added to the merge candidate list, and a redundancy check may be performed on HmvpCand[i−1]. In this case, a redundancy check between HvmpCand[i−1] and mergeCandList[2] may be omitted.

When the number of merge candidates included in the merge candidate list of the current block is smaller than a threshold value, at least one of a pairwise merge candidate or a zero merge candidate may be further included in addition to the inter-region merge candidate. The pairwise merge candidate refers to a merge candidate with a motion vector equal to the average of the motion vectors of two or more merge candidates, and a zero merge candidate refers to a merge candidate with a motion vector of 0.

A merge candidate may be added to the merge candidate list of the current block in the following order.

Spatial merge candidate—Temporal merge candidate—Inter-region merge candidate—(Inter-region affine merge candidate)—Pairwise merge candidate—Zero merge candidate.

The spatial merge candidate refers to a merge candidate derived from at least one of a neighboring block or a non-neighboring block, and the temporal merge candidate refers to a merge candidate derived from a preceding reference picture. The inter-region affine merge candidate refers to an inter-region merge candidate derived from a block encoded or decoded by an affine motion model.

The inter-region motion information table may be used even in the motion vector prediction mode. As an example, when the number of motion vector prediction candidates included in the motion vector prediction candidate list of the current block is smaller than a threshold value, the inter-region merge candidate included in the inter-region motion information table may be set as the motion vector prediction candidate for the current block. In detail, the motion vector of the inter-region merge candidate may be set as the motion vector prediction candidate.

When one of the motion vector prediction candidates included in the motion vector prediction candidate list of the current block is selected, the selected candidate may be set as a motion vector predictor of the current block. Subsequently, the motion vector of the current block may be acquired by decoding a motion vector residual value of the current block and then adding the motion vector predictor and the motion vector residual value.

The motion vector prediction candidate list of the current block may be configured in the following order.

Spatial motion vector prediction candidate—Temporal motion vector prediction candidate—Inter-decoding-region merge candidate—(Inter-decoding-region affine merge candidate)—Zero motion vector prediction candidate The spatial motion vector prediction candidate refers to a motion vector prediction candidate derived from at least one of a neighboring block or a non-neighboring block, and the temporal motion vector prediction candidate refers to a motion vector prediction candidate derived from a preceding reference picture. The inter-region affine merge candidate refers to an inter-region motion vector prediction candidate derived from a block encoded or decoded by an affine motion model. The zero motion vector prediction candidate represents a candidate with a motion vector of 0.

A coding block may be split into a plurality of prediction units, and the prediction units may be subjected to prediction. Here, the prediction unit indicates a basic unit for performing prediction.

A coding block may be split using at least one of a vertical line, a horizontal line, an oblique line, or a diagonal line. Information for determining at least one of the number, angles, or locations of lines that split the coding block may be signaled in a bitstream. As an example, information indicating one of a plurality of partition type candidates of the coding block may be signaled in a bitstream, or information specifying one of a plurality of line candidates that split the coding block may be signaled in a bitstream. Alternatively, information for determining the number or types of line candidates partitioning the coding block may be signaled in a bitstream. As an example, whether to use an oblique line having a larger angle than the diagonal line and/or an oblique line having a smaller angle than the diagonal line as a line candidate may be determined using a 1-bit flag.

Alternatively, at least one of the number, angles, or locations of lines partitioning the coding block may be adaptively determined on the basis of at least one of an inter-prediction mode of the coding block, an inter-prediction mode, the location of an available merge candidate, or a partitioning aspect of a neighboring block.

When a coding block is split into a plurality of prediction units, intra-prediction or inter-prediction may be performed on the prediction units.

FIG. 33A to FIG. 33B are diagrams showing an example of partitioning a coding block into a plurality of prediction units using a diagonal line.

As in the examples shown in FIGS. 33A and 33B, a coding block may be split into two triangular prediction units using a diagonal line.

FIGS. 33A and 33B show that a coding block is split into two prediction units using a diagonal line connecting two vertices of the coding block. However, a coding block may be split into two prediction units using an oblique line having at least one end that does not pass through a vertex of the coding block.

FIG. 34A to FIG. 34D are diagrams showing an example of partitioning a coding block into two prediction units.

As in the examples shown in FIGS. 34A and 34B, a coding block may be split into two prediction units using an oblique line with both ends contiguous to the upper edge and the lower edge of the coding block.

Alternatively, as in the examples shown in FIGS. 34C and 34D, a coding block may be split into two prediction units using an oblique line with both ends contiguous to the left edge and the right edge of the coding block.

Alternatively, a coding block may be split into two prediction blocks of different sizes. As an example, by setting an oblique line partitioning the coding block to be contiguous to two edges forming one vertex, the coding block may be split into two prediction units of different sizes.

FIG. 35A to FIG. 35D show examples in which a coding block is split into a plurality of prediction blocks of different sizes.

As in the examples shown in FIGS. 35A and 35B, by setting a diagonal line connecting an upper-left portion and a lower-right portion of the coding block to pass through the left edge, right edge, upper edge, or lower edge of the coding block rather than to pass through the upper-left corner or the lower-right corner of the coding block, the coding block may be split into two prediction units of different sizes.

Alternatively, as in the examples shown in FIGS. 35C and 35D, by setting a diagonal line connecting an upper-right portion and a lower-left portion of the coding block to pass through the left edge, right edge, upper edge, or lower edge of the coding block rather than to pass through the upper-left corner or the lower-right corner of the coding block, the coding block may be split into two prediction units of different sizes.

Each of the prediction units generated by partitioning the coding block is referred to as an "Nth prediction unit." As an example, in the examples shown in FIGS. 33 to 35, PU1 may be defined as a first prediction unit, and PU2 may be defined as a second prediction unit. The first prediction unit may refer to a prediction unit including a sample located in a lower-left portion of the coding block or a sample located in an upper-left portion of the coding block, and the second prediction unit may refer to a prediction unit including a sample located in an upper-right portion of the coding block or a sample located in a lower-right portion of the coding block.

Conversely, a prediction unit including a sample located in an upper-right portion of the coding block or a sample located in a lower-right portion of the coding block may be defined as the first prediction unit, and a prediction unit including a sample located in a lower-left portion of the coding block or a sample located in an upper-left portion of the coding block may be defined as the second prediction unit.

The following embodiments will be described, focusing on an example of partitioning using a diagonal line. In particular, partitioning a coding block into two prediction units using a diagonal line is referred to as diagonal partitioning or triangular partitioning, and a prediction unit generated on the basis of diagonal partitioning is referred to as a triangular prediction unit. However, it will be appreciated that the following embodiments may be applied even to an example of partitioning using an oblique line having an angle different from that of a vertical line, a horizontal line, or a diagonal line.

Whether to apply diagonal partitioning to the coding block may be determined on the basis of at least one of a slice type, the maximum number of merge candidates that the merge candidate list can include, the size of the coding block, the shape of the coding block, the predictive coding mode of the coding block, or the partitioning aspect of the parent node.

As an example, whether to apply diagonal partitioning to the coding block may be determined on the basis of whether the current slice is of type B. Diagonal partitioning may be allowed only when the current slice is of type B.

Alternatively, whether to apply diagonal partitioning to the coding block may be determined on the basis of whether the maximum number of merge candidates included in the merge candidate list is two or more. Diagonal partitioning may be allowed only when the maximum number of merge candidates included in the merge candidate list is two or more.

Alternatively, when at least one of the width or height is greater than 64 in hardware implementation, disadvantageously, a data processing unit having a size of 64×64 is redundantly accessed. Accordingly, when at least one of the width or height of the coding block is greater than a threshold value, the coding block may not be allowed to be split into a plurality of prediction blocks. As an example, when at least one of the height or width of the coding block is greater than 64, diagonal partitioning may not be used.

Alternatively, whether to apply diagonal partitioning to the coding block may be determined on the basis of at least one of whether the number of samples included in the coding block is less than or equal to a first threshold value or whether the number of samples included in the coding block is greater than or equal to a second threshold value. As an example, when the number of samples included in the coding block is less than or equal to the first threshold value or when the number of samples included in the coding block is greater than or equal to the second threshold value, a setting may be made such that the diagonal partitioning is not applied to the coding block. Alternatively, whether to apply diagonal partitioning to the coding block may be determined on the basis of whether a width-to-height ratio of the coding block is smaller than the first threshold value or whether a width-to-height ratio of the coding block is greater than the second threshold value. Here, a width-to-height ratio whRatio of the coding block may be determined as a ratio between a width CbW and a height CbH of the coding block as shown in Equation 21 below.

$$whRatio = CbW/CbH \qquad \text{[Equation 21]}$$

The second threshold value may be an inverse number of the first threshold value. As an example, when the first threshold value is k, the second threshold value may be 1/k.

Diagonal partitioning may be applied to the coding block only when the width-to-height ratio of the coding block is present between the first threshold value and the second threshold value.

Alternatively, the triangular partitioning may be used only when the width-to-height ratio of the coding block is smaller than the first threshold value or greater than the second threshold value. As an example, when the first threshold value is 16, diagonal partitioning may not be allowed for a coding block with a size of 64×4 or 4×64.

Alternatively, whether to allow diagonal partitioning may be determined on the basis of the partitioning aspect of the parent node. As an example, when a coding block, which is a parent node, is split on the basis of quad-tree partitioning, diagonal partitioning may be applied to a coding block which is a leaf node. On the other hand, when a coding block, which is a parent node, is split on the basis of binary tree partitioning or ternary tree partitioning, a setting may be made such that diagonal partitioning is not allowed for a coding block which is a leaf node.

Alternatively, whether to allow diagonal partitioning may be determined on the basis of the predictive coding mode of the coding block. As an example, diagonal partitioning may be allowed only when the coding block is coded through intra-prediction, when the coding block is coded through inter-prediction, or when the coding block is coded in a predefined inter-prediction mode. Here, the defined inter-prediction mode may indicate at least one of a merge mode, a motion vector prediction mode, an affine merge mode, or an affine motion vector prediction mode.

Alternatively, whether to allow diagonal partitioning may be determined on the basis of the size of a parallel processing region. As an example, when the size of the coding block is greater than the size of the parallel processing region, diagonal partitioning may not be used.

Whether to apply diagonal partitioning to the coding block may be determined in consideration of two or more of the above-listed conditions.

In addition, information indicating whether to allow diagonal partitioning may be signaled in a bitstream. The information may be signaled at the sequence, picture, slice or block level. The information indicates that diagonal partitioning is allowed, and diagonal partitioning may be applied to the coding block only when at least one of the above-listed conditions is satisfied.

When it is determined to apply diagonal partitioning to the coding block, information indicating the number or locations of lines partitioning the coding block may be signaled in a bitstream.

As an example, when the coding block is split by a diagonal line, information indicating the direction of the diagonal line partitioning the coding block may be signaled in a bitstream. As an example, a flag triangle_partition_type_flag, which indicates the direction of the diagonal line, may be signaled in a bitstream. The flag indicates whether the coding block is split by a diagonal line connecting an upper-left portion and a lower-right portion or by a diagonal line connecting an upper-right portion and a lower-left portion partitioning the coding block by the diagonal line connecting the upper-left portion and the lower-right portion may be referred to as a left-triangular partition type, and partitioning the coding block by the diagonal line connecting the upper-right portion and the lower-left portion may be referred to as a right-triangular partition type. As an example, the flag having a value of 0 may indicate that the partition type of the coding block is of the left-triangular partition type, and the flag having a value of 1 may indicate that the partition type of the coding block is of the right-triangular partition type.

Information indicating the partition type of the coding block may be signaled at the coding block level. Accordingly, the partition type may be determined for each coding block to which diagonal partitioning is applied.

As another example, information indicating a partition type for a sequence, picture, slice, tile, or coding tree unit may be signaled. In this case, the partition type of coding blocks to which diagonal partitioning is applied may be set identically in the sequence, picture, slice, tile, or coding tree unit.

Alternatively, information for determining the partition type of the first coding unit to which diagonal partitioning is to be applied in the coding tree unit may be coded and signaled, and a setting may be made such that second and later coding units to which diagonal partitioning is to be applied use the same partition type as the first coding unit.

As another example, the partition type of the coding block may be determined on the basis of the partition type of a neighboring block. Here, the neighboring block may include at least one of a neighboring block adjacent to the upper-left corner of the coding block, a neighboring block adjacent to the upper-right corner of the coding block, a neighboring block adjacent to the lower-left corner of the coding block, a neighboring block located above the coding block, or a neighboring block located to the left of the coding block. As an example, the partition type of the current block may be set to be the same as the partition type of the neighboring block. Alternatively, the partition type of the current block may be determined on the basis of whether the left-triangular partition type is applied to the upper-left neighboring block or whether the right-triangular partition type is applied to the upper-right neighboring block or the lower-left neighboring block.

In order to perform motion prediction compensation for a first triangular prediction unit and a second triangular prediction unit, the motion information of each of the first triangular prediction unit and the second triangular prediction unit may be derived. In this case, the motion information of the first triangular prediction unit and the second triangular prediction unit may be derived from the merge candidates included in the merge candidate list. To distinguish a general merge candidate list from a merge candidate list used to derive the motion information of triangular prediction units, a merge candidate list for deriving the motion information of triangular prediction units is referred to as a triangular merge candidate list, and a merge candidate included in the triangular merge candidate list is referred to as a triangular merge candidate. However, the use of the above-described merge candidate derivation method and merge candidate list configuration method for a method of configuring triangular merge candidates and a triangular merge candidate list is also included in the spirit of the present invention.

Information for determining the maximum number of triangular merge candidates that the triangular merge candidate list can include may be signaled in a stream. The information may indicate a difference between the maximum number of merge candidates that the merge candidate list can include and the maximum number of triangular merge candidates that the triangular merge candidate list can include.

The triangular merge candidates may be derived from spatial neighboring blocks and temporal neighboring blocks of the coding block.

FIG. 36 is a diagram showing neighboring blocks used to derive a triangular merge candidate.

The triangular merge candidate may be derived using at least one of a neighboring block located above the coding block, a neighboring block located to the left of the coding block, or a collocated block included in a picture different from that of the coding block. The upper neighboring block may include at least one of a block including a sample (xCb+CbW−1, yCb−1) located above the coding block, a block including a sample (xCb+CbW, yCb−1) located above the coding block, and a block including a sample (xCb−1, yCb−1) located above the coding block. The left neighboring block may include at least one of a block including a sample (xCb−1, yCb+CbH−1) located to the left of the coding block or a block including a sample (xCb−1, yCb+CbH) located to the left of the coding block. The collocated block may be determined by one of a block including a sample (xCb+CbW, yCb+CbH) adjacent to the upper-right corner of the coding block in a collocated picture or a block including a sample (xCb/2, yCb/2) located at the center of the coding block in the collocated picture.

The neighboring blocks may be discovered in a predefined order, and triangular merge candidates may form the triangular merge candidate list in the predefined order. As an example, the triangular merge candidates may be discovered in the order of B1, A1, B0, A0, C0, B2, and C1 to form the triangular merge candidate list.

The motion information of the triangular prediction units may be derived on the basis of the triangular merge candidate list. That is, the triangular prediction units may share one triangular merge candidate list.

Information for specifying at least one of the triangular merge candidates included in the triangular merge candidate list may be signaled in a bitstream in order to derive the motion information of the triangular merge unit. As an example, index information merge_triangle_idx, which is for specifying at least one of the triangular merge candidates, may be signaled in a bitstream.

The index information may specify a combination of the merge candidate of the first triangular prediction unit and the merge candidate of the second triangular prediction unit. As an example, Table 3 represents combinations of merge candidates corresponding to index information merge_triangle_idx.

TABLE 3

| merge_triangle_idx | 0 | 1 | 2 | 3 | 4 | 5 | 6 | 7 | 8 |
|---|---|---|---|---|---|---|---|---|---|
| First prediction unit | 1 | 0 | 0 | 0 | 2 | 0 | 0 | 1 | 3 |
| Second prediction unit | 0 | 1 | 2 | 1 | 0 | 3 | 4 | 0 | 0 |
| merge_triangle_idx | 9 | 10 | 11 | 12 | 13 | 14 | 15 | 16 | 17 |
| First prediction unit | 4 | 0 | 1 | 1 | 0 | 0 | 1 | 1 | 1 |
| Second prediction unit | 0 | 2 | 2 | 2 | 4 | 3 | 3 | 4 | 4 |
| merge_triangle_idx | 18 | 19 | 20 | 21 | 22 | 23 | 24 | 25 | 26 |
| First triangular prediction unit | 1 | 2 | 2 | 2 | 4 | 3 | 3 | 3 | 4 |
| Second triangular prediction unit | 3 | 1 | 0 | 1 | 3 | 0 | 2 | 4 | 0 |
| merge_triangle_idx | 27 | 28 | 29 | 30 | 31 | 32 | 33 | 34 | 35 |
| First triangular prediction unit | 3 | 2 | 4 | 4 | 2 | 4 | 3 | 4 | 3 |
| Second triangular prediction unit | 1 | 3 | 1 | 1 | 3 | 2 | 2 | 3 | 1 |
| merge_triangle_idx | | | | | | 36 | 37 | 38 | 39 |
| First triangular prediction unit | | | | | | 2 | 2 | 4 | 3 |
| Second triangular prediction unit | | | | | | 4 | 4 | 2 | 4 |

Index information merge_triangle_idx having a value of 1 represents that the motion information of the first triangular prediction unit is derived from a merge candidate with an index of 1 and that the motion information of the second triangular prediction unit is derived from a merge candidate with an index of 0. Through index information merge_triangle_idx, a triangular merge candidate for deriving the motion information of the first triangular prediction unit and a triangular merge candidate for deriving the motion information of the second triangular prediction unit may be determined.

The partition type of the coding block to which diagonal partitioning is applied may be determined by the index information. That is, the index information may specify a combination of the merge candidate of the first triangular prediction unit, the merge candidate of the second triangular prediction unit, and the partitioning direction of the coding block. When the partition type of the coding block is determined by the index information, information triangle_partition_type_flag, which indicates the direction of the diagonal line partitioning the coding block, may not be coded. Table 4 represents the partition type of the coding block in index information merge_triangle_idx.

TABLE 4

| merge_triangle_idx | 0 | 1 | 2 | 3 | 4 | 5 | 6 | 7 | 8 |
|---|---|---|---|---|---|---|---|---|---|
| TriangleDir | 0 | 1 | 1 | 0 | 0 | 1 | 1 | 1 | 0 |
| merge_triangle_idx | 9 | 10 | 11 | 12 | 13 | 14 | 15 | 16 | 17 |
| TriangleDir | 0 | 0 | 0 | 1 | 0 | 0 | 0 | 0 | 1 |
| merge_triangle_idx | 18 | 19 | 20 | 21 | 22 | 23 | 24 | 25 | 26 |
| TriangleDir | 1 | 1 | 1 | 0 | 0 | 1 | 1 | 1 | 1 |
| merge_triangle_idx | 27 | 28 | 29 | 30 | 31 | 32 | 33 | 34 | 35 |
| TriangleDir | 1 | 1 | 1 | 0 | 0 | 1 | 0 | 1 | 0 |
| merge_triangle_idx | 36 | 37 | 38 | 39 | | | | | |
| TriangleDir | 0 | 1 | 0 | 0 | | | | | |

A variable TriangleDir of 0 represents that the left-triangular partition type is applied to the coding block, and the variable TriangleDir of 1 represents that the right-triangular partition type is applied to the coding block. In combination of Table 3 and Table 4, the index information merge_triangle_idx may be set to specify the combination of the merge candidate of the first triangular prediction unit, the merge candidate of the second triangular prediction unit, and the partitioning direction of the coding block.

As another example, only index information for one of the first triangular prediction unit and the second triangular prediction unit may be signaled, and an index of a triangular merge candidate for the other one of the first triangular prediction unit and the second triangular prediction unit may be determined on the basis of the index information. As an example, the triangular merge candidate of the first triangular prediction unit may be determined on the basis of index information merge_triangle_idx, which indicates an index of one of the triangular merge candidates. Also, the triangular merge candidate of the second triangular prediction unit may be specified on the basis of merge_triangle_idx. As an example, the triangular merge candidate of the second triangular prediction unit may be derived by adding or subtracting an offset to or from index information merge_triangle_idx. The offset may be an integer such as 1 or 2. As an example, a triangular merge candidate with an index equal to merge_trainge_idx plus 1 may be determined as the triangular merge candidate of the second triangular prediction unit. When merge_triangle_idx indicates a triangular merge candidate with the largest index value among the triangular merge candidates, the motion information of the second triangular prediction unit may be derived from a triangular merge candidate with an index of 0 or a triangular merge candidate with an index equal to merge_triangle_idx minus 1.

Alternatively, the motion information of the second triangular prediction unit may be derived from a triangular merge candidate having the same reference picture as the triangular merge candidate of the first triangular prediction unit specified by the index information. Here, the triangular merge candidate having the same reference picture as the triangular merge candidate of the first triangular prediction unit may indicate a triangular merge candidate in which at least one of the L0 reference picture or the L1 reference picture is the same as that of the triangular merge candidate of the first triangular prediction unit. When there are a plurality of triangular merge candidates having the same reference picture as the triangular merge candidate of the first triangular prediction unit, one of the plurality of triangular merge candidates may be selected on the basis of at least one of whether the merge candidate includes bidirectional motion information or a difference value between the index information and the index of the merge candidate.

As another example, index information may be signaled to each of the first triangular prediction unit and the second triangular prediction unit. As an example, first index information 1st_merge_idx, which is for determining the triangular merge candidate of the first triangular prediction unit, and second index information 2nd_merge_idx, which is for determining the triangular merge candidate of the second triangular prediction unit, may be signaled in a bitstream. The motion information of the first triangular prediction unit may be derived from the triangular merge candidate determined on the basis of first index information 1st_merge_idx, and the motion information of the second triangular prediction unit may be derived from the triangular merge candidate determined on the basis of second index information 2nd_merge_idx.

First index information 1st_merge_idx may indicate an index of one of the triangular merge candidates included in the triangular merge candidate list. The triangular merge candidate of the first triangular prediction unit may be determined as the triangular merge candidate indicated by first index information 1st_merge_idx.

A setting may be made such that the triangular merge candidate indicated by first index information 1st_merge_idx cannot be used as the triangular merge candidate of the second triangular prediction unit. Accordingly, second index information 2nd_merge_idx of the second triangular prediction unit may indicate an index of one of the remaining triangular merge candidates other than the triangular merge candidate indicated by the first index information. When the value of second index information 2nd_merge_idx is smaller than the value of first index information 1st_merge_idx, the triangular merge candidate of the second triangular prediction unit may be determined to be a triangular merge candidate having index information indicated by second index information 2nd_merge_idx. On the other hand, when the value of second index information 2nd_merge_idx is greater than or equal to the value of first index information 1st_merge_idx, the triangular merge candidate of the second triangular prediction unit may be determined to be a triangular merge candidate with an index having a value obtained by adding one to the value of second index information 2nd_merge_idx.

Alternatively, whether to signal the second index information may be determined according to the number of triangular merge candidates included in the triangular merge candidate list. As an example, when the maximum number of triangular merge candidates that the triangular merge candidate list can include does not exceed two, the signaling of the second index information may be omitted. When the signaling of the second index information is omitted, the second triangular merge candidate may be derived by adding or subtracting an offset to or from the first index information. As an example, when the maximum number of triangular merge candidates that the triangular merge candidate list can include is two and the first index information indicates an index of 0, the second triangular merge candidate may be derived by adding one to the first index information. Alternatively, when the maximum number of triangular merge candidates that the triangular merge candidate list can include is two and the first index information indicates one, the second triangular merge candidate may be derived by subtracting one from the first index information.

Alternatively, when the signaling of the second index information is omitted, the second index information may be set as a default value. Here, the default value may be equal to zero. The second triangular merge candidate may be derived by comparing the first index information and the second index information. As an example, a merge candidate with an index of 0 may be set as the second triangular merge candidate when the second index information is smaller than the first index information, and a merge candidate with an index of 1 may be set as the second triangular merge candidate when the second index information is greater than or equal to the first index information.

When the triangular merge candidate has unidirectional motion information, the unidirectional motion information of the triangular merge candidate may be set as the motion information of the triangular prediction unit. On the other hand, when the triangular merge candidate has bi-directional motion information, only one of the L0 motion information or the L1 motion information may be set as the motion information of the triangular prediction unit. Whether to select the L0 motion information or L1 motion information may be determined on the basis of the index of the triangular merge candidate or the motion information of the other triangular prediction units.

As an example, when the index of the triangular merge candidate is an even number, the L0 motion information of the triangular prediction unit may be set to zero, and the L1 motion information of the triangular merge candidate may be set as the L1 motion information of the triangular prediction unit. On the other hand, when the index of the triangular merge candidate is an odd number, the L1 motion information of the triangular prediction unit may be set to zero, and the L0 motion information of the triangular merge candidate may be set to zero. Conversely, the L0 motion information of the triangular merge candidate may be set as the L0 motion information of the triangular prediction unit when the index of the triangular merge candidate is an even number, and the L1 motion information of the triangular merge candidate may be set as the L1 motion information of the triangular prediction unit when the index of the triangular merge candidate is an odd number. Alternatively, the L0 motion information of the triangular merge candidate may be set as the L0 motion information of the first triangular prediction unit when the triangular merge candidate for the first triangular prediction unit is an even number, and the L1 motion information of the triangular merge candidate may be set as the L1 motion information of the second triangular prediction unit when the triangular merge candidate for the second triangular prediction unit is an odd number.

Alternatively, when the first triangular prediction unit has L0 motion information, the L0 motion information of the second triangular prediction unit may be set to zero, and the L1 motion information of the triangular merge candidate may be set as the L1 information of the second triangular prediction unit. On the other hand, when the first triangular prediction unit has L1 motion information, the L1 motion information of the second triangular prediction unit may be set to zero, and the L0 motion information of the triangular merge candidate may be set as the L0 motion information of the second triangular prediction unit.

A setting may be made such that a triangular merge candidate list for deriving the motion information of the first triangular prediction unit is different from a triangular merge candidate list for deriving the motion information of the second triangular prediction unit.

As an example, when a triangular merge candidate for deriving the motion information of the first triangular prediction unit is specified from the triangular merge candidate list on the basis of the index information for the first triangular prediction unit, the motion information of the second triangular prediction unit may be derived using a triangular merge list including the remaining triangular merge candidates other than the triangular merge candidate indicated by the index information. In detail, the motion information of the second triangular prediction unit may be derived from one of the remaining triangular merge candidates.

Accordingly, the maximum number of triangular merge candidates that the triangular merge candidate list of the first triangular prediction unit can include may be different from the maximum number of triangular merge candidates that the triangular merge candidate list of the second triangular prediction unit can include. As an example, when the triangular merge candidate list of the first triangular prediction unit includes M merge candidates, the triangular merge candidate list of the second triangular prediction unit may include M−1 merge candidates other than the triangular merge candidate indicated by the index information of the first triangular prediction unit.

As another example, while the merge candidates of the triangular prediction units are derived on the basis of neighboring blocks adjacent to the coding block, the availability of the neighboring blocks may be determined in consideration of the shapes or locations of the triangular prediction units.

Figure 37A:
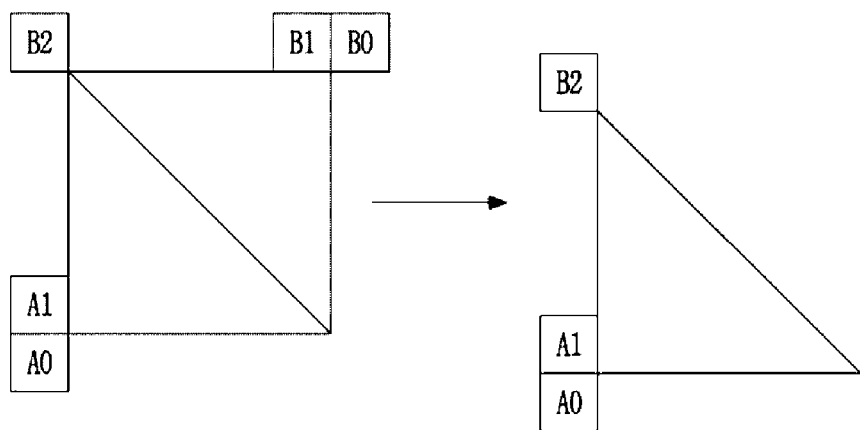
FIG. 37A to FIG. 37B are diagrams for describing an example of determining the availability of a neighboring block for each triangular prediction unit.
Figure 37B:
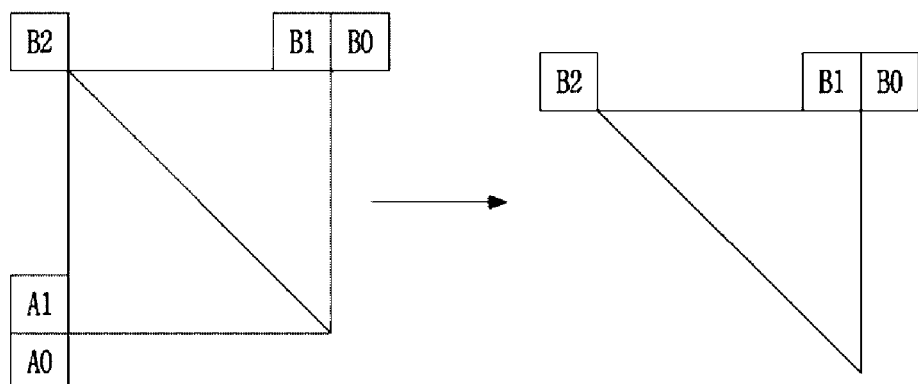

FIG. 37A to FIG. 37B are diagrams for describing an example of determining the availability of a neighboring block for each triangular prediction unit.

A neighboring block which is not adjacent to the first triangular prediction unit may be set to be unavailable for the first triangular prediction unit, and a neighboring block which is not adjacent to the second triangular prediction unit may be set to be unavailable for the second triangular prediction unit.

For example, as in the example shown in FIG. 37A, when the left-triangular partition type is applied to the coding block, it may be determined that blocks A1, A0, and A2 adjacent to the first triangular prediction unit among the blocks neighboring the coding blocks are available for the first triangular prediction unit and that blocks B0 and B1 are not available for the first triangular prediction unit. Accordingly, the triangular merge candidate list for the first triangular prediction unit may include triangular merge candidates derived from blocks A1, A0, and A2 but may not include triangular merge candidates derived from blocks B0 and B1.

As in the example shown in FIG. 37B, when the left-triangular partition type is applied to the coding block, it may be determined that blocks B0 and B1 adjacent to the second triangular prediction unit are available for the second triangular prediction unit and that blocks A1, A0, and A2 are not available for the second triangular prediction unit. Accordingly, the triangular merge candidate list for the second triangular prediction unit may include triangular merge candidates derived from blocks B0 and B1 but may not include triangular merge candidates derived from blocks A1, A0, and A2.

Therefore, the number or range of triangular merge candidates that the triangular prediction unit can use may be determined on the basis of at least one of the location of the triangular prediction unit or the partition type of the coding block.

As another example, a merge mode may be applied to only one of the first triangular prediction unit and the second triangular prediction unit. Also, the motion information of the other one of the first triangular prediction unit and the second triangular prediction unit may be set to be the same as the motion information of the triangular prediction unit to which the merge mode is applied or may be derived by refining the motion information of the triangular prediction unit to which the merge mode is applied.

As an example, the reference picture index and the motion vector of the first triangular prediction unit may be derived on the basis of the triangular merge candidate, and the motion vector of the second triangular prediction unit may be derived by refining the motion vector of the first triangular prediction unit. As an example, the motion vector of the second triangular prediction unit may be derived by adding or subtracting a refine motion vector {Rx, Ry} to the motion vector {mvD1LXx, mvD1LXy} of the first triangular prediction unit. The reference picture index of the second triangular prediction unit may be set to be the same as the reference picture index of the first triangular prediction unit.

Information for determining a refine motion vector indicating a difference between the motion vector of the first triangular prediction unit and the motion vector of the second triangular prediction unit may be signaled in a bitstream. The information may include at least one of information indicating the size of the refine motion vector or information indicating the sign of the refine motion vector.

Alternatively, the sign of the refine motion vector may be derived on the basis of at least one of the partition type applied to the coding block, the location of the triangular prediction unit, or the index of the triangular prediction unit.

As another example, the motion vector and reference picture index of one of the first triangular prediction unit and the second triangular prediction unit may be signaled. The motion vector of the other one of the first triangular prediction unit and the second triangular prediction unit may be derived by refining the signaled motion vector.

As an example, the reference picture index and motion vector of the first triangular prediction unit may be determined on the basis of the information signaled from the bitstream. Also, the motion vector of the second triangular prediction unit may be derived by refining the motion vector of the first triangular prediction unit. As an example, the motion vector of the second triangular prediction unit may be derived by adding or subtracting the refine motion vector {Rx, Ry} to the motion vector {mvD1LXx, mvD1LXy} of the first triangular prediction unit. The reference picture index of the second triangular prediction unit may be set to be the same as the reference picture index of the first triangular prediction unit.

Motion compensation prediction may be performed on the coding block on the basis of the motion information of the first triangular prediction unit and the motion information of the second triangular prediction unit. In this case, picture quality deterioration may occur at a border between the first triangular prediction unit and the second triangular prediction unit. As an example, picture quality continuity may deteriorate near an edge present at the border between the first triangular prediction unit and the second triangular prediction unit. In order to reduce the picture quality deterioration at the border, a prediction sample may be derived through weighted prediction or a smoothing filter.

A prediction sample in a coding block to which diagonal partitioning is applied may be derived on the basis of a weighted-sum operation of a first prediction sample acquired on the basis of the motion information of the first triangular prediction unit and a second prediction sample acquired on the basis of the motion information of the second triangular prediction unit. Alternatively, a prediction sample of the first triangular prediction unit may be derived from the first prediction block determined on the basis of the motion information of the first triangular prediction unit, and a prediction sample of the second triangular prediction unit may be derived from the second prediction block determined on the basis of the motion information of the second triangular prediction unit. In this case, a prediction sample located in a border region between the first triangular prediction unit and the second triangular prediction unit may be derived on the basis of a weighted-sum operation of the first prediction sample included in the first prediction block and the second prediction sample included in the second prediction block. As an example, Equation 22 below represents an example of deriving the prediction samples of the first triangular prediction unit and the second triangular prediction unit.

$$P(x,y) = w1 * P1(x,y) + (1-w1) * P2(x,y) \quad \text{[Equation 22]}$$

In Equation 22, P1 represents the first prediction sample, and P2 represents the second prediction sample. w1 represents a weight applied to the first prediction sample, and (1−w1) represents a weight applied to the second prediction sample. As in the example shown in Equation 22, the weight applied to the second prediction sample may be derived by subtracting the weight applied to the first prediction sample from a constant value.

When the left-triangular partition type is applied to the coding block, the border region may include prediction samples having the same x-coordinate and the same y-coordinate. On the other hand, when the right-triangular partition type is applied to the coding block, the border region may include prediction samples each having an x-coordinate and a y-coordinate of which the sum is greater than or equal to a first threshold value and less than or equal to a second threshold value.

The size of the border region may be determined on the basis of at least one of the size of the coding block, the shape of the coding block, the motion information of the triangular prediction units, the motion vector difference value of the triangular prediction units, the POC of the reference picture, or a difference value between the first prediction sample and the second prediction sample in the diagonal border.

Figures 39A, 39B:
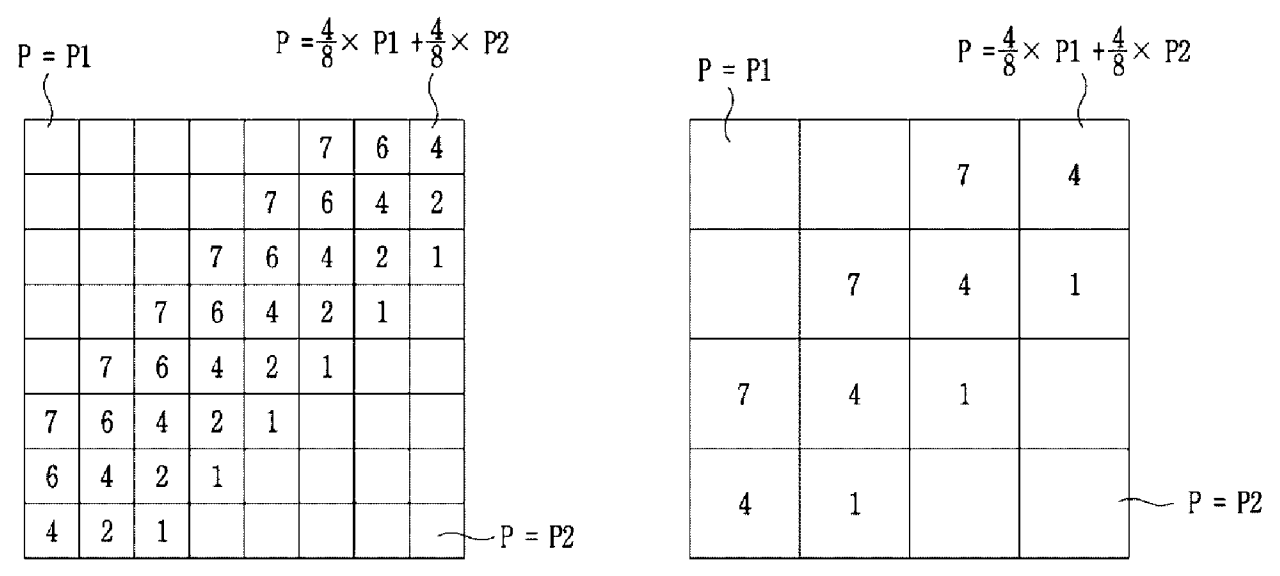

FIG. 38A to FIG. 38B and FIG. 39A to FIG. 39B are diagrams showing an example of deriving a prediction sample on the basis of a weighted-sum operation of a first prediction sample and a second prediction sample. FIG. 38A to FIG. 38B illustrate a case in which the left-triangular partition type is applied to the coding block, and FIG. 39A to FIG. 39B illustrate a case in which the right-triangular partition type is applied to the coding block. Also, FIGS. 38A and 39A are diagrams showing a prediction aspect for a luma component, and FIGS. 38B and 39B are diagrams showing a prediction aspect for a chroma component.

In the drawings shown, a number written in a prediction sample located near the border between the first prediction unit and the second prediction unit indicates a weight applied to the first prediction sample. As an example, when the number written to the prediction sample is N, the prediction sample may be derived by applying a weight of N/8 to the first prediction sample and applying a weight of 1−(N/8) to the second prediction sample.

In a non-border region, the first prediction sample or the second prediction sample may be determined as the prediction sample. Referring to the example of FIG. 38, in an region belonging to a first triangular prediction unit among regions where the absolute difference between an x-coordinate and a y-coordinate is greater than a threshold value, the first prediction sample derived on the basis of the motion information of the first triangular prediction unit may be defined as the prediction sample. On the other hand, in an region belonging to the second triangular prediction unit among regions where the difference between an x-coordinate and a y-coordinate is greater than a threshold value, the second prediction sample derived on the basis of the motion information of the second triangular prediction unit may be determined as the prediction sample.

Referring to the example of FIG. 39, in an region where the sum of an x-coordinate and a y-coordinate is smaller than a first threshold value, the first prediction sample derived on the basis of the motion information of the first triangular prediction unit may be defined as the prediction sample. On the other hand, in an region where the sum of an x-coordinate and a y-coordinate is greater than a second threshold value, the second prediction sample derived on the basis of the motion information of the second triangular prediction unit may be defined as the prediction sample.

A threshold value for determining the non-border region may be determined on the basis of at least one of the size of the coding block, the shape of the coding block, or a color component. As an example, when a threshold value for a luma component may be set to N, a threshold value for a chroma component may be set to N/2.

The prediction samples included in the border region may be derived on the basis of a weighted-sum operation of the first prediction sample and the second prediction sample. In this case, the weight applied to the first prediction sample and the second prediction sample may be determined on the basis of at least one of the location of the prediction sample, the size of the coding block, the shape of the coding block, or a color component.

For example, as in the example shown in FIG. 38A, prediction samples located at the same x-coordinate and the same y-coordinate may be derived by applying the same weight to the first prediction sample and the second prediction sample. Prediction samples in which the absolute difference between an x-coordinate and a y-coordinate is one may be derived by setting a ratio between the weights applied to the first prediction sample and the second prediction sample to (3:1) or (1:3). Also, prediction samples in which the absolute difference between an x-coordinate and a y-coordinate is two may be derived by setting a ratio between the weights applied to the first prediction sample and the second prediction sample to (7:1) or (1:7).

Alternatively, as in the example shown in FIG. 38B, the prediction samples located at the same x-coordinate and the same y-coordinate may be derived by applying the same weight to the first prediction sample and the second prediction sample, and the prediction samples in which the absolute difference between the x-coordinate and the y-coordinate is one may be derived by setting a ratio between the weights applied to the first prediction sample and the second prediction sample to (7:1) or (1:7).

For example, as in the example shown in FIG. 39A, prediction samples in which the sum of an x-coordinate and a y-coordinate is one less than the width or height of the coding block may be derived by applying the same weight to the first prediction sample and the second prediction sample. Prediction samples in which the sum of an x-coordinate and a y-coordinate is equal to or two less than the width or height of the coding block may be derived by setting a ratio between the weights applied to the first prediction sample and the second prediction sample to (3:1) or (1:3). Prediction samples in which the sum of an x-coordinate and a y-coordinate is one greater than or three less than the width or height of the coding block may be derived by setting a ratio between the weights applied to the first prediction sample and the second prediction sample to (7:1) or (1:7).

Alternatively, as in the example shown in FIG. 39B, prediction samples in which the sum of an x-coordinate and a y-coordinate is one less than the width or height of the coding block may be derived by applying the same weight to the first prediction sample and the second prediction sample. Prediction samples in which the sum of an x-coordinate and a y-coordinate is equal to or is two less than the width or height of the coding block may be derived by setting a ratio between the weights applied to the first prediction sample and the second prediction sample to (7:1) or (1:7).

As another example, the weight may be determined in consideration of the location of the prediction sample or the shape of the coding block. Equations 23 to 25 show examples of deriving a weight when the left-triangular partition type is applied to the coding block. Equation 23 shows an example of deriving a weight applied to the first prediction sample when the coding block is square.

$$w1=(x-y+4)/8 \quad \text{[Equation 23]}$$

In Equation 23, x and y represent the location of the prediction sample. When the coding block is non-square, the weight applied to the first prediction sample may be derived using Equation 24 or Equation 25 below. Equation 24 represents a case in which the width of the coding block is greater than the height, and Equation 25 represents a case in which the width of the coding block is smaller than the height.

$$w1=((x/whRatio)-y+4)/8 \quad \text{[Equation 24]}$$

$$w1=(x-(y*whRatio)+4)/8 \quad \text{[Equation 25]}$$

When the right-triangular partition type is applied to the coding block, the weight applied to the first prediction sample may be determined using Equations 26 to 28. Equation 26 shows an example of deriving a weight applied to the first prediction sample when the coding block is square.

$$w1=(CbW-1-x-y+4)/8 \quad \text{[Equation 26]}$$

In Equation 26, CbW represents the width of the coding block. When the coding block is non-square, the weight applied to the first prediction sample may be derived using Equation 27 or Equation 28 below. Equation 27 represents a case in which the width of the coding block is greater than the height, and Equation 28 represents a case in which the width of the coding block is less than the height.

$$w1=(CbH-1-(x/whRatio)-y)+4)/8 \quad \text{[Equation 27]}$$

$$w1=(CbW-1-x-(y*whRatio)+4)/8 \quad \text{[Equation 28]}$$

In Equation 27, CbH represents the height of the coding block.

As in the example shown, among the prediction samples in the border region, a prediction sample included in the first triangular prediction unit may be derived by assigning a larger weight to the first prediction sample than to the second prediction sample, and a prediction sample included in the second triangular prediction unit may be derived by assigning a larger weight to the second prediction sample than to the first prediction sample.

When diagonal partitioning is applied to the coding block, a setting may be made such that the combined prediction mode, which is a combination of the intra-prediction mode and the merge mode, is not applied to the coding block.

The intra-prediction is to predict the current block using a reconstructed sample where encoding or decoding is completed and which is near the current block. In this case, a reconstructed sample before an in-loop filter is applied may be used for the intra-prediction of the current block.

An intra-prediction technique includes matrix-based intra-prediction and normal intra-prediction considering directionality with respect to a nearby reconstructed sample. Information indicating the intra-prediction technique of the current block may be signaled in a bitstream. The information may be a 1-bit flag. Alternatively, the intra-prediction technique of the current block may be determined on the basis of at least one of the location, size, or shape of the current block or the intra-prediction technique of a neighboring block. As an example, when a current block is present across a picture boundary, a setting may be made such that matrix-based intra-prediction is not applied to the current block.

The matrix-based intra-prediction may be a method of acquiring a prediction block of the current block on the basis of a matrix product between a matrix prestored in an encoder and a decoder and reconstructed samples near the current block. Information for specifying one of a plurality of prestored matrices may be signaled in a bitstream. The decoder may determine a matrix for intra-prediction of the current block on the basis of the information and the size of the current block.

The normal intra-prediction is a method of acquiring a prediction block for the current block on the basis of a non-directional intra-prediction mode or a directional intra-prediction mode. A process of performing intra-prediction based on the normal intra-prediction will be described in detail below with reference to the drawings.

Figure 40:
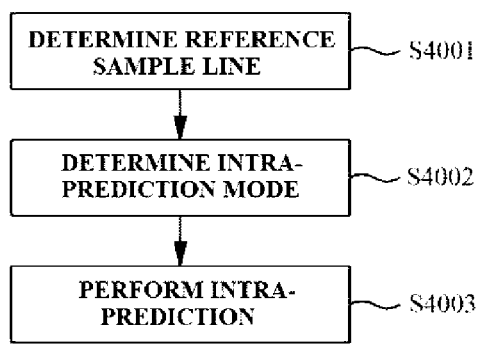
FIG. 40 is a flowchart of an intra-prediction method according to an embodiment of the present invention.

FIG. 40 is a flowchart of an intra-prediction method according to an embodiment of the present invention.

A reference sample line of the current block may be determined (S4001). The reference sample line refers to a set of reference samples included in a $k^{th}$ line away from the top and/or the left of the current block. The reference samples may be derived from reconstructed samples where encoding or decoding is completed and which are near the current block.

Index information for identifying the reference sample line of the current block among a plurality of reference sample lines may be signaled in a bitstream. As an example, index information intra_luma_ref_idx, which is for specifying the reference sample line of the current block, may be signaled in a bitstream. The index information may be signaled in units of coding blocks.

The plurality of reference sample lines may include at least one of the first line, the second line, the third line, or the fourth line from the top and/or the left of the current block. Among the plurality of reference sample lines, a reference sample line consisting of a row adjacent to the top of the current block and a column adjacent to the left of the current block may be referred to as an adjacent reference sample line, and the other reference sample lines may be referred to as non-adjacent reference sample lines.

Only some of the plurality of reference sample lines may be selected as the reference sample line of the current block. As an example, among the plurality of reference sample lines, the remaining reference sample lines other than a third non-adjacent reference sample line may be set as candidate reference sample lines. Table 5 represents indices assigned to the candidate reference sample lines.

TABLE 5

| Index (intra_luma_ref_idx) | Reference sample line |
|---|---|
| 0 | Adjacent reference sample line |
| 1 | First non-adjacent reference sample line |
| 2 | Second non-adjacent reference sample line |

It is possible to set a larger number of candidate reference sample lines or a smaller number of candidate reference sample lines than has been described above. Also, the number or locations of non-adjacent reference sample lines which are set as candidate reference sample lines are not limited to the above-described example. As an example, a first non-adjacent reference sample line and a third non-adjacent reference sample line may be set as the candidate reference sample lines, and a second non-adjacent reference sample line and the third non-adjacent reference sample line may be set as the candidate reference sample lines. Alternatively, all of the first non-adjacent reference sample line, the second non-adjacent reference sample line, and the third non-adjacent reference sample line may be set as the candidate reference sample lines.

The number or types of candidate reference sample lines may be determined on the basis of at least one of the size, shape, or location of the current block, the presence of partitioning into sub-blocks, or the intra-prediction mode of the current block.

The reference sample line of the current block may be determined on the basis of at least one of the location, size, or shape of the current block or the predictive coding mode of a neighboring block. As an example, when the current block is contiguous to an edge of a picture, tile, slice, or coding tree unit, an adjacent reference sample line may be determined as the reference sample line of the current block.

Alternatively, when the current block is non-square, an adjacent reference sample line may be determined as the reference sample line of the current block. Alternatively, when a width-to-height ratio of the current block is greater than or equal to a threshold value or is less than or equal to a threshold value, an adjacent reference sample line may be determined as the reference sample line of the current block.

The reference sample line may include upper reference samples located above the current block and left reference samples located to the left of the current block. The upper reference samples and the left reference samples may be derived from reconstructed samples near the current block. The reconstructed samples may be in a state before an in-loop filter is applied.

Next, the intra-prediction mode of the current block may be determined (S4002). At least one of a non-directional intra-prediction mode or a directional intra-prediction mode may be determined as the intra-prediction mode of the current block. The non-directional intra-prediction mode includes Planar and DC, and the directional intra-prediction includes 33 or 65 modes from a diagonal lower-left direction to a diagonal upper-right direction.

Figure 41A:
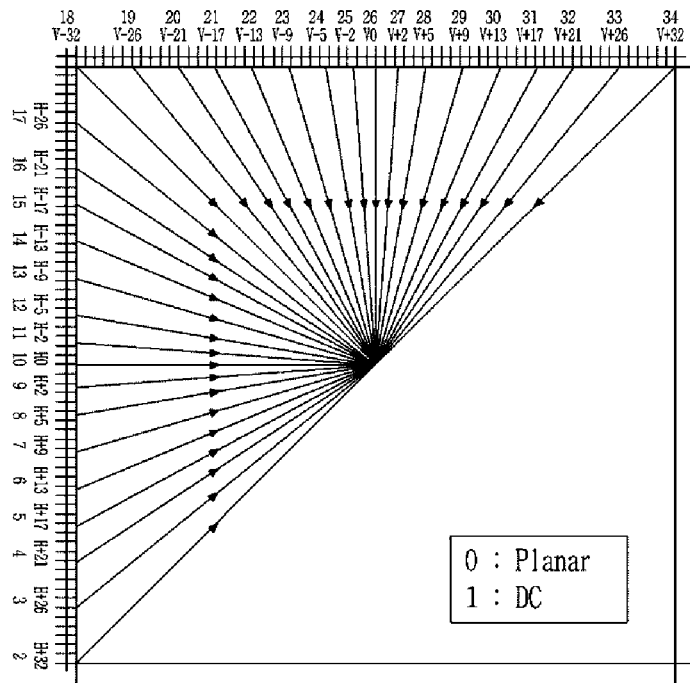
FIG. 41A to FIG. 41B are diagrams showing intra-prediction modes.
Figure 41B:
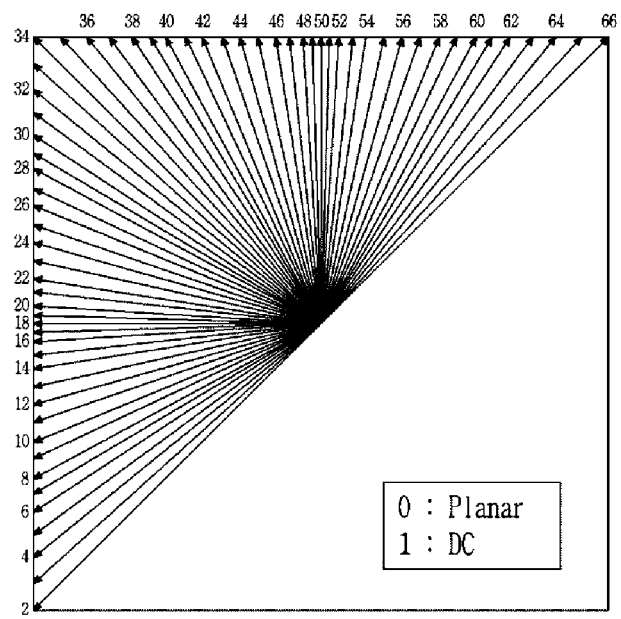

FIG. 41A to FIG. 41B are diagrams showing intra-prediction modes.

FIG. 41A shows 35 intra-prediction modes, and FIG. 41B shows 67 intra-prediction modes.

A larger number of intra-prediction modes or a smaller number of intra-prediction modes may be defined than are shown in FIG. 41A to FIG. 41B are diagrams.

A most probable mode (MPM) may be set on the basis of the intra-prediction mode of a block neighboring the current block. Here, the neighboring block may include a left neighboring block adjacent to the left of the current block and an upper neighboring block adjacent to the top of the current block.

The number of MPMs included in an MPM list may be preset in an encoder and a decoder. As an example, the number of MPMs may be three, four, five, or six. Alternatively, information indicating the number of MPMs may be signaled in a bitstream. Alternatively, the number of MPMs may be determined on the basis of at least one of the predictive coding mode of the neighboring block or the size, shape, or reference sample line index of the current block. As an example, N MPMs may be used when an adjacent reference sample line is determined as the reference sample line of the current block, and M MPMs may be used when a non-adjacent reference sample line is determined as the reference sample line of the current block. M is a natural number smaller than N. As an example, N may be six, and M may be five, four, or three. Accordingly, one of six candidate intra-prediction modes is determined as the intra-prediction mode of the current block when the index of the reference sample line of the current block is zero and an MPM flag is true, and one of five candidate intra-prediction modes is determined as the intra-prediction mode of the current block when the index of the reference sample line of the current block is greater than zero and an MPM flag is true.

Alternatively, a fixed number (e.g., five or six) of MPM candidates may be used regardless of the index of the reference sample line of the current block.

An MPM list including a plurality of MPMs is created, and information indicating whether an MPM identical to the intra-prediction mode of the current block is included in the MPM list may be signaled in a bitstream. The information is a 1-bit flag, and the flag may be referred to as an MPM flag. When the MPM flag indicates that an MPM identical to the current block is included in the MPM list, index information for identifying one of the MPMs may be signaled in a bitstream. As an example, index information intra_luma_ref_idx, which is for specifying one of a plurality of MPMs, may be signaled in a bitstream. The MPM specified by the index information may be set as the intra-prediction mode of the current block. When the MPM flag indicates that an MPM identical to the current block is not included in the MPM list, residual mode information indicating one of the remaining intra-prediction modes other than the MPMs may be signaled in a bitstream. The residual mode information indicates an index value corresponding to the intra-prediction mode of the current block when indices are re-assigned to the remaining intra-prediction modes other than the MPMs. The decoder may sort the MPMs in ascending order and compare the MPMs to the residual mode information to determine the intra-prediction mode of the current block. As an example, when the residual mode information is smaller than or equal to an MPM, the intra-prediction mode of the current block may be derived by adding one to the residual mode information.

When deriving the intra-prediction mode of the current block, the comparison between the residual mode information and some of the MPMs may be omitted. As an example, among the MPMs, MPMs which are non-directional intra-prediction modes may be excluded from the comparison. When the non-directional intra-prediction modes are set as the MPMs, it is clear that the residual mode information indicates a directional intra-prediction mode. Thus, the intra-prediction mode of the current block may be derived through the comparison between the residual mode information and the remaining MPMs other than the non-directional intra-prediction modes. Instead of excluding the non-directional intra-prediction modes from the comparison, the number of non-directional intra-prediction modes may be added to the residual mode information, and thus the resultant value may be compared to the remaining MPMs.

Instead of setting an MPM as a default mode, information indicating whether the intra-prediction mode of the current block is the default mode may be signaled in a bitstream. The information may be a 1-bit flag, and the flag may be referred to as a default mode flag. The default mode flag may be signaled only when the MPM flag indicates that an MPM identical to the current block is included in the MPM list. As described above, the default mode may include at least one of Planar, DC, Vertical mode or Horizontal mode. As an example, when Planar is set as the default mode, the default mode flag may indicate whether the intra-prediction mode of the current block is Planar. When the default mode flag indicates that the intra-prediction mode of the current block is not the default mode, one of the MPMs indicated by the index information may be set as the intra-prediction mode of the current block.

When the default mode flag is used, a setting may be made such that the intra-prediction mode identical to the default mode is not set as an MPM. As an example, when the default mode flag indicates whether the intra-prediction mode of the current block is Planar, the intra-prediction mode of the current block may be derived using five MPMs excluding an MPM corresponding to Planar.

When a plurality of intra-prediction modes are set as default modes, index information indicating one of the default modes may be further signaled. The intra-prediction mode of the current block may be set as the default mode indicated by the index information.

When the index of the reference sample line of the current block is not zero, a setting may be made such that the default mode is not used. As an example, when the non-adjacent reference sample line is determined as the reference sample line of the current block, a setting may be made such that non-directional intra-prediction mode such as DC mode or Planar mode are not used. Accordingly, when the index of the reference sample line is not zero, the default mode flag may not be signaled, and the value of the default mode flag may set to a predefined value (i.e., false).

When the intra-prediction mode of the current block is determined, prediction samples for the current block may be acquired on the basis of the determined intra-prediction mode (S4003).

When DC mode is selected, the prediction samples for the current block may be generated on the basis of the average of the reference samples. In detail, the values of all the samples in the prediction block may be generated on the basis of the average of the reference samples. The average may be derived using at least one of the upper reference samples located above the current block and the left reference samples located to the left of the current block.

The number or range of reference samples used to derive the average may vary depending on the shape of the current block. As an example, when the current block is a non-square block in which the width is greater than the height, the average may be computed using only the upper reference samples. On the other hand, when the current block is a non-square block in which the width is smaller than the height, the average may be computed using only the left reference samples. That is, when the width and height of the current block are different from each other, the average may be computed using only reference samples adjacent to a longer one between the width and the height. Alternatively, whether to compute the average using the upper reference samples or to compute the average using the left reference samples may be determined on the basis of the width-to-height ratio of the current block.

When Planar mode is selected, the prediction sample may be acquired using a horizontal prediction sample and a vertical prediction sample. Here, the horizontal prediction sample is acquired on the basis of a left reference sample and a right reference sample located on the same horizontal line as the prediction sample, and the vertical prediction sample is acquired on the basis of an upper reference sample and a lower reference sample located on the same vertical line as the prediction sample. Here, the right reference sample may be generated by copying a reference sample adjacent to the upper-right corner of the current block, and the lower reference sample may be generated by copying a reference sample adjacent to the lower-left corner of the current block. The horizontal prediction sample may be acquired on the basis of a weighted-sum operation of the left reference sample and the right reference sample, and the vertical prediction sample may be acquired on the basis of a weighted-sum operation of the upper reference sample and the lower reference sample. In this case, a weight assigned to each reference sample may be determined depending on the location of the prediction sample. The prediction sample may be acquired on the basis of an averaging operation or a weighted-sum operation of the horizontal prediction sample and the vertical prediction sample. When the weighted-sum operation is performed, weights assigned to the horizontal prediction sample and the vertical prediction sample may be determined on the basis of the location of the prediction sample.

When a directional prediction mode is selected, a parameter indicating the prediction direction (or the prediction angle) of the selected directional prediction mode may be determined. Table 6 below represents intra-direction parameter intraPred Ang for each intra-prediction mode.

TABLE 6

| PredModeIntra IntraPredAng | 1- | 232 | 326 | 421 | 517 | 613 | 79 |
|---|---|---|---|---|---|---|---|
| PredModeIntra IntraPredAng | 85 | 92 | 100 | 11-2 | 12-5 | 13-9 | 14-13 |
| PredModeIntra IntraPredAng | 15-17 | 16-21 | 17-26 | 18-32 | 19-26 | 20-21 | 21-17 |
| PredModeIntra IntraPredAng | 22-13 | 23-9 | 24-5 | 25-2 | 260 | 272 | 285 |
| PredModeIntra IntraPredAng | 299 | 3013 | 3117 | 3221 | 3326 | 3432 | |

Table 6 represents an intra-direction parameter for each intra-prediction mode with an index between 2 and 34 when 35 intra-prediction modes are defined. When more than 33 directional intra-prediction modes are defined, Table 6 may be subdivided to set intra-direction parameters for each directional intra-prediction mode.

After arranging the upper reference samples and the left reference samples of the current block in a line, the prediction sample may be acquired on the basis of the value of the intra-direction parameter. In this case, when the value of the intra-direction parameter is negative, the left reference samples and the upper reference samples may be arranged in a line.

Figure 42:
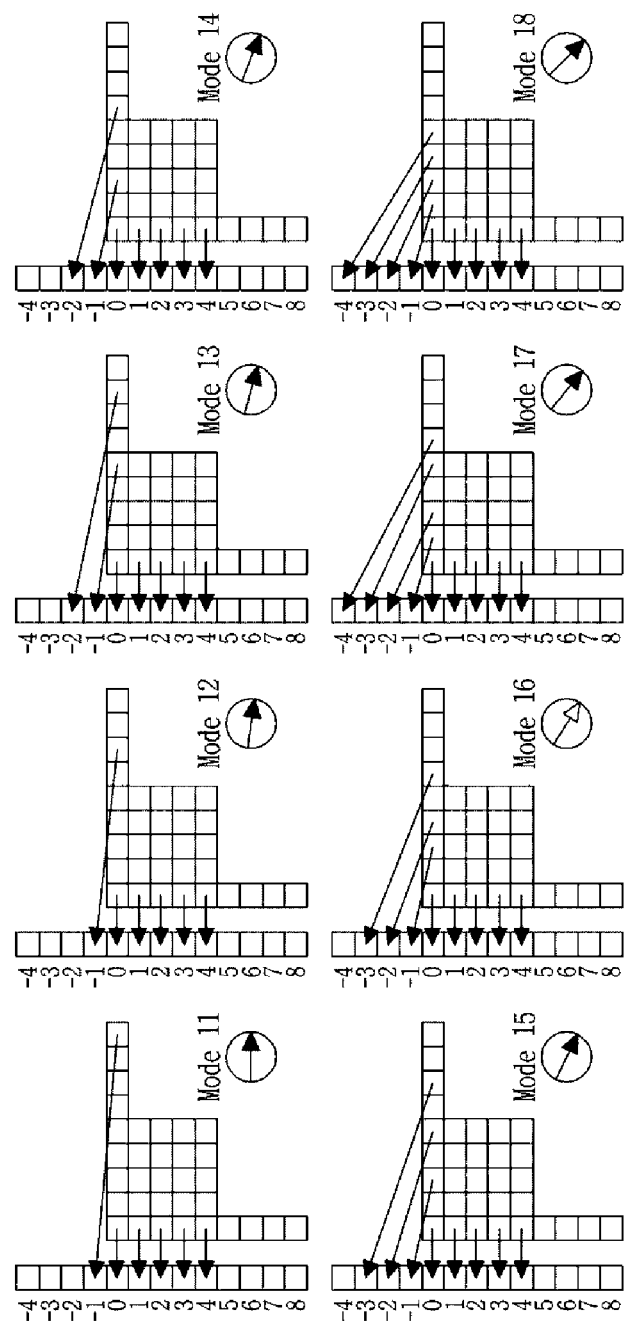
FIG. 42 is a diagram showing an example of a one-dimensional array in which reference samples are arranged in a line.
Figure 43:
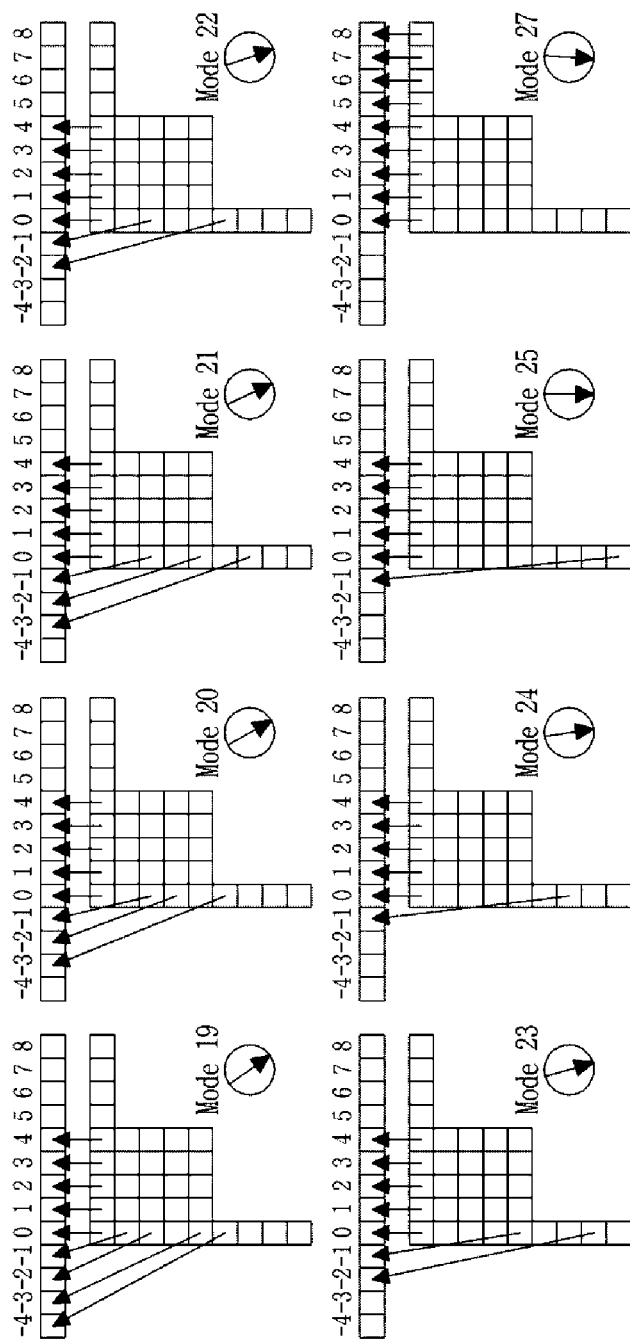
FIG. 43 is a diagram showing an example of a one-dimensional array in which reference samples are arranged in a line.

FIGS. 42 and 43 are diagrams showing an example of a one-dimensional array in which reference samples are arranged in a line.

FIG. 42 shows an example of a one-dimensional vertical array in which reference samples are vertically arranged, and FIG. 43 shows an example of a one-dimensional horizontal array in which reference samples are horizontally arranged. The embodiments of FIGS. 42 and 43 will be described on the assumption that 35 intra-prediction modes are defined.

A one-dimensional horizontal array in which the upper reference samples are rotated counterclockwise may be applied when an intra-prediction mode index is between 11 and 18, and a one-dimensional vertical array in which the left reference samples are rotated clockwise may be applied when an intra-prediction mode index is between 19 and 25. When the reference samples are arranged in a line, an intra-prediction mode angle may be considered.

A reference sample determination parameter may be determined on the basis of the intra-direction parameter. The reference sample determination parameter may include a reference sample index for specifying a reference sample and a weight parameter for determining a weight to be applied to a reference sample.

Reference sample index iIdx and weight parameter $i_{fact}$ may be acquired through Equations 30 and 31 below.

$$iIdx=(y+1)*P_{ang}/32 \quad \text{[Equation 30]}$$

$$i_{fact}=[(y+1)*P_{ang}]\&31 \quad \text{[Equation 31]}$$

In Equations 30 and 31, $P_{ang}$ represents an intra-direction parameter. A reference sample specified by reference sample index iIdx corresponds to integer-pel.

In order to derive the prediction sample, at least one reference sample may be specified. In detail, the location of the reference sample to be used to derive the prediction sample may be specified in consideration of the slope of the prediction mode. As an example, the reference sample to be used to derive the prediction sample may be specified using reference sample index iIdx.

In this case, when the slope of the intra-prediction mode cannot be expressed with one reference sample, the predication sample may be generated by interpolating a plurality of reference samples. As an example, when the slope of the intra-prediction mode is a value between the slope between the prediction sample and a first reference sample and the slope between the prediction sample and a second reference sample, the prediction sample may be acquired by interpolating the first reference sample and the second reference sample. That is, an angular line conforming to the infraprediction angle does not pass the reference sample located at the integer-pel, the prediction sample may be acquired by interpolating reference samples adjacent to the left, the right, the top, or the bottom of a location that the angular line passes.

Equation 32 below shows an example of acquiring a prediction sample on the basis of reference samples.

$$P(x,y)=((32-i_{fact})/32)*Ref\_1D(x+iIdx+1)+(i_{fact}/32)*Ref\_1D(x+iIdx+2) \quad \text{[Equation 32]}$$

In Equation 32, P represents a prediction sample, and Ref_1D represents one of the reference samples arranged in one dimension. In this case, the location of the reference sample may be determined by reference sample index iIdx and the location (x, y) of the prediction sample.

When the slope of the intra-prediction mode can be expressed with one reference sample, weight parameter $i_{fact}$ may be set to zero. Accordingly, Equation 32 may be simplified into Equation 33 below.

$$P(x,y)=\text{Ref\_1}D(x+i\text{Idx}+1) \quad \text{[Equation 33]}$$

The intra-prediction may be performed on the current block on the basis of a plurality of intra-prediction modes. As an example, an intra-prediction mode may be derived for each prediction sample, and a prediction sample may be derived on the basis of the intra-prediction mode assigned to the corresponding prediction sample.

Alternatively, an intra-prediction mode may be derived for each region, and intra-prediction may be performed on the corresponding region on the basis of the intra-prediction mode assigned to the corresponding region. Here, the region may include at least one sample. At least one of the size or shape of the region may be adaptively determined on the basis of at least one of the size, form, or intra-prediction mode of the current block. Alternatively, at least one of the size or shape of the region may be predefined in an encoder and a decoder independently of the size or shape of the current block.

Alternatively, intra-prediction may be performed multiple times, and a final prediction sample may be derived on the basis of an averaging operation or a weighted-sum operation of a plurality of prediction samples acquired by performing the intra-prediction multiple times. As an example, a first prediction sample may be acquired by performing intra-prediction on the basis of a first intra-prediction mode, and a second prediction sample may be acquired by performing intra-prediction on the basis of a second intra-prediction mode. Subsequently, the final prediction sample may be acquired on the basis of the averaging operation or the weighted-sum operation between the first prediction sample and the second prediction sample. In this case, weights assigned to the first prediction sample and the second prediction sample may be determined in consideration of at least one of whether the first intra-prediction mode is a non-directional prediction mode or a directional prediction mode, whether the second intra-prediction mode is a non-directional prediction mode or a directional prediction mode, or the intra-prediction mode of a neighboring block.

The plurality of intra-prediction modes may be a combination of a non-directional intra-prediction mode and a directional intra-prediction mode, a combination of directional intra-prediction modes, or a combination of non-directional intra-prediction modes.

Figure 44:
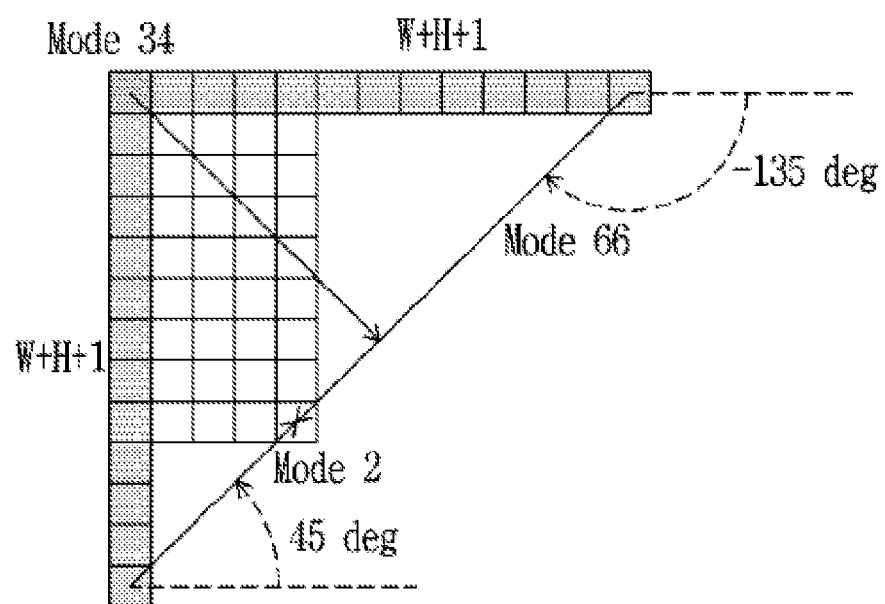
FIG. 44 is a diagram illustrating angles formed between a straight line parallel to the x-axis and directional intra-prediction modes.

FIG. 44 is a diagram illustrating angles formed between a straight line parallel to the x-axis and directional intra-prediction modes.

In the example shown in FIG. 44, the directional prediction modes may range from a diagonal lower-left direction to a diagonal upper-right direction. When the following description assumes an angle formed between the x-axis and the directional prediction mode, the directional prediction modes may range between 45 degrees (in the diagonal lower-left direction) and −135 degrees (in the diagonal upper-right direction).

When the current block is non-square, a prediction sample may be derived using a reference sample far from the prediction sample among reference samples located on the angular line conforming to the intra-prediction angle instead of a reference sample close to the prediction sample depending on the intra-prediction mode of the current block.

Figure 45A:
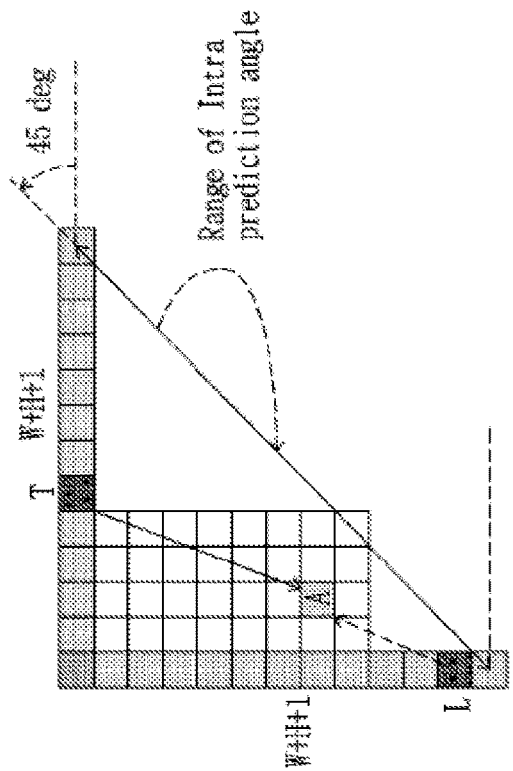
FIG. 45A to FIG. 45B are diagrams showing an aspect in which a prediction sample is acquired when the current block is non-square.
Figure 45B:
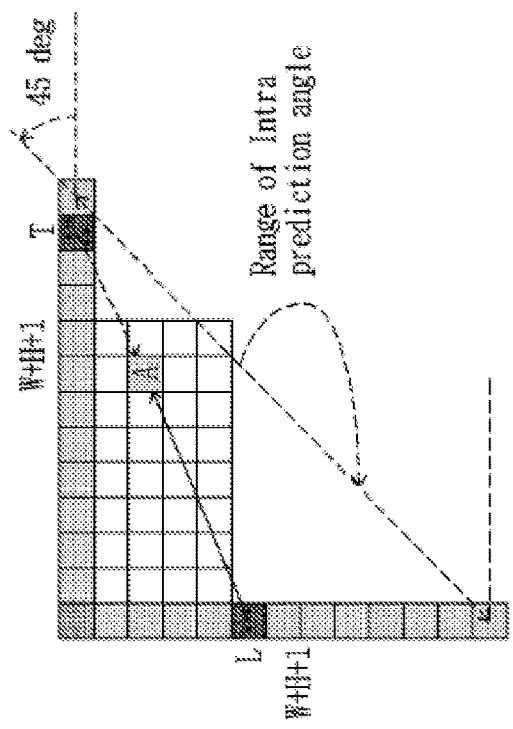

FIG. 45A to FIG. 45B are diagrams showing an aspect in which a prediction sample is acquired when the current block is non-square.

For example, as in the example shown in FIG. 45A, it is assumed that the current block has a non-square shape in which the width is greater than the height and that the intra-prediction mode of the current block is a directional intra-prediction mode having an angle between 0 degrees and 45 degrees. In this case, when deriving prediction sample A near the right column of the current block, left reference sample L far from the prediction sample among the reference samples located on the angular line conforming to the angle may be used instead of upper reference sample T close to the prediction sample.

As another example, as in the example shown in FIG. 45B, it is assumed that the current block has a non-square shape in which the height is greater than the width and that the intra-prediction mode of the current block is a directional intra-prediction mode having an angle between −90 degrees and −135 degrees. In this case, when deriving prediction sample A near the bottom row of the current block, upper reference sample T far from the prediction sample among the reference samples located on the angular line conforming to the angle may be used instead of left reference sample L close to the prediction sample.

In order to solve such a problem, when the current block is non-square, the intra-prediction mode of the current block may be replaced with the intra-prediction mode in the opposite direction. Thus, directional prediction modes having a larger or smaller angle than the directional prediction modes shown in FIG. 41 may be used for non-square blocks. Such a directional intra-prediction mode may be defined as a wide-angle intra-prediction mode. The wide-angle intra-prediction mode represents a directional intra-prediction mode that does not fall within the range between 45 degrees and −135 degrees.

Figure 46:
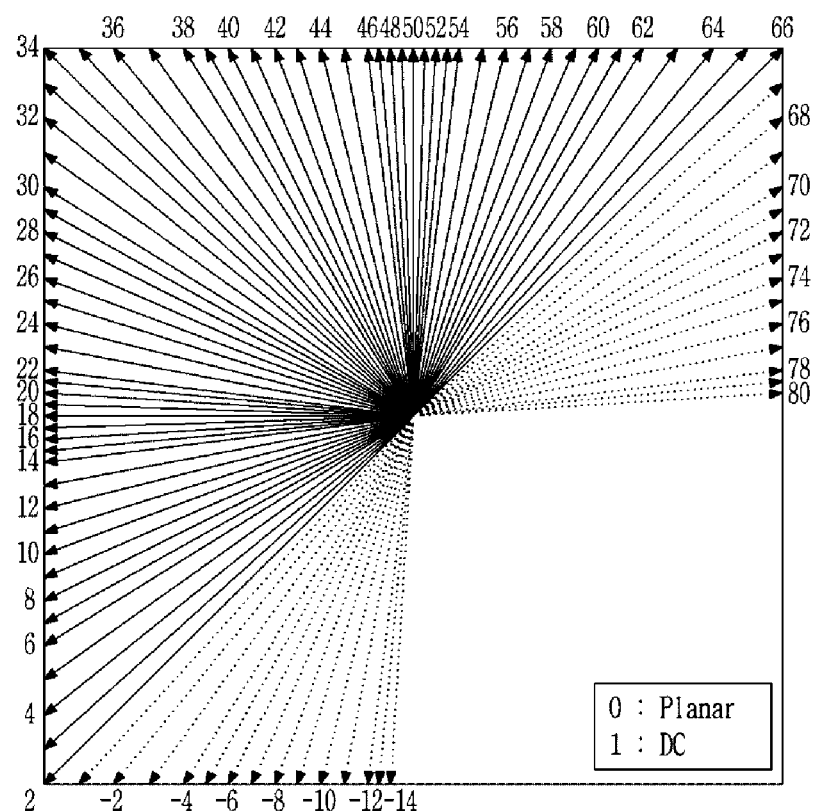
FIG. 46 is a diagram showing wide-angle intra-prediction modes.

FIG. 46 is a diagram showing wide-angle intra-prediction modes.

In the example shown in FIG. 46, intra-prediction modes with an index between −1 and −14 and intra-prediction modes with an index between 67 and 80 indicate wide-angle intra-prediction modes.

In FIG. 46, 14 wide-angle intra-prediction modes having an angle greater than 45 degrees (−1 to −14) and 14 wide-angle intra-prediction modes having an angle smaller than −135 degrees (67 to 80) are illustrated, but a larger or smaller number of wide-angle intra-prediction modes may be defined.

When a wide-angle intra-prediction mode is used, the length of the upper reference samples may be set to 2 W+1, and the length of the left reference samples may be set to 2 H+1.

When a wide-angle intra-prediction mode is used, sample A shown in FIG. 45A may be predicted using reference sample T, and sample A shown in FIG. 45B may be predicted using reference sample L.

A total of 67+N intra-prediction modes may be used by adding N wide-angle intra-prediction modes to the existing intra-prediction modes. As an example, Table 7 shows intra-direction parameters of the intra-prediction modes when 20 wide-angle intra-prediction modes are defined.

TABLE 7

| PredModeIntra | −10 | −9 | −8 | −7 | −6 | −5 | −4 | −3 | −2 |
|---|---|---|---|---|---|---|---|---|---|
| intraPredAngle | 114 | 93 | 79 | 68 | 60 | 54 | 49 | 45 | 39 |
| PredModeIntra | −1 | 2 | 3 | 4 | 5 | 6 | 7 | 8 | 9 |
| intraPredAngle | 35 | 32 | 29 | 26 | 23 | 21 | 19 | 17 | 15 |
| PredModeIntra | 10 | 11 | 12 | 13 | 14 | 15 | 16 | 17 | 18 |
| intraPredAngle | 13 | 11 | 9 | 7 | 5 | 3 | 2 | 1 | 0 |
| PredModeIntra | 19 | 20 | 21 | 22 | 23 | 24 | 25 | 26 | 27 |
| intraPredAngle | −1 | −2 | −3 | −5 | −7 | −9 | −11 | −13 | −15 |
| PredModeIntra | 28 | 29 | 30 | 31 | 32 | 33 | 34 | 35 | 36 |
| intraPredAngle | −17 | −19 | −21 | −23 | −26 | −29 | −32 | −29 | −26 |
| PredModeIntra | 37 | 38 | 39 | 40 | 41 | 42 | 43 | 44 | 45 |
| intraPredAngle | −23 | −21 | −19 | −17 | −15 | −13 | −11 | −9 | −7 |
| PredModeIntra | 46 | 47 | 48 | 49 | 50 | 51 | 52 | 53 | 54 |
| intraPredAngle | −5 | −3 | −2 | −1 | 0 | 1 | 2 | 3 | 5 |
| PredModeIntra | 55 | 56 | 57 | 58 | 59 | 60 | 61 | 62 | 63 |
| intraPredAngle | 7 | 9 | 11 | 13 | 15 | 17 | 19 | 21 | 23 |
| PredModeIntra | 64 | 65 | 66 | 67 | 68 | 69 | 70 | 71 | 72 |
| intraPredAngle | 26 | 29 | 32 | 35 | 39 | 45 | 49 | 54 | 60 |
| PredModeIntra | 73 | 74 | 75 | 76 | | | | | |
| intraPredAngle | 68 | 79 | 93 | 114 | | | | | |

When the current block is non-square and the intra-prediction mode of the current block acquired in S4002 falls within the transform range, the intra-prediction mode of the current block may be transformed into the wide-angle intra-prediction mode. The transform range may be determined on the basis of at least one of the size, form, or ratio of the current block. Here, the ratio may indicate a ratio between the width and the height of the current block.

When the current block has a non-square shape in which the width is greater than the height, the transform range may be set in a range from the intra-prediction mode index of the diagonal upper-right direction (e.g., 66) to the intra-prediction mode index of the diagonal upper-right direction minus N. Here, N may be determined on the basis of the ratio of the current block. When the intra-prediction mode of the current block falls within the transform range, the intra-prediction mode may be transformed into the wide-angle intra-prediction mode. The transform may be to subtract a predefined value from the intra-prediction mode, and the predefined value may be the total number (e.g., 67) of intra-prediction modes except the wide-angle intra-prediction modes.

According to the above embodiment, intra-prediction modes #66 to #53 may be transformed into wide-angle intra-prediction modes #−1 to #−14, respectively.

When the current block has a non-square shape in which the height is greater than the width, the transform range may be set in a range from the intra-prediction mode index of the diagonal lower-left direction (e.g., 2) to the intra-prediction mode index of the diagonal lower-left direction plus M. Here, M may be determined on the basis of the ratio of the current block. When the intra-prediction mode of the current block falls within the transform range, the intra-prediction mode may be transformed into the wide-angle intra-prediction mode. The transform may be to add a predefined value to the intra-prediction mode, and the predefined value may be the total number (e.g., 65) of directional intra-prediction modes excluding the wide-angle intra-prediction modes.

According to the above embodiment, intra-prediction modes #2 to #15 may be transformed into wide-angle intra-prediction modes #67 to #80, respectively.

Intra-prediction modes falling within the transform range will be referred to as alternative wide-angle intra-prediction modes.

The transform range may be determined on the basis of the ratio of the current block. As an example, Table 8 and Table 9 represent a transform range when 35 intra-prediction modes except wide-angle intra-prediction modes are defined and a transform range when 67 intra-prediction modes are defined.

TABLE 8

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = ½ | Modes 32, 33, 34 |
| H/W < ½ | Modes 30, 31, 32, 33, 34 |

TABLE 9

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = ½ | Modes 61, 62, 63, 64, 65, 66 |
| H/W < ½ | Modes 57, 58, 59, 60, 61, 62, 63, 64, 65, 66 |

In the examples shown in Table 8 and Table 9, the number of alternative wide-angle intra-prediction modes falling within the transform range may differ depending on the ratio of the current block.

The transform range as shown in Table 10 below may be set by subdividing the ratio of the current block.

TABLE 10

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = ½ | Modes 61, 62, 63, 64, 65, 66 |
| W/H = ¼ | Modes 57, 58, 59, 60, 61, 62, 63, 64, 65, 66 |
| W/H = ⅛ | Modes 55, 56 |
| H/W = 1/16 | Modes 53, 54, 55, 56 |

When a non-adjacent reference sample line is determined as the reference sample line of the current block or when a multi-line intra-predictive coding method for selecting one of a plurality of reference sample lines is used, a setting may be made such that a wide-angle intra-prediction mode is not used. That is, even when the current block is non-square and the intra-prediction mode of the current block falls within the transform range, the intra-prediction mode of the current block may not be transformed into the wide-angle intra-prediction mode.

Alternatively, when the intra-prediction mode of the current block is determined as the wide-angle intra-prediction mode, a setting may be made such that non-adjacent reference sample lines are not available as the reference sample line of the current block, or a setting may be made such that the multi-line intra-predictive coding method for selecting one of the plurality of reference sample lines is not used. When the multi-line intra-prediction coding method is not used, an adjacent reference sample line may be determined as the reference sample line of the current block.

When the wide-angle intra-prediction mode is not used, refW and refH may be set to the sum of nTbW and nTbH. Accordingly, except for the upper-left reference samples, a non-adjacent reference sample with a distance of i from the current block may include (nTbW+nTbH+offsetX[i]) upper reference samples and (nTbW+nTbH+offsetY[i]) left reference samples. That is, a non-adjacent reference sample with a distance of i from the current block may include (2nTbW+2nTbH+offsetX[i]+offsetY[i]+1) reference samples. For example, when the value of whRatio is greater than 1, a setting may be made such that the value of offsetX is greater than the value of offsetY. As an example, the value of offsetX may be set to 1, and the value of offsetY may be set to 0. On the other hand, when the value of whRatio is smaller than 1, a setting may be made such that the value of offsetY is greater than the value of offsetX. As an example, the value of offsetX may be set to 0, and the value of offsetY may be set to 1.

As wide-angle intra-prediction modes are used in addition to the existing intra-prediction modes, resources required for coding the wide-angle intra-prediction modes may be increased, and thus coding efficiency may be reduced. Accordingly, by coding alternative intra-prediction modes for the wide-angle intra-prediction modes, instead of coding the wide-angle intra-prediction modes as they are, it is possible to improve coding efficiency.

As an example, when the current block is coded in wide-angle intra-prediction mode #67, wide-angle intra-prediction mode #2, which is an alternative wide-angle intra-prediction mode for #67, may be coded to the intra-prediction mode of the current block. Also, when the current block is coded in wide-angle intra-prediction mode #−1, wide-angle intra-prediction mode #66, which is an alternative wide-angle intra-prediction mode for #−1, may be coded to the intra-prediction mode of the current block.

The decoder may decode the intra-prediction mode of the current block and may determine whether the decoded intra-prediction mode falls within the transform range. When the decoded intra-prediction mode is an alternative wide-angle intra-prediction mode, the intra-prediction mode may be transformed into the wide-angle intra-prediction mode.

Alternatively, when the current block is coded in the wide-angle intra-prediction mode, the wide-angle intra-prediction mode may be coded as it is.

The coding of the intra-prediction mode may be performed on the basis of the above-described MPM list. In detail, when a neighboring block is coded in the wide-angle intra-prediction mode, an MPM may be set on the basis of an alternative wide-angle intra-prediction mode corresponding to the wide-angle intra-prediction mode.

A residual picture may be derived by subtracting a prediction picture from an original picture. In this case, when the residual picture is changed to the frequency domain, the subjective picture quality of the picture does not significantly decrease even if high-frequency components are removed from frequency components. Accordingly, when the values of the high-frequency components are changed to small values or when the values of the high-frequency components are set to 0, it is possible to increase compression efficiency without causing significant visual distortion. Considering the above characteristics, the current block may be transformed in order to decompose the residual picture into two-dimensional frequency components. The transform may be performed using a transform technique such as Discrete Cosine Transform (DCT) or Discrete Sine Transform (DST).

DCT is using cosine transform to decompose (or transform) the residual picture into two-dimensional frequency components, and DST is using sine transform to decompose (or transform) the residual picture into two-dimensional frequency components. As a result of the transform of the residual picture, the frequency components may be expressed with a base pattern. As an example, when DCT is performed on an N×N block, $N^2$ basic pattern components may be acquired. The size of each of the basic pattern components included in the N×N block may be acquired through the transform. According to the transform technique used, the size of the basic pattern component may be referred to as a DCT coefficient or a DST coefficient.

The transform technique DCT is mainly used to transform an picture in which many non-zero low-frequency components are distributed. The transform technique DST is mainly used for an picture in which many high-frequency components are distributed.

The residual picture may be transformed using a transform technique other than DCT or DST.

Transforming the residual picture into two-dimensional frequency components will be referred to as a two-dimensional transform. In addition, the size of the basic pattern components acquired through the transform result will be referred to as a transform coefficient. As an example, the transform coefficient may refer to a DCT coefficient or a DST coefficient. When both of first transform and second transform to be described below are applied, the transform coefficient may refer to the size of a basic pattern component generated as a result of the second transform.

The transform technique may be determined in units of blocks. The transform technique may be determined on the basis of at least one of the predictive coding mode of the current block or the size of the current block. As an example, when the current block is coded in the intra-prediction mode and the size of the current block is smaller than N×N, the transform may be performed using the transform technique DST. On the other hand, when the above condition is not satisfied, the transform may be performed using the transform technique DCT.

The two-dimensional transform may not be performed on some blocks of the residual picture. Not performing the two-dimensional transform may be referred to as transform skip. When the transform skip is applied, quantization may be applied to residual values on which transform is not performed.

After the current block is transformed using DCT or DST, the transformed current block may be re-transformed. In this case, the transform based on DCT or DST may be defined as the first transform, and the re-transform of a block subjected to the first transform may be defined as the second transform.

The first transform may be performed using one of a plurality of transform core candidates. As an example, the first transform may be performed using one of DCT2, DCT8, or DCT7.

Different transform cores may be used in the horizontal direction and the vertical direction. Information indicating a combination of the vertical transform core and the horizontal transform core may be signaled in a bitstream.

The first transform and the second transform may be performed in different units. As an example, the first transform may be performed on an 8×8 block, and the second transform may be performed on a 4×4 sub-block of the transformed 8×8 block. In this case, the transform coefficient of residual regions where the second transform is not performed may be set to 0.

Alternatively, the first transform may be performed on a 4×4 block, and the second transform may be performed on the region of an 8×8 block including the transformed 4×4 block.

Information indicating whether to perform the second transform may be signaled in a bitstream.

The decoder may perform an inverse transform of the second transform (a second inverse transform) and may perform an inverse transform of the first transform (a first inverse transform) on a result of the second inverse transform. As a result of performing the second inverse transform and the first inverse transform, residual signals for the current block may be acquired.

The quantization is to reduce the energy of a block, and the quantization process includes dividing a transform coefficient by a specific constant value. The constant value may be derived by a quantization parameter, and the quantization parameter may be defined as a value between 1 and 63.

When a transform and quantization is performed by the encoder, the decoder may acquire a residual block through an inverse quantization and an inverse transform. The decoder may acquire a reconstructed block for the current block by adding the prediction block and the residual block.

When the reconstructed block of the current block is acquired, information loss occurring during quantization and coding may be reduced through in-loop filtering. An in-loop filter may include at least one of a deblocking filter, a sample adaptive offset filter (SAO), or an adaptive loop filter (ALF). A reconstructed block before an in-loop filter is applied will be referred to as a first reconstructed block, and a reconstructed block after an in-loop filter is applied will be referred to as a second reconstructed block.

The second reconstructed block may be acquired by applying at least one of the deblocking filter, SAO, or ALF to the first reconstructed block. In this case, the SAO or ALF may be applied after the deblocking filter is applied.

The deblocking filter is for alleviating picture quality deterioration (blocking artifact) which occurs at a block edge when a quantization is performed in units of blocks. In order to apply the deblocking filter, blocking strength (BS) between the first reconstructed block and a neighboring reconstructed block may be determined.

Figure 47:
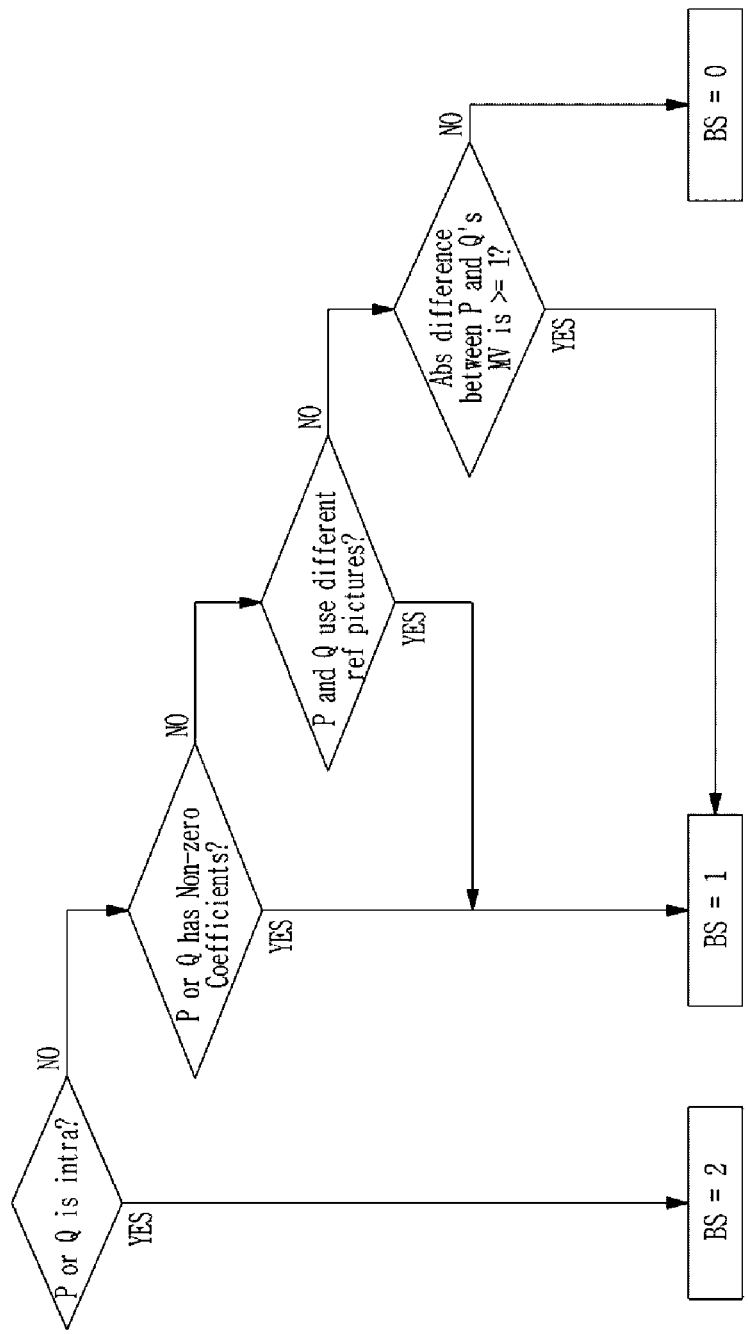
FIG. 47 is a flowchart showing a process of determining blocking strength.

FIG. 47 is a flowchart showing a process of determining blocking strength.

In the example shown in FIG. 47, P represents the first reconstructed block, and Q represents the neighboring reconstructed block. Here, the neighboring reconstructed block may be a block neighboring the left or the top of the current block.

In the example shown in FIG. 47, it is shown that the blocking strength is determined in consideration of the predictive coding modes of P and Q, whether non-zero transform coefficients are included, whether inter-prediction is performed using the same reference picture, or whether a difference value between motion vectors is greater than or equal to a threshold value.

Whether to apply the deblocking filter may be determined on the basis of the blocking strength. As an example, the filtering may not be performed when the blocking strength is 0.

The SAO is for alleviating a ringing artifact occurring when a quantization is performed in the frequency domain. The SAO may be performed by adding or subtracting an offset determined in consideration of a pattern of the first reconstructed picture. A method of determining the offset includes an edge offset (EO) or a band offset (BO). The EO indicates a method of determining an offset of the current sample according to a pattern of nearby pixels. The BO indicates a method of applying a common offset to a set of pixels having similar brightness values in an region. In detail, pixel brightness is divided into 32 equal sections, and pixels with similar brightness values may be set as one set. As an example, four adjacent bands among 32 bands may be set as one group, and the same offset value may be applied to samples belonging to the four bands.

The ALF is a method of generating the second reconstructed picture by applying a filter of a predefined size or shape to the first reconstructed picture or to a reconstructed picture to which the deblocking filter is applied. Equation 34 below represents an application example of the ALF.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l)$$ [Equation 34]

One of the predefined filter candidates may be selected in units of pictures, coding tree units, coding blocks, prediction blocks, or transform blocks. The filter candidates may be different in size or shape.

Figure 48:
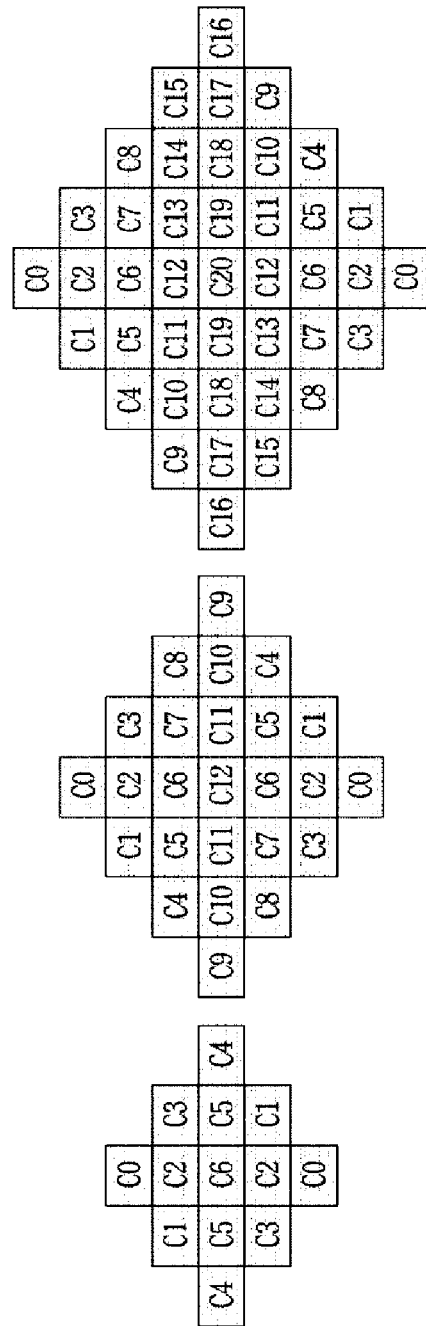
FIG. 48 shows predefined filter candidates.

FIG. 48 shows predefined filter candidates.

In the example shown in FIG. 48, at least one of a 5×5 diamond shape, a 7×7 diamond shape, or a 9×9 diamond shape may be selected.

Only the 5×5 diamond shape may be used for a chroma component.

The application of the embodiments that have been described focusing on a decoding process or an encoding process to the decoding process or the encoding process falls within the scope of the present invention. The change of a predetermined order, in which embodiments have been described, to an order different from that described above also falls within the scope of the present invention.

Although the above embodiments have been described on the basis of a series of steps or flows, the steps or flows do not limit the time-series order of the invention and may be performed simultaneously or in different orders as necessary. Also, each of the components (for example, units, modules, etc.) constituting the block diagram in the above-described embodiments may be implemented by a hardware device or software, and a plurality of components may be combined and implemented by a single hardware device or software. The above embodiments may be implemented in the form of program instructions that may be executed through various computer elements and recorded in a computer-readable recording medium. The computer-readable recording medium may include a program instruction, a data file, a data structure, and the like alone or in combination. Examples of the computer-readable recording medium include magnetic media such as a hard disk, a floppy disk, and a magnetic tape, optical media such as a compact disc-read only memory (CD-ROM) and a digital versatile disc (DVD), magneto-optical media such as a floptical disk, and hardware devices such as a ROM, a random access memory (RAM), and a flash memory, which are specially designed to store and execute program instructions. The hardware device may be configured to operate as one or more software modules in order to perform operations of the present invention, and vice versa.

INDUSTRIAL APPLICABILITY

The present invention may be applied to an electronic device for encoding or decoding videos.

The invention claimed is:

1. A video decoding method comprising:
in case that there are a first prediction and a second prediction corresponding to a coding block, determining a partition type of the coding block;
deriving first motion information regarding the first prediction in the coding block and second motion information regarding the second prediction in the coding block; and
acquiring a prediction sample in the coding block on the basis of the first motion information and the second motion information,
wherein
the first motion information regarding the first prediction is derived from a first merge candidate specified by first index information among a plurality of merge candidates included in a merge candidate list, and
the second motion information regarding the second prediction is derived from a second merge candidate specified by second index information among the plurality of merge candidates included in the merge candidate list;
wherein when a value of the second index information is smaller than a value of the first index information, the second merge candidate has an index equal to the value of the second index information.

2. The video decoding method of claim 1, wherein when a value of the second index information is greater than or equal to a value of the first index information, the second merge candidate has an index equal to the value of the second index information plus one.

3. The video decoding method of claim 1, wherein when the prediction sample is included in a boundary region between the first prediction and the second prediction, the prediction sample is derived on the basis of a weighted-sum operation of a first prediction sample derived on the basis of the first motion information and a second prediction sample derived on the basis of the second motion information.

4. The video decoding method of claim 3, wherein a first weight applied to the first prediction sample is determined on the basis of an x-coordinate and a y-coordinate of the prediction sample.

5. The video decoding method of claim 4, wherein a second weight applied to the second prediction sample is derived by subtracting the first weight from a constant value.

6. A video encoding method comprising:
in case that there are a first prediction and a second prediction corresponding to a coding block, determining a partition type of the coding block;
deriving first motion information regarding the first prediction in the coding block and second motion information regarding the second prediction in the coding block; and
acquiring a prediction sample in the coding block on the basis of the first motion information and the second motion information,
wherein
the first motion information regarding the first prediction is derived from a first merge candidate among a plurality of merge candidates included in a merge candidate list,
the second motion information regarding the second prediction is derived from a second merge candidate among the plurality of merge candidates included in the merge candidate list, and
first index information for specifying the first merge candidate and second index information for specifying the second merge candidate are respectively encoded;
wherein when an index of the second merge candidate is smaller than an index of the first merge candidate, the second index information is encoded with a value of the index of the second merge candidate.

7. The video encoding method of claim 6, wherein when an index of the second merge candidate is greater than an index of the first merge candidate, the second index information is encoded with a value obtained by subtracting one from the index of the second merge candidate.

8. The video encoding method of claim 6, wherein when the prediction sample is included in a boundary region between the first prediction and the second prediction, the prediction sample is derived on the basis of a weighted-sum operation of a first prediction sample derived on the basis of the first motion information and a second prediction sample derived on the basis of the second motion information.

9. The video encoding method of claim 8, wherein a first weight applied to the first prediction sample is determined on the basis of an x-coordinate and a y-coordinate of the prediction sample.

10. The video encoding method of claim 9, wherein a second weight applied to the second prediction sample is derived by subtracting the first weight from a constant value.

11. A video decoder, comprising:
a memory having stored instructions;
a processor for executing the instructions to:
in case that there are a first prediction and a second prediction corresponding to a coding block, determine a partition type of the coding block, derive first motion information regarding the first prediction in the coding block and second motion information regarding the second prediction in the coding block, and acquire a prediction sample in the coding block on the basis of the first motion information and the second motion information,
wherein
the first motion information regarding the first prediction is derived from a first merge candidate specified by first index information among a plurality of merge candidates included in a merge candidate list, and the second motion information regarding the second prediction is derived from a second merge candidate specified by second index information among the plurality of merge candidates included in the merge candidate list;

wherein when a value of the second index information is smaller than a value of the first index information, the second merge candidate has an index equal to the value of the second index information.

12. The video decoder of claim 11, wherein when a value of the second index information is greater than or equal to a value of the first index information, the second merge candidate has an index equal to the value of the second index information plus one.

13. The video decoder of claim 11, wherein when the prediction sample is included in a boundary region between the first prediction and the second prediction, the prediction sample is derived on the basis of a weighted-sum operation of a first prediction sample derived on the basis of the first motion information and a second prediction sample derived on the basis of the second motion information.

14. The video decoder of claim 13, wherein a first weight applied to the first prediction sample is determined on the basis of an x-coordinate and a y-coordinate of the prediction sample.

15. A video encoder, comprising:
a memory having stored instructions;
a processor for executing the instructions to:
in case that there are a first prediction and a second prediction corresponding to a coding block, determine a partition type of the coding block;
derive first motion information regarding the first prediction in the coding block and second motion information regarding the second prediction in the coding block; and
acquire a prediction sample in the coding block on the basis of the first motion information and the second motion information,
wherein
the first motion information regarding the first prediction is derived from a first merge candidate among a plurality of merge candidates included in a merge candidate list,
the second motion information regarding the second prediction is derived from a second merge candidate among the plurality of merge candidates included in the merge candidate list, and
first index information for specifying the first merge candidate and second index information for specifying the second merge candidate are respectively encoded;
wherein when an index of the second merge candidate is smaller than an index of the first merge candidate, the second index information is encoded with a value of the index of the second merge candidate.

16. The video encoder of claim 15, wherein when an index of the second merge candidate is greater than an index of the first merge candidate, the second index information is encoded with a value obtained by subtracting one from the index of the second merge candidate.

17. The video encoder of claim 15, wherein when the prediction sample is included in a boundary region between the first prediction and the second prediction, the prediction sample is derived on the basis of a weighted-sum operation of a first prediction sample derived on the basis of the first motion information and a second prediction sample derived on the basis of the second motion information.

18. The video encoder of claim 10, wherein a first weight applied to the first prediction sample is determined on the basis of an x-coordinate and a y-coordinate of the prediction sample.

19. A non-transitory computer-readable storage medium having stored therein computer executable instructions that when executed by a processor, implement the video decoding method of claim 1.

20. A non-transitory computer-readable storage medium having stored therein computer executable instructions that when executed by a processor, implement the video encoding method of claim 6.

\* \* \* \* \*